US012690065B2

(12) United States Patent
Lu et al.

(10) Patent No.:     US 12,690,065 B2
(45) Date of Patent:        Jul. 21, 2026

(54) COMMUNICATION METHOD AND APPARATUS

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG); Yanchao Xu, Dongguan (CN)

(73) Assignee: GUANGDONG OPPO MOBILE TELECOMMUNICATIONS CORP., LTD., Dongguan (CN)

( * ) Notice:     Subject to any disclaimer, the term of this patent is extended or adjusted under 35 U.S.C. 154(b) by 0 days.

(21) Appl. No.: 19/329,859

(22) Filed:     Sep. 16, 2025

(65)     Prior Publication Data

US 2026/0012977 A1     Jan. 8, 2026

Related U.S. Application Data

(63)    Continuation of application No. 18/913,859, filed on Oct. 11, 2024, which is a continuation of application No. PCT/CN2022/090805, filed on Apr. 29, 2022.

(51) Int. Cl.
H04W 74/0808          (2024.01)
(52) U.S. Cl.
CPC ............................... H04W 74/0808 (2013.01)
(58) Field of Classification Search
CPC ............. H04W 74/0808; H04W 24/10; H04W 56/0045; H04W 56/001; H04W 76/15;
(Continued)

(56)     References Cited

U.S. PATENT DOCUMENTS

2016/0227534 A1*     8/2016    Kim ...................... H04W 72/30
2021/0212141 A1*     7/2021    Chu ...................... H04W 48/12
(Continued)

FOREIGN PATENT DOCUMENTS

CN         113630725    A     11/2021
WO       2021003181    A      1/2021

OTHER PUBLICATIONS

International Search Report and Written Opinion of the International Searching Authority regarding International Patent Application No. PCT/CN2022/090805, dated Jan. 18, 2023.
(Continued)

*Primary Examiner* — Fred A Casca
(74) *Attorney, Agent, or Firm* — Sheppard, Mullin, Richter & Hampton LLP

(57)          ABSTRACT

A communication method, which is applied to a first multi-link device (MLD) operating in an enhanced multi-link single radio (EMLSR) mode and includes: performing, by the first MLD, a second listening operation, where the second listening operation includes: the first MLD performing a clear channel assessment (CCA) and receiving an initial control frame of a frame exchange sequence transmitted by an access point (AP) MLD through an affiliated station that operates on an EMLSR link in an awake state; and performing, by the first MLD, a first listening operation, where the first listening operation is used for a first station on the first MLD to receive a groupcast frame using a first receiving capability. The first MLD switches from the second listening operation to the first listening operation at a target time or before the target time.

15 Claims, 9 Drawing Sheets

(58) Field of Classification Search
    CPC ..... H04W 84/12; H04W 48/14; H04W 76/25;
        H04W 48/16; H04W 76/11; H04W 74/04;
        H04W 74/085; H04W 74/004; H04B
        7/06952
    See application file for complete search history.

(56) References Cited

U.S. PATENT DOCUMENTS

| | | | | |
|---|---|---|---|---|
| 2021/0250963 | A1 | 8/2021 | Seok et al. | |
| 2021/0321473 | A1* | 10/2021 | Monajemi | H04B 17/336 |
| 2022/0104261 | A1* | 3/2022 | Kwon | H04W 48/16 |
| 2022/0294583 | A1* | 9/2022 | Lu | H04W 76/15 |

OTHER PUBLICATIONS

Kwon et al., "Proposed Draft Text; MAC MLO Enhanced Multi-link Operation Mode", IEEE P802.11 Wireless LANs, IEEE 802.11-20/1440r07, Sep. 9, 2020.
"IEEE P802.11be™ /D1.5; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", IEEE P802.11be™ /D1.5, Mar. 2022.
Park et al., "CC36 Comment Resolution CID 7888", IEEE P802.11 Wireless LANs, IEEE 802.11-21/1483r4, Sep. 3, 2021.
Extended European Search Report issued by the European Patent Office for Application No. 22939423.4 mailed on Feb. 20, 2025.
Ratnam et al., "CR for CIDs related to EMLSR Group-addressed frame Reception", Samsung Research America, IEEE P802.11 Wireless LANs, IEEE 802.11-22/0335r2, Feb. 2022.
Office Action issued by the Japan Patent Office for Application No. 2024-563990 mailed on Jul. 15, 2025.
Notice of Reasons for Refusal issued by the JPO for Japanese Patent Application No. 2024-563990, mailed on Oct. 17, 2025. English translation attached.
Proposed Draft Specification for leftover TBDs; Alfred Asterjadhi, Qualcomm Inc; IEEE 802.11-210572r10; Apr. 2, 2021.
Office Action issued by the European Patent Office for Application No. 22939423.4 mailed on Dec. 3, 2025.

* cited by examiner

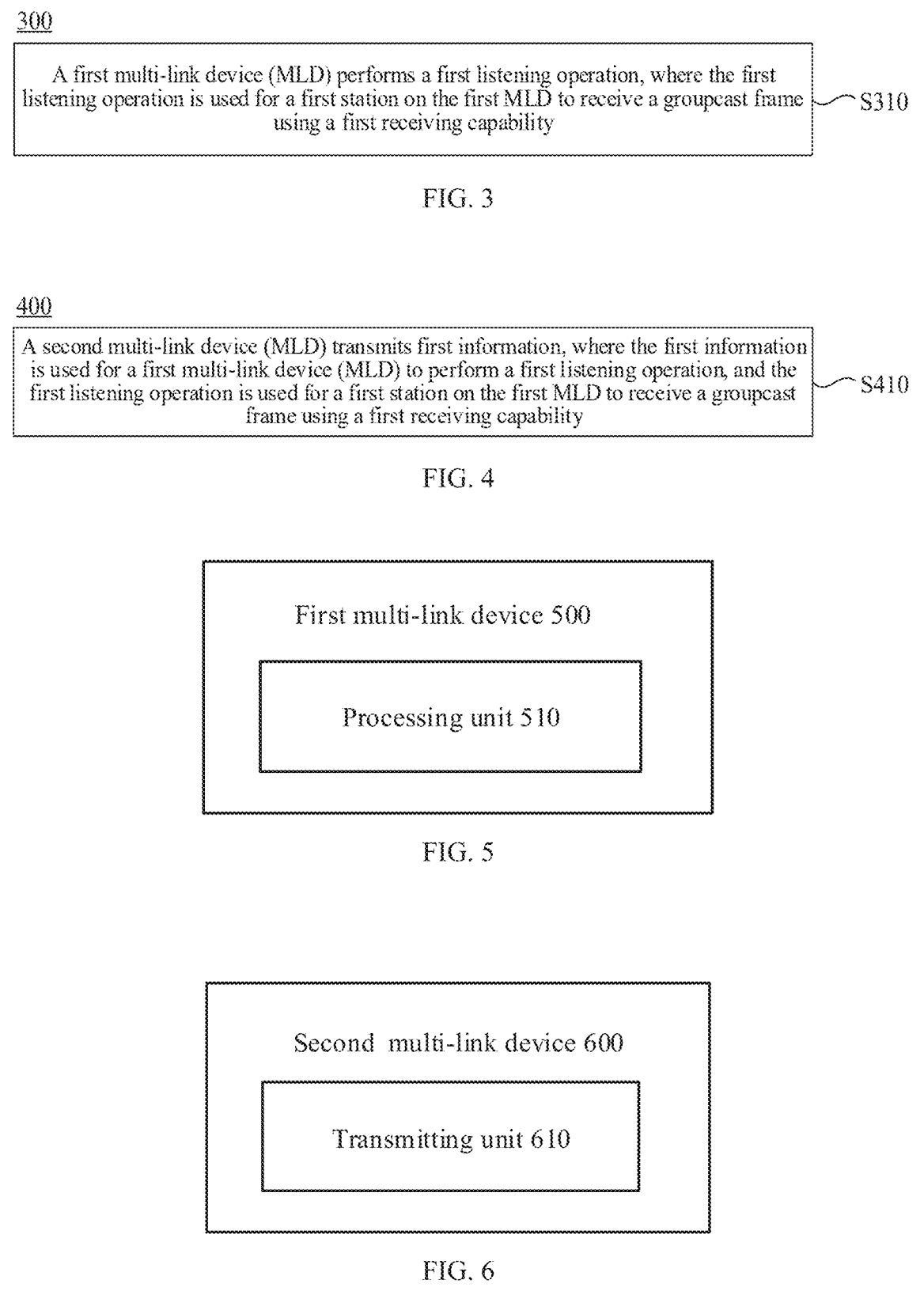

300

A first multi-link device (MLD) performs a first listening operation, where the first listening operation is used for a first station on the first MLD to receive a groupcast frame using a first receiving capability    S310

A second multi-link device (MLD) transmits first information, where the first information is used for a first multi-link device (MLD) to perform a first listening operation, and the first listening operation is used for a first station on the first MLD to receive a groupcast frame using a first receiving capability    S410

FIG. 4

First multi-link device 500

Processing unit 510

FIG. 5

Second multi-link device 600

Transmitting unit 610

FIG. 6

COMMUNICATION METHOD AND APPARATUS

CROSS-REFERENCE TO RELATED APPLICATION

This application is a Continuation Application of U.S. Non-Provisional application Ser. No. 18/913,859 filed on Oct. 11, 2024, which is a Continuation Application of International Application No. PCT/CN2022/090805 filed on Apr. 29, 2022, which are incorporated herein by reference in their entirety.

TECHNICAL FIELD

The present disclosure relates to the field of communications, and in particular, to a communication method and a device.

BACKGROUND

Currently, related protocols have defined listening operation of a multi-link device (MLD), such as a non-access point (non-AP) MLD, on an enhanced multi-link single radio (EMLSR) link. However, existing listening operation may be limited by the frame reception capability, resulting in the inability to receive frames normally in some special scenarios.

SUMMARY

The embodiments of the present disclosure provide communication methods and devices.

The embodiments of the present disclosure provide a communication method, including:

performing, by a first multi-link device (MLD), a first listening operation, the first listening operation being used for a first station on the first MLD to receive a groupcast frame using a first receiving capability.

The embodiments of the present disclosure provide a communication method, including:

transmitting, by a second multi-link device (MLD), first information, the first information being used for a first multi-link device (MLD) to perform a first listening operation, and the first listening operation being used for a first station on the first MLD to receive a groupcast frame using a first receiving capability.

The embodiments of the present disclosure provide a first multi-link device, including:

a processing unit, configured to perform a first listening operation, the first listening operation being used for a first station on the first multi-link device (MLD) to receive a groupcast frame using a first receiving capability.

The embodiments of the present disclosure provide a second multi-link device, including:

a transmitting unit, configured to transmit first information, the first information being used for a first multi-link device (MLD) to perform a first listening operation, and the first listening operation being used for a first station on the first MLD to receive a groupcast frame using a first receiving capability.

The embodiments of the present disclosure provide a first multi-link device, including a processor and a memory. The memory is configured to store a computer program, and the processor is configured to invoke and run the computer program stored in the memory, to cause the first multi-link device to perform the above method applied to the first multi-link device.

The embodiments of the present disclosure provide a second multi-link device, including a processor and a memory. The memory is configured to store a computer program, and the processor is configured to invoke and run the computer program stored in the memory, to cause the second multi-link device to perform the above method applied to the second multi-link device.

The embodiments of the present disclosure provide a chip, configured to implement the above method applied to the first multi-link device.

Exemplarily, the chip includes a processor, configured to invoke and run a computer program from a memory, to cause a device equipped with the chip to perform the above method applied to the first multi-link device.

The embodiments of the present disclosure provide a chip, configured to implement the above method applied to the second multi-link device.

Exemplarily, the chip includes a processor, configured to invoke and run a computer program from a memory, to cause a device equipped with the chip to perform the above method applied to the second multi-link device.

The embodiments of the present disclosure provide a computer-readable storage medium. The computer-readable storage medium is configured to store a computer program, and the computer program, when run by a device, causes the device to perform the above method applied to the first multi-link device, or to perform the above method applied to the second multi-link device.

The embodiments of the present disclosure provide a computer program product, including computer program instructions. The computer program instructions cause a computer to perform the above method applied to the first multi-link device, or to perform the above method applied to the second multi-link device.

The embodiments of the present disclosure provide a computer program, and the computer program, when run on a computer, causes the computer to perform the above method applied to the first multi-link device, or to perform the above method applied to the second multi-link device.

The embodiments of the present disclosure provide a communication system, including:

a first multi-link device, configured to perform the method as applied to the first multi-link device; and a second multi-link device, configured to perform the method as applied to the second multi-link device.

BRIEF DESCRIPTION OF THE DRAWINGS

FIG. 3 is a schematic flowchart of a communication method 300, in accordance with an embodiment of the present disclosure.

FIG. 4 is a schematic flowchart of a communication method 400, in accordance with another embodiment of the present disclosure.

FIG. 5 is a schematic block diagram of a first multi-link device 500, in accordance with an embodiment of the present disclosure.

FIG. 6 is a schematic block diagram of a second multi-link device 600, in accordance with an embodiment of the present disclosure.

DETAILED DESCRIPTION

Technical solutions in the embodiments of the present disclosure will be described below with reference to the accompanying drawings of the embodiments of the present disclosure.

The technical solutions in the embodiments of the present disclosure may be applied to various communication systems, such as a wireless local area network (WLAN), wireless fidelity (WiFi) or other communication systems.

Figure 1:
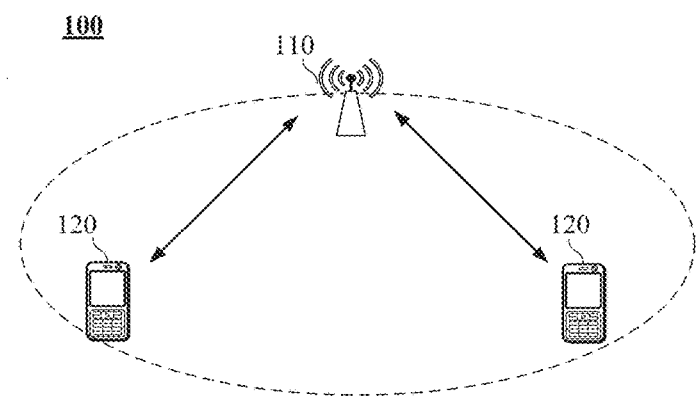
FIG. 1 is a schematic diagram of an application scenario, in accordance with embodiments of the present disclosure.

For example, the communication system 100 applied by the embodiments of the present disclosure is shown in FIG. 1. The communication system 100 may include an access point (AP) 110 and stations (STAs) 120 accessing a network via the access point 110.

In some scenarios, the AP is referred to as an AP STA. That is, in a sense, the AP is also a STA.

In some scenarios, the STA is referred to as a non-AP STA.

The communication of the communication system 100 may be communication between an AP and a non-AP STA, communication between a non-AP STA and a non-AP STA, or communication between a STA and a peer STA. The peer STA may refer to a device that performs peer communicate with the STA. For example, the peer STA may be an AP or a non-AP STA.

AP is equivalent to a bridge connecting a wired network and a wireless network, and the main function of the AP is to connect various wireless network clients together and then connect the wireless network to Ethernet. An AP device may be a terminal device (such as a mobile phone) or a network device (such as a router). The terminal device or network device has a chip for implementing a communication function, such as a WLAN or WiFi chip.

It should be understood that the role of STA in the communication system is not absolute. For example, in some scenarios, when a mobile phone is connected to a router, the mobile phone is a non-AP STA; and when the mobile phone serves as a hotspot for other mobile phones, the mobile phone plays a role of an AP.

AP and non-AP STA may be devices applied to the Internet of Vehicles, may be IoT nodes or sensors in the Internet of Things (IoT), may be smart cameras, smart remote controls, or smart water and electricity meters in smart homes, or may be sensors in smart cities.

In some embodiments, the non-AP STA may support the 802.11be standard. The non-AP STA may also support various current and future wireless local area network (WLAN) standards of the 802.11 family, such as 802.11ax, 802.11ac, 802.11n, 802.11g, 802.11b and 802.11a.

In some embodiments, the AP may be a device supporting the 802.11be standard. The AP may also be a device that supports various current and future WLAN standards of the 802.11 family, such as 802.11ax, 802.11ac, 802.11n, 802.11g, 802.11b, and 802.11a.

In the embodiments of the present disclosure, the STA may be a device supporting the WLAN/WiFi technology, such as a mobile phone, a pad, a computer, a virtual reality (Virtual Reality, VR) device, an augmented reality (Augmented Reality, AR) device, a wireless device in industrial control, a set-top box, a wireless device in self driving, an in-vehicle communication device, a wireless device in remote medical, a wireless device in smart grid, a wireless device in transportation safety, a wireless device in smart city, a wireless device in smart home, or a wireless communication chip/ASIC/SoC.

The frequency bands supported by the WLAN technology may include, but are not limited to, low frequency bands (e.g., 2.4 GHZ, 5 GHZ, or 6 GHZ) and high frequency bands (e.g., 45 GHZ or 60 GHz).

FIG. 1 exemplarily shows one AP STA and two non-AP STAs. Optionally, the communication system 100 may include multiple AP STAs and another number of non-AP STAs, which are not limited in the embodiments of the present disclosure.

It should be understood that the terms "system" and "network" are often used interchangeably herein. Herein, the term "and/or" is only an association relationship to describe associated objects, which means that there may be three kinds of relationships. For example, A and/or B may represent three cases that: A exists alone, both A and B exist, and B exists alone. In addition, a character "/" generally means that related objects before and after "/" are in an "or" relationship herein.

It should be understood that "indicate" mentioned in the embodiments of the present disclosure may be a direct indication, may be an indirect indication, or may represent having an association relationship. For example, A indicates B, which may mean that A directly indicates B (for example, B may be obtained by A), or may mean that A indirectly indicates B (for example, A indicates C, and B may be obtained by C), or may mean that there is an association relationship between A and B.

In the description of the embodiments of the present disclosure, the term "correspond" may mean that there is a direct correspondence or indirect correspondence between the two, or it may mean that there is an associated relationship between the two, or it may mean a relationship of indicating and being indicated or a relationship of configuring and being configured, etc.

In order to facilitate understanding of the technical solutions of the embodiments of the present disclosure, the relevant technologies of the embodiments of the present disclosure are described below. The following related technologies may be arbitrarily combined with the technical solutions of the embodiments of the present disclosure as optional solutions, and they all be included in the protection scope of the embodiments of the present disclosure.

First, Enhanced Multi-Link Single Radio (EMLSR)

Related protocols standardize an EMLSR operation and provide clearer process specifications for the EMLSR operation, in which a non-AP MLD may work in EMLSR mode on a specific subset of the established link set. The links in this specific subset are called EMLSR links.

The non-AP MLD may listen to the channel status of the EMLSR link through an affiliated station that operates on the EMLSR link in an awake state. Here, the listening operation (referred to as a second listening operation in the present disclosure) includes performing a clear channel assessment (Clear Channel Assessment, CCA) and receiving an initial control frame of a frame exchange sequence transmitted by an AP MLD. The initial control frame is transmitted using a non-high throughput (duplicate) physical layer protocol data unit (non-HT (duplicate) PPDU) with a spatial stream.

Figure 2A:
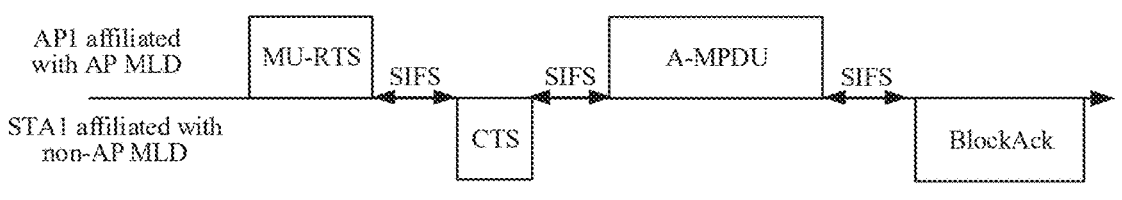
FIG. 2A is a schematic diagram of a frame exchange triggered by an MU-RTS trigger frame in an EMLSR mode.
Figure 2B:
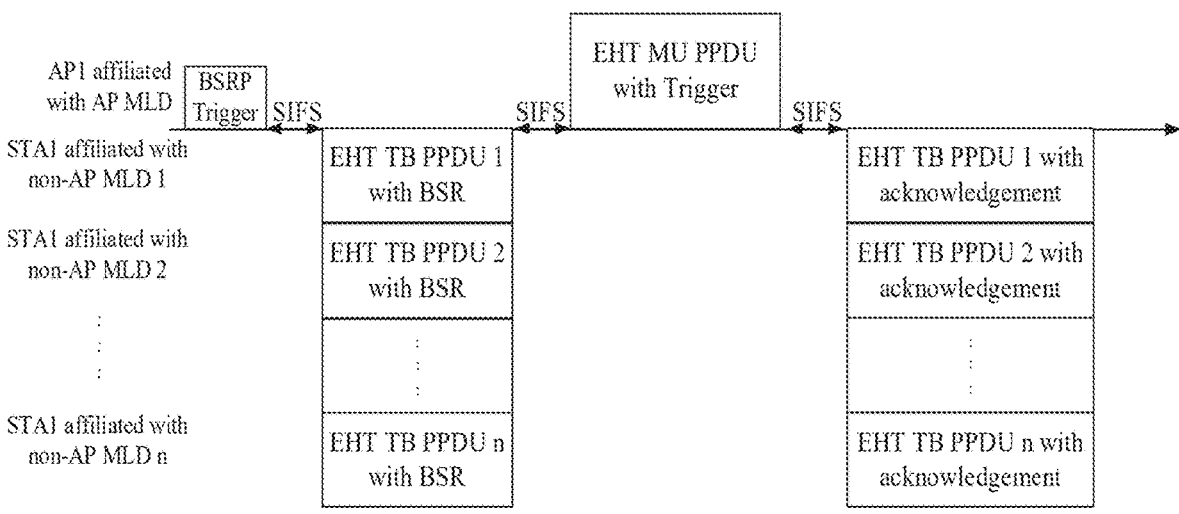
FIG. 2B is an example of a frame exchange triggered by a BSR trigger frame in an EMLSR mode.

An AP affiliated with the AP MLD (the AP is also referred to as an affiliated AP) initiates a frame exchange with the non-AP MLD on one of the EMLSR links and may transmit an initial control frame to the non-AP MLD to start the frame exchange process. The initial control frame may be a multiple user request-to-transmit (Multiple User Request-To-Transmit, MU-RTS) trigger frame or a buffer status report poll (Buffer Status Report Poll, BSRP) trigger frame. For example, as shown in FIG. 2A, for the MU-RTS trigger frame, AP1 affiliated with the AP MLD transmits MU-RTS, and STA1 affiliated with the non-AP MLD transmits CTS after a short interframe space (Short Interframe Space, SIFS) at the end of the transmission. Correspondingly, the AP1 affiliated with the AP MLD transmits an aggregated medium access control (MAC) protocol data unit (A-MPDU) after the SIFS at the end of the transmission. Finally, the STA1 affiliated with the non-AP MLD transmits a block acknowledgment (BlockAck). Here, the AP MLD and the non-AP MLD are both in EMLSR mode. As shown in FIG. 2B, for the BSRP trigger frame, AP1 affiliated with the AP MLD transmits BSRP triggers (Trigger) to STA1 affiliated with the non-AP MLD1, STA1 affiliated with the non-AP MLD2, and STA1 affiliated with the non-AP MLD n respectively. Correspondingly, the STA1 affiliated with the non-AP MLD, the STA1 affiliated with the non-AP MLD2, and the STA1 affiliated with the non-AP MLD n respectively perform a frame exchange process until the STA1 affiliated with the non-AP MLD, the STA1 affiliated with the non-AP MLD2, and the STA1 affiliated with the non-AP MLD n respectively transmit EHT TB PPDU 1 with acknowledgement, EHT TB PPDU 2 with acknowledgement, and EHT TB PPDU n with acknowledgement. Here, the AP MLD and the non-AP MLD are both in EMLSR mode.

Here, for the non-AP MLD in EMLSR mode, it is necessary to receive the MU-RTS trigger frame or the BSRP trigger frame, and after receiving the initial control frame of the frame exchange sequence (e.g., the MU-RTS trigger frame or the BSRP trigger frame), the non-AP MLD can transmit or receive frames on the link where the initial control frame is received, and cannot transmit or receive frames on other links in the EMLSR link until the frame exchange sequence ends. Furthermore, subject to the spatial stream capability, operation mode, and link switching latency, the non-AP MLD should be able to receive the physical layer protocol data unit (Physical Layer Protocol Data Unit, PPDU) transmitted using multiple spatial streams after a short interframe space (Short Interframe Space, SIFS) following the end of transmission of the response frame requested by the initial control frame. During the frame exchange sequence, the AP MLD should not transmit frames to the non-AP MLD on other links in the EMLSR link. After the frame exchange sequence ends, the non-AP MLD switches back (e.g., switches back immediately) to the listening operation on the enabled link.

Second, Sending and Transmission of a Multi-Link Groupcast Frame

Each AP affiliated with the AP MLD (the AP is also referred to as an affiliated AP corresponding to the AP MLD, or an AP corresponding to the AP MLD) needs to schedule the transmitting of (i.e., schedule and transmit) the cached groupcast frame immediately after receiving a delivery traffic indication map (Delivery Traffic Indication Map, DTIM) beacon frame, except for the following situation, which is that an affiliated TWT scheduling AP (Target Wake Time scheduling AP, TWT scheduling AP) of the AP MLD schedules and transmits the cached groupcast frame during the broadcast target wake time (Target Wake Time, TWT) service period within the beacon interval of transmitting the DTIM beacon frame.

The affiliated STA (also known as an affiliated station) of the non-AP MLD needs to follow the following operating rules and receive a multicast buffer unit (BU) transmitted by the affiliated AP corresponding to the AP MLD associated with the non-AP MLD on the corresponding link.

In a case where dot11FMSActivated is false (i.e., the flexible multicast service (Flexible Multicast Service, FMS) is not activated) and ReceiveDTIMs is true (i.e., the affiliated STA should wake up to receive all DTIM frames), the affiliated STA needs to wake up in advance, so that the affiliated STA may receive every non-STBC DTIM or every STBC DTIM transmitted by the AP in the basic service set (Basic Service Set, BSS) where the affiliated STA is located.

In a case where dot11FMSActivated is true (i.e., FMS is activated) and ReceiveDTIMs is true (i.e., the affiliated STA should wake up to receive all DTIM frames), as well as the affiliated STA has been licensed by the AP for the alternate delivery interval of the multicast stream, the affiliated STA needs to wake up before a non-STBC DTIM or STBC DTIM with an FMS counter field for the specific FMS stream and a current count value being zero.

If the cached groupcast frame indication of an affiliated AP related to an AP MLD in the traffic indication map (Traffic Indication Map, TIM) element is received by any station affiliated with the non-AP MLD (i.e., received by any affiliated station), then the affiliated station, which is affiliated with the non-AP MLD, is associated with the affiliated AP, and remains the awake state to receive the groupcast frame, needs to select to receive all groupcast frames that are scheduled and transmitted on the link where the affiliated AP is located.

It can be seen from the above that the listening operation (referred to as the second listening operation in the solutions of the present disclosure) of the non-AP MLD operating in EMLSR mode on the EMLSR link is defined. The second listening operation includes performing CCA and receiving the initial control frame transmitted by the AP MLD for initiating the frame exchange, for example, including a MU-RTS trigger frame or a BSRP trigger frame.

The characteristics of the second listening operation are that: affiliated stations, corresponding to all links in the EMLSR link that are in the awake state, of the non-AP MLD are in the listening state; and the capability of the second listening operation is limited, except for CCA, and the initial control frame such as the MU-RTS trigger frame or BSRP trigger frame that can be received, other types of frames cannot be received normally due to the limitations of the modulation and coding scheme (Modulation and Coding Scheme, MCS)/rate/spatial stream (Spatial Stream, SS)/bandwidth (Bandwidth, BW) capability.

Therefore, in a scenario where the AP MLD supports the EMLSR mode and there exists the non-AP MLD associated with itself and operating in the EMLSR mode, if the affiliated AP of the AP MLD located on the EMLSR link directly transmits a groupcast frame with video service data of relatively high order or more spatial streams (SS) without transmitting a MU-RTS control frame first, and the affiliated station (e.g., affiliated station A) of the non-AP MLD on the link (i.e., the link where the affiliated AP transmits the groupcast frame with the video service data of relatively high order or more SS) is the target receiving station of the groupcast frame. In this case, if the non-AP MLD is in the second listening operation, the affiliated station A cannot correctly receive the groupcast frame with the video service data of relatively high order or more SS due to the limitations of the coding rate/MCS/SS/BW processing capability of the received frame.

Based on this, for the frame processing problem that exists when the non-AP MLD is in the EMLSR mode and a station on the EMLSR link directly receives (e.g., directly receives without prior reception of a MU-RTS trigger frame) the groupcast frame with relatively high order or more SS, the present disclosure provides a mechanism for receiving the groupcast frame. The mechanism may support the AP MLD in the EMLSR mode to transmit the groupcast frame, while ensuring that the non-AP MLD normally receives the groupcast frame with relatively high order or more SS in the EMLSR mode. Moreover, the present disclosure also proposes the listening operation of the non-AP MLD in the EMLSR link to satisfy the reception of the groupcast frame in special scenarios.

The embodiments of the present disclosure provide a communication method, and the method includes:
performing, by a first multi-link device (MLD), a first listening operation, where the first listening operation is used for a first station on the first MLD to receive a groupcast frame using a first receiving capability.

In some embodiments, the first receiving capability is greater than or equal to a second receiving capability, and the second receiving capability is a receiving capability adopted by the first station when the first MLD performs a second listening operation.

In some embodiments, where performing, by the first multi-link device (MLD), the first listening operation, includes:
performing, by the first MLD, the first listening operation based on first information.

In some embodiments, the first information is used for the first MLD to perform the first listening operation at a target time or before the target time.

In some embodiments, the target time includes a first time point, and the first time point includes at least one of:
an expected groupcast frame transmission time point;
a target beacon transmission time (TBTT) of an expected delivery traffic indication map (DTIM) beacon frame;
a start time of a broadcast target wake time (TWT) service period (SP) for expected transmission of the groupcast frame;
a TBTT of a non-space-time block coding (non-STBC) DTIM beacon frame with a current count value of a flexible multicast service (FMS) counter field of a specific FMS stream being zero; or
a start time of a groupcast with retries (GCR) service period for expected transmission of the groupcast frame.

In some embodiments, the first time point is received in advance by the first MLD.

In some embodiments, the first information is a delivery traffic indication map (DTIM) beacon frame, and the DTIM beacon frame is used for the first MLD to perform the first listening operation at a target time or before the target time.

In some embodiments, the target time includes a second time point, and the second time point includes an expected groupcast frame transmission time point after receiving the DTIM beacon frame; and the DTIM beacon frame is received by the first MLD under a second listening operation.

In some embodiments, where performing, by the first MLD, the first listening operation based on the first information, includes:
switching, by the first MLD, from the second listening operation to the first listening operation at the second time point or before the second time point, where the second listening operation is performed by the first MLD before a target beacon transmission time (TBTT) of the DTIM beacon frame expected to be transmitted.

In some embodiments, the first information is determined based on a first indication, and the first indication is used to indicate whether to perform the first listening operation in a case where the groupcast frame needs to be received.

In some embodiments, the first indication is used to uniformly indicate whether the first MLD corresponding to an access point (AP) performs the first listening operation in a case where the groupcast frame needs to be received; and
the access point (AP) is an AP corresponding to a second MLD associated with the first MLD, and the AP corresponding to the second MLD includes at least one of:
an AP affiliated with the second MLD, or an AP indicated by a basic service set identifier (BSSID) in a multiple BSSID set where the AP affiliated with the second MLD is located.

In some embodiments, a value of the first indication is a first value, for uniformly indicating the first MLD corresponding to the access point (AP) to perform the first listening operation in a case where the groupcast frame needs to be received; or
the value of the first indication is a second value, for uniformly indicating that the first MLD corresponding to the access point (AP) does not need to perform the first listening operation in a case where the groupcast frame needs to be received.

In some embodiments, the first indication is carried by an enhanced multi-link single radio (EMLSR) operation indicator element.

In some embodiments, the first indication is carried by a first field in an EMLSR operation indicator element.

In some embodiments, the first field includes a second indication; and
in a case where a value of the second indication is a third value, the first field includes the first indication.

In some embodiments, the first indication is an EMLSR operation for all indicator.

In some embodiments, a position of each bit in the first indication is used to indicate an access point (AP); the access point (AP) is an AP corresponding to a second MLD associated with the first MLD; and the AP corresponding to the second MLD includes at least one of: an AP affiliated with the second MLD, or an AP indicated by a basic service set identifier (BSSID) in a multiple BSSID set where the AP affiliated with the second MLD is located; and
a value of each bit in the first indication is used to indicate whether the first MLD corresponding to the access point (AP) performs the first listening operation in a case where the groupcast frame needs to be received.

In some embodiments, the value of each bit in the first indication is a fourth value, for indicating the first MLD corresponding to the access point (AP) to perform the first listening operation in a case where the groupcast frame needs to be received; or the value of each bit in the first indication is a fifth value, for indicating that the first MLD corresponding to the access point (AP) does not need to perform the first listening operation in a case where the groupcast frame needs to be received.

In some embodiments, the first indication is carried by an enhanced multi-link single radio (EMLSR) operation indicator element.

In some embodiments, the first indication is carried by a second field in an EMLSR operation indicator element.

In some embodiments, the second field is a partial EMLSR operation indicator bitmap, and the partial EMLSR operation indicator bitmap is formed by intercepting part of continuous bits in the EMLSR operation indicator bitmap.

In some embodiments, the EMLSR operation indicator element includes a first field; and in a case where a value of a second indication in the first field is a sixth value, the first field includes a third indication, and the third indication is used to indicate a position of the part of continuous bits intercepted from the EMLSR operation indicator bitmap.

In some embodiments, the third indication is a bitmap offset.

In some embodiments, the second indication is an EMLSR operation for all indicator present, where the EMLSR operation for all indicator present is used to indicate whether the first field includes the EMLSR operation for all indicator.

In some embodiments, the first field is an EMLSR operation indicator bitmap control.

In some embodiments, the EMLSR operation indicator element is carried by a management frame.

In some embodiments, the management frame includes a traffic indication map (TIM) beacon frame.

In some embodiments, the method further includes:

receiving, by the first MLD, the management frame.

In some embodiments, the first information is a target initial control frame, used for informing that the groupcast frame is transmitted after the target initial control frame.

In some embodiments, the target initial control frame includes an indication duration, and the indication duration is a maximum available duration for the first MLD to switch to the first listening operation.

In some embodiments, the target initial control frame is a variant multi-user request to transmit (MU-RTS) trigger frame.

In some embodiments, a value of a trigger type subfield of the variant MU-RTS trigger frame is different from a value of a trigger type subfield of the MU-RTS trigger frame.

In some embodiments, the method further includes:

receiving, by the first MLD, the target initial control frame, where the target initial control frame is transmitted by a second MLD when the first MLD is required to perform the first listening operation, and the second MLD is an MLD associated with the first MLD.

In some embodiments, where performing, by the first multi-link device (MLD), the first listening operation, includes:

switching, by the first multi-link device (MLD), from a second listening operation to the first listening operation; or maintaining, by the first multi-link device (MLD), the first listening operation.

In some embodiments, the first receiving capability includes at least one of: a first rate, a first modulation and coding strategy (MCS), a first spatial stream (SS), or a first bandwidth (BW); and/or the second receiving capability includes at least one of: a second rate, a second modulation and coding strategy (MCS), a second spatial stream (SS), or a second bandwidth (BW); or the second receiving capability is a receiving capability of the first station under a second listening operation;

where the first rate is greater than or equal to the second rate; the first MCS is better than or equal to the second MCS; the first SS is greater than or equal to the second SS; and the first BW is greater than or equal to the second BW.

In some embodiments, the second listening operation is used for a target station on the first MLD to listen to a link corresponding to the target station, where the target station is a station in an awake state on the first MLD, and the target station has the second receiving capability; and the second receiving capability includes at least one of: performing a clear channel assessment (CCA), or receiving an initial control frame for initiating a frame exchange.

In some embodiments, the method further includes:

receiving, by the first MLD, the groupcast frame through the first station using the first receiving capability.

In some embodiments, the groupcast frame received by using the first receiving capability is carried by a physical layer protocol data unit (PPDU), and the PPDU includes at least one of:

an orthogonal frequency division multiplexing (OFDM) physical layer protocol data unit (PPDU);

a non-high throughput (non-HT) duplicate (DUP) PPDU;

a very high throughput (VHT) PPDU;

a high throughput (HT) PPDU;

a high efficiency (HE) single user (SU) PPDU; or a PPDU, including an extremely high throughput (EHT) multi-user (MU) PPDU, supported by an extremely high throughput (EHT) station (STA).

In some embodiments, the method further includes:

switching, by the first MLD, from the first listening operation to the second listening operation in a case where the groupcast frame is received completely.

In some embodiments, the first station is a station corresponding to a first link on the first MLD, and the first station is used to listen to the first link; and the first link is a link for transmitting the groupcast frame.

In some embodiments, the first MLD is an MLD operating in an enhanced multi-link single radio (EMLSR) mode, and the first link is a link in the EMLSR link.

In some embodiments, the first MLD is a non-access point (non-AP) MLD.

In some embodiments, in a case where performing the first listening operation by the first multi-link device (MLD) is maintaining the first listening operation by the first multi-link device (MLD), the first listening operation is further used for a second station to listen to a second link in the EMLSR link, the second station is a station on the first MLD, and the second link is a link in the EMLSR link other than the first link; or in a case where performing the first listening operation by the first multi-link device (MLD) is switching from a second listening operation to the first listening operation by the first multi-link device, the first listening operation enables the second station not to perform listening.

The embodiments of the present disclosure provide a communication method, and the method includes:

transmitting, by a second multi-link device (MLD), first information, where the first information is used for a first multi-link device (MLD) to perform a first listening operation, and the first listening operation is used for a first station on the first MLD to receive a groupcast frame using a first receiving capability.

In some embodiments, the first receiving capability is greater than or equal to a second receiving capability, the second receiving capability is a receiving capability adopted by the first station on the first MLD indicated by a second listening operation, and the second listening operation is a listening operation that the first MLD is capable of performing.

In some embodiments, the first information is used for the first MLD to perform the first listening operation at a target time or before the target time.

In some embodiments, the target time includes a first time point, and the first time point includes at least one of:

an expected groupcast frame transmission time point;

a target beacon transmission time (TBTT) of an expected delivery traffic indication map (DTIM) beacon frame;

a start time of a broadcast target wake time (TWT) service period (SP) for expected transmission of the groupcast frame;

a TBTT of a non-space-time block coding (non-STBC) DTIM beacon frame with a current count value of a flexible multicast service (FMS) counter field of a specific FMS stream being zero; or a start time of a groupcast with retries (GCR) service period for expected transmission of the groupcast frame.

In some embodiments, the first time point is determined by the second MLD.

In some embodiments, the first information is a delivery traffic indication map (DTIM) beacon frame, and the DTIM beacon frame is used for the first MLD to perform the first listening operation at a target time or before the target time.

In some embodiments, the target time includes a second time point, and the second time point includes an expected groupcast frame transmission time point after the first MLD receives the DTIM beacon frame; and the DTIM beacon frame is received by the first MLD under a second listening operation.

In some embodiments, the DTIM beacon frame is used for the first MLD to switch from the second listening operation to the first listening operation at the second time point or before the second time point.

In some embodiments, the first information is determined based on a first indication, and the first indication is used to indicate whether to perform the first listening operation in a case where the groupcast frame needs to be received.

In some embodiments, the first indication is used to uniformly indicate whether the first MLD corresponding to an access point (AP) performs the first listening operation in a case where the groupcast frame needs to be received;

the access point (AP) is an AP corresponding to a second MLD associated with the first MLD, and the AP corresponding to the second MLD includes at least one of:

an AP affiliated with the second MLD, or an AP indicated by a basic service set identifier (BSSID) in a multiple BSSID set where the AP affiliated with the second MLD is located.

In some embodiments, a value of the first indication is a first value, for uniformly indicating the first MLD corresponding to the access point (AP) to perform the first listening operation in a case where the groupcast frame needs to be received; or the value of the first indication is a second value, for uniformly indicating that the first MLD corresponding to the access point (AP) does not need to perform the first listening operation in a case where the groupcast frame needs to be received.

In some embodiments, the first indication is carried by an enhanced multi-link single radio (EMLSR) operation indicator element.

In some embodiments, the first indication is carried by a first field in an EMLSR operation indicator element.

In some embodiments, the first field includes a second indication; and in a case where a value of the second indication is a third value, the first field includes the first indication.

In some embodiments, the first indication is an EMLSR operation for all indicator.

In some embodiments, a position of each bit in the first indication is used to indicate an access point (AP); the access point (AP) is an AP corresponding to a second MLD associated with the first MLD; and the AP corresponding to the second MLD includes at least one of: an AP affiliated with the second MLD, or an AP indicated by a basic service set identifier (BSSID) in a multiple BSSID set where the AP affiliated with the second MLD is located; and a value of each bit in the first indication is used to indicate whether the first MLD corresponding to the access point (AP) performs the first listening operation in a case where the groupcast frame needs to be received.

In some embodiments, the value of each bit in the first indication is a fourth value, for indicating the first MLD corresponding to the access point (AP) to perform the first listening operation in a case where the groupcast frame needs to be received; or the value of each bit in the first indication is a fifth value, for indicating that the first MLD corresponding to the access point (AP) does not need to perform the first listening operation in a case where the groupcast frame needs to be received.

In some embodiments, the first indication is carried by an enhanced multi-link single radio (EMLSR) operation indicator element.

In some embodiments, the first indication is carried by a second field in an MLSR operation indication element.

In some embodiments, the second field is a partial EMLSR operation indicator bitmap, and the partial EMLSR operation indicator bitmap is formed by intercepting part of continuous bits in the EMLSR operation indicator bitmap.

In some embodiments, the MLSR operation indication element includes a first field; and in a case where a value of a second indication in the first field is a sixth value, the first field includes a third indication, and the third indication is used to indicate a position of the part of continuous bits intercepted from the EMLSR operation indicator bitmap.

In some embodiments, the third indication is a bitmap offset.

In some embodiments, the second indication is an EMLSR operation for all indicator present, and the EMLSR operation for all indicator present is used to indicate whether the first field includes the EMLSR operation for all indicator.

In some embodiments, the first field is an EMLSR operation indicator bitmap control.

In some embodiments, the EMLSR operation indicator element is carried by a management frame.

In some embodiments, the management frame includes a traffic indication map (TIM) beacon frame.

In some embodiments, the first information is a target initial control frame, used for informing that the groupcast frame is transmitted after the target initial control frame.

In some embodiments, the target initial control frame includes an indication duration, and the indication duration is a maximum available duration for the first MLD to switch to the first listening operation.

In some embodiments, the target initial control frame is a variant multi-user request to transmit (MU-RTS) trigger frame.

In some embodiments, a value of a trigger type subfield of the variant MU-RTS trigger frame is different from a value of a trigger type subfield of the MU-RTS trigger frame.

In some embodiments, the first receiving capability includes at least one of: a first rate, a first modulation and coding strategy (MCS), a first spatial stream (SS), or a first bandwidth (BW); and/or the second receiving capability includes at least one of: a second rate, a second modulation and coding strategy (MCS), a second spatial stream (SS), or a second bandwidth (BW); or the second receiving capability is a receiving capability of the first station under a second listening operation;

where the first rate is greater than or equal to the second rate; the first MCS is better than or equal to the second MCS; the first SS is greater than or equal to the second SS; and the first BW is greater than or equal to the second BW.

In some embodiments, the second listening operation is used for a target station on the first MLD to listen to a link corresponding to the target station, where the target station is a station in an awake state on the first MLD, and the target station has the second receiving capability; and the second receiving capability includes at least one of: performing a clear channel assessment (CCA), or receiving an initial control frame for initiating a frame exchange.

In some embodiments, the method further includes:

transmitting, by the second MLD, the groupcast frame at a time point of:

an expected groupcast frame transmission time point;

a time point after a delivery traffic indication map (DTIM) beacon frame is transmitted;

a time point within a broadcast target wake time (TWT) service period (SP);

a time point after a TBTT of a non-space-time block coding (non-STBC) DTIM beacon frame with a current count value of a flexible multicast service (FMS) counter field of a specific FMS stream being zero; or within a groupcast with retries (GCR) service period.

In some embodiments, the groupcast frame is carried by a physical layer protocol data unit (PPDU), and the PPDU includes at least one of:

an orthogonal frequency division multiplexing (OFDM) physical layer protocol data unit (PPDU);

a non-high throughput (non-HT) duplicate (DUP) PPDU;

a very high throughput (VHT) PPDU;

a high throughput (HT) PPDU;

a high efficiency (HE) single user (SU) PPDU; or a PPDU, including an extremely high throughput (EHT) multi-user (MU) PPDU, supported by an extremely high throughput (EHT) station (STA).

In some embodiments, the first station is a station corresponding to a first link on the first MLD, and the first station is used to listen to the first link; and the first link is a link for transmitting the groupcast frame.

In some embodiments, the first MLD and the second MLD are MLDs operating in an enhanced multi-link single radio (EMLSR) mode, and the first link is a link in the EMLSR link.

In some embodiments, the second MLD is an access point (AP) MLD, and the first MLD is a non-access point (non-AP) MLD corresponding to the AP MLD.

In some embodiments, in a case where performing the first listening operation by the first multi-link device (MLD) is maintaining the first listening operation by the first multi-link device (MLD), the first listening operation is further used for a second station to listen to a second link in the EMLSR link, the second station is a station on the first MLD, and the second link is a link in the EMLSR link other than the first link; or in a case where performing the first listening operation by the first multi-link device (MLD) is switching from a second listening operation to the first listening operation by the first multi-link device, the first listening operation enables the second station not to perform listening.

FIG. 3 is a schematic flowchart of a communication method 300, in accordance with an embodiment of the present disclosure. The method may optionally be applied to the system shown in FIG. 1, but is not limited thereto. The method includes at least part of the following.

In S310, a first multi-link device (MLD) performs a first listening operation. The first listening operation is used for a first station on the first MLD to receive a groupcast frame using a first receiving capability.

In an implementation, the first station is an affiliated station of the first MLD. Exemplarily, the first station is a station on the first MLD corresponding to the first link, and the first station is used to listen to the first link. That is, the first listening operation is used for the first station to be in a listening state to listen to the channel state of the first link. Here, the first station may also be referred to as a listening station. The first link is a link for transmitting the groupcast frame.

In an implementation, the first MLD is an MLD operating in an enhanced multi-link single radio (EMLSR) mode, and accordingly, the first link is a link in an EMLSR link.

In an implementation, the first MLD is a non-access point (non-AP) MLD. For example, the first MLD is a non-AP MLD operating in the EMLSR mode and associated with an AP MLD (e.g., a second MLD).

That is to say, S310 is exemplarily that the non-AP MLD operating in the EMLSR mode performs the first listening operation. The first listening operation is used for the first station (i.e., a listening station) on the non-AP MLD to listen to the first link in the EMLSR link, so that the first station may receive a groupcast frame through the first link and using the first receiving capability. Here, the first link may be a link for transmitting a groupcast frame by the AP MLD associated with the non-AP MLD. Here, the AP MLD also operates in the EMLSR mode. Furthermore, the access point (AP) (i.e., affiliated AP) on the AP MLD may transmit a groupcast frame to the first station affiliated with the non-AP MLD through the first link.

For example, two ends of a link in the EMLSR link correspond to a station on the non-AP MLD and an affiliated AP on the AP MLD, respectively; the affiliated AP transmits a groupcast frame through this link, and accordingly, the station receives the groupcast frame through this link. That is to say, for a station, a single station corresponds to one link, and also corresponds to one AP. The AP transmits the groupcast frame through its corresponding link, and accordingly, the station receives the groupcast frame through its corresponding link. That is, the station, link and AP can correspond one by one.

In an implementation, the first receiving capability is greater than or equal to a second receiving capability, and the second receiving capability is a receiving capability adopted by the first station when the first MLD performs a second listening operation. The first receiving capability may greater than the second receiving capability.

In a specific example, the first receiving capability is a receiving capability in the EMLSR mode. That is, the first receiving capability is a receiving capability of the first station affiliated with the first MLD in the EMLSR mode. Accordingly, the second receiving capability is also a receiving capability in the EMLSR mode. That is, the second receiving capability is a receiving capability of the first station affiliated with the first MLD in the EMLSR mode.

In an implementation, the first receiving capability includes at least one of: a first rate, a first modulation and coding strategy (MCS), a first spatial stream (SS), or a first bandwidth (BW).

In another implementation, the second receiving capability includes at least one of: a second rate, a second modulation and coding strategy (MCS), a second spatial stream (SS), or a second bandwidth (BW); and the second receiving capability is a receiving capability of the first station under the second listening operation.

Here, the first rate is greater than or equal to the second rate; the first MCS is better than or equal to the second MCS; the first SS is greater than or equal to the second SS; and the first BW is greater than or equal to the second BW.

It should be noted that the solutions of the present disclosure do not limit the number of parameters included in the first receiving capability (or the second receiving capability). For example, the parameters may be one, two, or more of the above parameters. Accordingly, the parameters included in the first receiving capability may be the same as or different from the parameters included in the second receiving capability, the number of parameters included in the first receiving capability may be the same as or different from the number of parameters included in the second receiving capability, and the solutions of the present disclosure do not limit these.

It may be understood that, if at least one parameter (at least one of the above parameters) in the first receiving capability is greater than respective parameter(s) of the second receiving capability, it may be considered that the first receiving capability is greater than the second receiving capability. For example, the first rate included in the first receiving capability is greater than the second rate included in the second receiving capability; and in a case where the first receiving capability further includes other parameters, even if the other parameters included in the first receiving capability are equal to respective parameters included in the second receiving capability, it may be considered that the first receiving capability is greater than or superior to the second receiving capability. For example, the first SS included in the first receiving capability is equal to the second SS included in the second receiving capability; and in this case, since the first rate included in the first receiving capability is greater than the second rate included in the second receiving capability, it may still be considered that the first receiving capability is greater than the second receiving capability.

In an implementation, all parameters included in the first receiving capability are greater than (or superior to) respective parameters of the second receiving capability. Thus, it ensures that a groupcast frame may be received in more scenarios. Exemplarily, since the first station on the first MLD has the first receiving capability (or has a better first receiving capability), even without receiving the initial control frame (e.g., the MU-RTS trigger frame) in advance, it is still possible to receive a groupcast frame that is transmitted by using a relatively high capability. For example, it is still possible to receive a groupcast frame transmitted by the second MLD using a relatively high rate, or a relatively high MCS (also called a better MCS), or a relatively high BW, or more SS.

In an implementation, under the first listening operation, only the first station on the first MLD is in the listening state, and other stations on the first MLD cannot enter the listening state, i.e., do not have the ability to receive or transmit frames.

Alternatively, in another implementation, the first MLD further includes a second station; the first listening operation is further used for the second station to listen to a second link in the EMLSR link (that is, the second station is in the listening state), and the second link is a link in the EMLSR link other than the first link; and furthermore, the second station also has the first receiving capability. That is, in a case where the first station has the first receiving capability under the first listening operation, the second station on the first MLD may also be in the listening state to listen to another link except the first link. In this case, the second station may also have the first receiving capability.

Exemplarily, in a case where performing the first listening operation by the first multi-link device (MLD) is maintaining the first listening operation by the first multi-link device (MLD), the first listening operation is further used for the second station to listen to the second link in the EMLSR link. The second station is a station on the first MLD, and the second link is a link in the EMLSR link other than the first link. Alternatively, in a case where performing the first listening operation by the first multi-link device (MLD) is switching from a second listening operation to the first listening operation by the first multi-link device, the first listening operation enables the second station not to perform listening.

It may be understood that, in this implementation, in a case where the first station has the first receiving capability under the first listening operation, there may be one or more second stations in the awake state on the first MLD, which are not limited in the present disclosure. For example, in the case where the first station has the first receiving capability under the first listening operation, all second stations in the awake state on the first MLD may be in the listening state, and all the second stations have the first receiving capability. It may be understood that, in this case, the receiving capabilities of the first station and the second station may also be different. For example, the second station has a second receiving capability, or another receiving capability. The solutions of the present disclosure do not limit this, and as long as the first station is in the first receiving capability and can receive the groupcast frame normally, they are all within the protection scope of the present disclosure.

For example, the first listening operation (i.e., the first listening operation in the EMLSR mode) may exemplarily mean that, an affiliated station (abbreviated as a listening station, e.g., the first station), on the non-AP MLD operating in the EMLSR mode, corresponding to a specific link (e.g., the first link) in the EMLSR link is able to receive a groupcast frame that is transmitted by using a relatively high rate/relatively high MCS/more SS/relatively high BW.

It is worth noting that the relatively high rate/relatively high MCS/more SS/relatively high BW described in solutions of the present disclosure refers to at least one or more of the relatively high rate, relatively high MCS, more SS and relatively high BW, i.e., at least one of them.

Furthermore, there are two situations for the first listening operation of the non-AP MLD entering the EMLSR mode.

In Case 1, under the first listening operation, the affiliated station (e.g., the first station) is able to enter the listening state corresponding to the frame exchange processing of the specific link (e.g., the first link) in the EMLSR link; that is, under the first listening operation, the frame receiving capability (also referred to as the frame processing capability) of the affiliated station (e.g., the first station) corresponding to the specific link (e.g., the first link) is consistent with the frame exchange processing capability of the specific link, which means that the groupcast frame that is transmitted by using the relatively high rate/relatively high MCS/more SS/relatively high BW can be received. Moreover, in this state, other than the specific link (e.g., the first link), other links in the EMLSR link cannot perform listening. That is, no frames can be transmitted or received by links other than the specific link. For example, in this case, transceiver capabilities of the EMLSR link (e.g., the transceiver capabilities of other stations in the EMLSR link) may be merged into the first station by switching and merging the links, so that the first station has a relatively strong first receiving capability.

In Case 2, under the first listening operation, the affiliated station (e.g., the first station) corresponding to the specific link (e.g., the first link) in the EMLSR mode has the ability to receive a groupcast frame that is transmitted by using a relatively high rate/relatively high MCS/relatively high BW/more SS. Therefore, all affiliated stations (e.g., second stations) in the EMLSR link that are in the awake state may be kept in the listening state. In this case, the affiliated station (e.g., the second station) in the awake state may have the same or different receiving capability as the first station. The solutions of the present disclosure do not limit this, and as long as the first station has the ability to receive the groupcast frame that is transmitted by using the relatively high rate/relatively high MCS/relatively high BW/more SS, they are all within the protection scope of the present disclosure. It may be understood that, since the link switching and merging is not performed in this case, the receiving capability of the first station of this case may be weaker than the receiving capability after the link switching and merging.

In an implementation, the second listening operation is used for a target station on the first MLD (i.e., an affiliated station of the first MLD) to listen to a link corresponding to the target station. The target station is a station in an awake state on the first MLD, and the target station has the second receiving capability. For example, the second receiving capability includes at least one of: performing a clear channel assessment (CCA), or receiving an initial control frame for initiating a frame exchange. For another example, in a case where there are two or more target stations in the awake state on the first MLD, the second listening operation enables the two or more target stations on the first MLD to have the second receiving capability. That is to say, under the second listening operation, the affiliated station(s) in the awake state on the first MLD, such as one affiliated station, multiple affiliated stations, or all affiliated stations in the awake state, can all be in the listening state, and the affiliated station(s) in the listening state all have the second receiving capability, e.g., have a lower second receiving capability relative to the first receiving capability.

For example, the second listening operation (i.e., the first listening operation in the EMLSR mode) may exemplarily mean that, all the affiliated stations (i.e., the target stations) in the awake state, corresponding to the EMLSR link, on the non-AP MLD operating in the EMLSR mode are in the listening state; the receiving capability (i.e., the second receiving capability) of each station corresponding to the EMLSR link is limited, and except for being able to receive the initial control frame such as CCA or MU-RTS trigger frame, other types of frames cannot be correctly received due to limitations on capabilities such as rate/MCS/SS/BW.

In an implementation, the first MLD receives the groupcast frame through the first station using the first receiving capability. Further, the groupcast frame received by using the first receiving capability is carried by a physical layer protocol data unit (PPDU), and the PPDU includes at least one of:

an orthogonal frequency division multiplexing (OFDM) physical layer protocol data unit (PPDU);
  a non-high throughput (non-HT) duplicate (DUP) PPDU;
  a very high throughput (VHT) PPDU;
  a high throughput (HT) PPDU;
  a high efficiency (HE) single user (SU) PPDU; or
  a PPDU, including an extremely high throughput (EHT) multi-user (MU) PPDU, supported by an extremely high throughput (EHT) station (STA).

For example, an affiliated station (e.g., the first station) of the non-AP MLD operating in the EMLSR mode corresponding to a specific link (i.e., the first link) in the EMLSR link is able to receive a PPDU that is transmitted by using a relatively high rate/relatively high MCS/more spatial streams (SS)/relatively high BW. Here, the PPDU may be at least one of: OFDM PPDU, non-HT DUP PPDU, VHT PPDU, HT PPDU, HE SU PPDU, or PPDU including EHT MU PPDU supported by EHT STA. In this way, it is ensured that the non-AP MLD may correctly receive the PPDU using at least one of the following parameters and carrying a groupcast frame. The parameters include: the relatively high rate, relatively high MCS, more SS and relatively high BW.

In an implementation, the first MLD switches from the first listening operation to the second listening operation in a case where the groupcast frame is received completely. For example, in a case where the non-AP MLD completes the reception of the groupcast frame (for example, the non-AP MLD confirms the completion of the reception of the groupcast frame based on the indication), or in a case where the groupcast frame is transmitted within the broadcast TWT service period or the groupcast with retries (Groupcast With Retries, GCR) service period, the non-AP MLD switches from the first listening operation in the EMLSR mode to the second listening operation in the EMLSR mode when the end time point of the broadcast TWT service period or the GCR service period (SP) is reached and there is no groupcast frame being received.

In the solutions of the present disclosure, the first multi-link device (MLD) may perform the first listening operation in the following methods.

In Method 1, the first MLD performs the first listening operation based on first information. That is, S310 exemplarily includes: performing, by the first MLD, the first listening operation based on the first information. Furthermore, the first information is used for the first MLD to perform the first listening operation at a target time or before the target time. That is, S310 exemplarily includes: performing, by the first MLD, the first listening operation at the target time or before the target time based on the first information.

It may be understood that, in an example, the first information includes the target time. In this case, the first information is used for the first MLD to perform the first listening operation at the target time included in the first information or before the target time. Alternatively, in another example, the first information does not include the target time. In this case, the target time is received by the first MLD in advance. In this case, the first information is used for the first MLD to perform the first listening operation at the target time obtained in advance or before the target time. The solutions of the present disclosure do not limit whether the target time is carried in the first information, and as long as the first information enables the first MLD to perform the first listening operation at the target time or before the target time, they are all within the protection scope of the present disclosure.

In an implementation, step S310 exemplarily includes: switching from the second listening operation to the first listening operation by the first multi-link device (MLD); or maintaining the first listening operation by the first multi-link device (MLD). Further, step S310 exemplarily includes: switching from the second listening operation to the first listening operation by the first multi-link device (MLD) based on the first information; or maintaining the first listening operation by the first multi-link device (MLD) based on the first information.

In an implementation, the target time in the Method 1 includes a first time point, and the first time point may exemplarily include at least one of the followings:

(1) an expected groupcast frame transmission time point. In this case, the first MLD performs the first listening operation at the expected groupcast frame transmission time point or at a time point before the expected groupcast frame transmission time point; here, the expected groupcast frame transmission time point may be any time point agreed in advance, and the solutions of the present disclosure do not limit this;

(2) a target beacon transmission time (TBTT) of an expected delivery traffic indication map (DTIM) beacon frame. Here, the expected groupcast frame transmission time point is later than the TBTT of the DTIM beacon frame. In this case, the first MLD performs the first listening operation at the TBTT of the expected DTIM beacon frame or at a time point before the TBTT of the expected DTIM beacon frame;

(3) a start time of a broadcast target wake time (TWT) service period (SP) for expected transmission of the groupcast frame. Here, the expected groupcast frame transmission time point is within the TWT service period (SP). In this case, the first MLD performs the first listening operation at the start time of the broadcast target wake time (TWT) service period (SP) for the expected transmission of the groupcast frame or at a time point before the start time;

(4) a TBTT of a non-space-time block coding (non-STBC) DTIM beacon frame with a current count value of a flexible multicast service (FMS) counter field of a specific FMS stream being zero. Here, the expected groupcast frame transmission time point is later than the TBTT of the non-STBC DTIM beacon frame with the current count value of the FMS counter field of the specific FMS stream being zero. In this case, the first MLD performs the first listening operation at the TBTT of the non-STBC DTIM beacon frame with the current count value of the FMS counter field of the specific FMS stream being zero, or at a time point before the TBTT of the non-STBC DTIM beacon frame with the current count value of the FMS counter field of the specific FMS stream being zero; or (5) a start time of a groupcast with retries (GCR) service period for expected transmission of the groupcast frame. Here, the expected groupcast frame transmission time point is within the GCR service period. In this case, the first MLD performs the first listening operation at the start time of the groupcast with retries (GCR) service period for the expected transmission of the groupcast frame or at a time point before the start time.

For example, the non-AP MLD operating in the EMLSR mode performs the first listening operation at the expected groupcast frame transmission time point or before the expected groupcast frame transmission time point to listen to the link (i.e., the first link) where the groupcast frame is scheduled and transmitted in the EMLSR link. For example, the non-AP MLD operating in the EMLSR mode performs the first listening operation before the expected groupcast frame transmission time point to listen to the link (i.e., the first link) where the groupcast frame is scheduled and transmitted in the EMLSR link. Furthermore, in a case of performing the first listening operation, the non-AP MLD operating in the EMLSR mode may receive the groupcast frame through the first link, and switch to a second listening operation after confirming that the groupcast frame has been received. That is, in a case where the non-AP MLD is associated with an AP MLD that supports the EMLSR mode, and the non-AP MLD operates in the EMLSR mode on the EMLSR link, if the groupcast frame is scheduled and transmitted on a link (e.g., the first link) in the EMLSR link corresponding to the non-AP MLD, and a station (set as station A, i.e., the first station) on the non-AP MLD on the link (e.g., the first link) is ready to receive the groupcast frame, then the non-AP MLD needs to ensure entering the first listening operation at or before the expected groupcast frame transmission time point. Therefore, the station A listens to the link (i.e., the first link) that transmits the groupcast frame, so as to correctly receive the groupcast frame.

Further, for a transmitting terminal of the groupcast frame, a method for an AP affiliated with the AP MLD scheduling and transmitting the cached groupcast frame may adopt at least one of the following:

(1) the AP affiliated with the AP MLD schedules and transmits the cached groupcast frame at the expected groupcast frame transmission time point. Here, the expected groupcast frame transmission time point may be any time point agreed in advance, and the solutions of the present disclosure do not limit this;

(2) the AP affiliated with the AP MLD schedules and transmits the cached groupcast frame after transmitting the DTIM beacon frame. For example, the AP affiliated with the AP MLD schedules and transmits a cached groupcast frame after each DTIM beacon frame;

(3) the AP affiliated with the AP MLD schedules and transmits the cached groupcast frame within the broadcast TWT service period (SP). For example, one of APs affiliated with the AP MLD is a TWT scheduling AP, and the TWT scheduling AP schedules and transmits the cached groupcast frame within the broadcast TWT service period (SP) during the beacon interval where the DTIM beacon frame is transmitted;

(4) a specific flexible multicast service (FMS) is used to transmit the cached groupcast frame. For example, the cached groupcast frame is scheduled and transmitted at a time point after the TBTT of the non-STBC DTIM beacon frame with the current count value of the FMS counter field of the specific FMS stream being zero; or (5) GCR is used to transmit the cached groupcast frame. For example, the cached groupcast frame is scheduled and transmitted within the GCR service period.

For example, when the AP MLD schedules and transmits a cached groupcast frame after the DTIM beacon frame through a link (e.g., the first link) in the EMLSR link, the non-AP MLD operating in the EMLSR mode will first enter the first listening operation of the link (e.g., the first link) where the groupcast frame is scheduled and transmitted at or before the expected DTIM beacon frame TBTT, i.e., perform the first listening operation at or before the expected DTIM beacon frame TBTT to listen to the link (e.g., the first link) where the groupcast frame is scheduled and transmitted. Subsequently, after receiving the DTIM beacon frame, the non-AP MLD operating in the EMLSR mode maintains the first listening operation (i.e., maintains the frame exchange operation state) for the link (e.g., the first link) where the groupcast frame is scheduled and transmitted. That is, the non-AP MLD operating in the EMLSR mode maintains the first listening operation to maintain listening for the link (e.g., the first link) where the groupcast frame is scheduled and transmitted until the reception of the groupcast frame is completed. Furthermore, when the non-AP MLD receives an indication, for example, receives a groupcast frame with the more data subfield (More Data subfield) being 0 transmitted by the AP of the first link, the non-AP MLD confirms that there is no more groupcast frames. In this case, the non-AP MLD returns from the first listening operation (also referred to as the frame exchange operation) to the second listening operation in the EMLSR mode.

For another example, in a case where the AP MLD schedules and transmits a cached groupcast frame within the broadcast TWT service period or the GCR service period, the non-AP MLD operating in the EMLSR mode will first enter the first listening operation of the link (e.g., the first link) where the groupcast frame is scheduled and transmitted at or before the start time of the broadcast TWT service period or the GCR service period for the expected scheduling and transmitting of the groupcast frame, i.e., enter the first listening operation in advance to listen to the link (e.g., the first link) where the groupcast frame is scheduled and transmitted. Subsequently, after receiving the DTIM beacon frame, the non-AP MLD operating in the EMLSR mode maintains the first listening operation (i.e., maintains the frame exchange operation state) for the link (e.g., the first link) where the groupcast frame is scheduled and transmitted. That is, the non-AP MLD operating in the EMLSR mode maintains the first listening operation to maintain listening for the link (e.g., the first link) where the groupcast frame is scheduled and transmitted until the reception of the groupcast frame is completed. Furthermore, when the non-AP MLD receives an indication for confirming that there is no groupcast frame (that is, the groupcast frame has been received), the non-AP MLD returns from the first listening operation (i.e., the frame exchange operation) to the second listening operation in the EMLSR mode; or when the end time point of the broadcast TWT service period or the GCR service period (SP) is reached and there is no groupcast frame being received, the non-AP MLD returns from the first listening operation to the second listening operation in the EMLSR mode.

In an implementation, the first time point is received by the first MLD in advance. Exemplarily, the first time point is received by the first MLD from the associated second MLD in advance; more specifically, the first time point is received by the non-AP MLD from the associated AP MLD in advance, for example, received before S310, to ensure that the first MLD performs the first listening operation before the expected groupcast frame is transmitted. Thus, the first station listens to the link where the groupcast frame is scheduled and transmitted in the EMLSR link.

In Method 2, the first information is a delivery traffic indication map (DTIM) beacon frame, and the DTIM beacon frame is used for the first MLD to perform the first listening operation at a target time or before the target time. Furthermore, the difference from the Method 1 is that the target time includes a second time point in the Method 2. That is, the DTIM beacon frame is used for the first MLD to perform the first listening operation at or before the second time point.

It may be understood that, in an example, the DTIM beacon frame may include a target time (e.g., a second time point), i.e., carry the target time. In this case, the DTIM beacon frame is used for the first MLD to perform the first listening operation at the target time carried by the DTIM beacon frame or before the target time. Alternatively, in another example, the DTIM beacon frame does not include the target time, i.e., does not carry the target time. In this case, the target time is received by the first MLD in advance, and furthermore, the DTIM beacon frame is used for the first MLD to perform the first listening operation at the target time obtained in advance or before the target time. The solutions of the present disclosure do not limit whether the target time is carried in the DTIM beacon frame, and as long as the DTIM beacon frame enables the first MLD to perform the first listening operation at the target time or before the target time, they are all within the protection scope of the present disclosure.

In an implementation, the first MLD performs the second listening operation before the TBTT of the DTIM beacon frame expected to be transmitted. That is, the second listening operation is performed by the first MLD before the target beacon transmission time (TBTT) of the DTIM beacon frame expected to be transmitted. Further, performing the first listening operation by the first MLD based on the first information may exemplarily include: switching from the second listening operation to the first listening operation by the first MLD at the second time point or before the second time point. That is to say, in the Method 2, the first MLD performs the second listening operation before the TBTT of the DTIM beacon frame expected to be transmitted, receives the DTIM beacon frame under the second listening operation, and then switches from the second listening operation to the first listening operation at the second time point or before the second time point. In this way, the first station of the first MLD switches from a low second receiving capability to a high first receiving capability, thereby ensuring that the first station of the first MLD may normally receive groupcast frames.

Furthermore, the second time point includes an expected groupcast frame transmission time point after receiving the DTIM beacon frame. Here, the DTIM beacon frame is received by the first MLD under the second listening operation. That is to say, the expected groupcast frame transmission time point is after the time point of transmitting the DTIM beacon frame. In this case, the first MLD first receives the DTIM beacon frame, and then performs the first listening operation at the expected groupcast frame transmission time point after receiving the DTIM beacon frame, or before the expected groupcast frame transmission time point after receiving the DTIM beacon frame. It may be understood that the first listening operation may be performed by the first MLD at the time point at which the reception of the DTIM beacon frame is completed.

For example, in a case where a non-AP MLD operating in the EMLSR mode is ready to receive a groupcast frame on a link in the EMLSR link, the non-AP MLD operating in the EMLSR mode may first enter the second listening operation before the TBTT of the DTIM beacon frame. After receiving the DTIM beacon frame and before the time point of scheduling and transmitting the expected groupcast frame, the non-AP MLD operating in the EMLSR mode switches from the second listening operation to the first listening operation, so that the first station of the first MLD listens to the link (e.g., the first link) where the groupcast frame is scheduled and transmitted in the EMLSR link. Here, under the first listening operation, the first station has the first receiving capability, thereby ensuring that the groupcast frame may be received normally. Furthermore, under the first listening operation, the non-AP MLD receives the groupcast frame through the first station until the reception of the groupcast frame is completed. If the non-AP MLD receives an indication for confirming that there is no more groupcast frames, the reception is considered complete. Then, the non-AP MLD returns from the first listening operation (i.e., the frame exchange operation) to the second listening operation.

It may be understood that, after the AP MLD transmits the DTIM beacon frame on the EMLSR link and before the start time point of scheduling and transmitting the groupcast frame, it is necessary to reserve sufficient time. In this way, it may be ensured that the non-AP MLD that is associated with the AP MLD and operates in the EMLSR mode switches to the first listening operation of the link (e.g., the first link) where the groupcast frame is scheduled and transmitted in the EMLSR link after receiving the DTIM beacon frame and before or at the time point of transmitting the groupcast frame.

In Method 3, the first information is determined based on a first indication, and the first indication is used to indicate whether to perform the first listening operation in a case where a groupcast frame needs to be received. For example, the first indication is exemplarily used to indicate that the first listening operation is performed in a case where a groupcast frame needs to be received, or to indicate that the first listening operation does not need to be performed in a case where a groupcast frame needs to be received. Further, in the Method 3, the first indication may be expressed in the following two methods, which includes the follows.

First Method

The first indication is used to uniformly indicate whether the first MLD corresponding to the access point (AP) performs the first listening operation in a case where a groupcast frame needs to be received. Here, the access point (AP) is an AP corresponding to a second MLD associated with the first MLD, and the AP corresponding to the second MLD includes at least one of: an AP affiliated with the second MLD, or an AP indicated by a BSSID in a multiple basic service set identifier set (multiple Basic Service Set Identifier set, multiple BSSID set) where the AP affiliated with the second MLD is located.

For example, the first MLD corresponding to the access point (AP) may exemplarily be the first MLD corresponding to the first station that corresponds to the access point (AP). It may be understood that, two ends of the link (e.g., the link in the EMLSR link) respectively correspond to the first station on the first MLD and the access point (AP) corresponding to the second MLD, and the station, link and AP may correspond one by one. Based on this, the access point (AP) corresponds to the station, and the station corresponds to the first MLD.

It should be noted that, the first indication does not carry the target time, for example, does not carry the first time point, and the purpose of the first indication is to indicate whether the first listening operation needs to be performed in a case where a groupcast needs to be received. Based on this, the first time point may be obtained in advance by the first MLD through other methods, which are not limited in the present disclosure. Alternatively, in another case, the first indication not only indicates whether the first listening operation needs to be performed in a case where a groupcast needs to be received, but also may carry the target time, e.g., the first time point. In this case, the first MLD does not need to obtain the first time point in advance. In practical applications, any one of the above two methods may be executed, which is not limited in the present disclosure.

In an implementation, in a case where a value of the first indication is a first value (e.g., 1), the first MLD corresponding to the access point (AP) for all indicator performs the first listening operation in a case where a groupcast frame needs to be received.

Alternatively, in a case where the value of the first indication is a second value (e.g., 0), the first MLD corresponding to the access point (AP) for all indicator does not need to perform the first listening operation in a case where a groupcast frame needs to be received.

In an implementation, the first indication is carried by an EMLSR operation indicator element. Further, the first indication is carried by a first field in the EMLSR operation indicator element.

In an implementation, the first field includes a second indication; and in a case where a value of the second indication is a third value (e.g., 1), the first field includes the first indication.

In an implementation, the first field is an EMLSR operation indicator bitmap control. The first indication is an EMLSR operation for all indicator. Further, the second indication is an EMLSR operation for all indicator present. The EMLSR operation for all indicator present is used to indicate whether the first field (i.e., the EMLSR operation indicator bitmap control) includes the EMLSR operation for all indicator.

It may be understood that, in actual applications, the EMLSR operation indicator element may further include other fields, and the solutions of the present disclosure do not limit the fields included.

For example, Table 1 is an example of fields (also referred to as domains) included in the EMLSR operation indicator element in the first case; and Table 2 is an example of indications included in the EMLSR operation indicator bitmap control in the first case.

TABLE 1

| | Element ID | Length | Element ID Extension | EMLSR Operation Indicator Bitmap Control |
|---|---|---|---|---|
| Octet: | 1 | 1 | 1 | 1 |

TABLE 2

| | EMLSR Operation for ALL Indicator Present (Value: 1) | EMLSR Operation for ALL Indicator | Reserved |
|---|---|---|---|
| Bit: | 1 | 1 | 6 |

As shown in Table 1, the EMLSR operation indicator element includes element ID (Element ID), length (Length), and element ID extension (Element ID Extension). Here, the element ID, length, and element ID extension all occupy 1 octet, and the specific definition may be similar to that in the relevant standards.

Furthermore, the EMLSR operation indicator element further includes an EMLSR operation indicator bitmap control (EMLSR Operation Indicator Bitmap Control), which also occupies 1 octet.

As shown in Table 2, the EMLSR operation indicator bitmap control includes EMLSR operation for all indicator present (EMLSR Operation for ALL Indicator Present). In a case where the value of the EMLSR operation for all indicator present is 1, the EMLSR operation indicator bitmap control further includes EMLSR operation for all indicator (EMLSR Operation for ALL Indicator) and reserved (Reserved). Here, the EMLSR operation for all indicator present, EMLSR operation for all indicator and reserved occupy 1 bit, 1 bit and 6 bits, respectively. Based on this, the EMLSR operation for all indicator present, the EMLSR operation for all indicator and the reserved that are included the EMLSR operation indicator bitmap control occupy one octet in total.

Here, the EMLSR operation for all indicator (referred to as EMLSR operation for all indicator domain, i.e., the first indication) is used to uniformly indicate the non-AP MLD operating in the EMLSR mode corresponding to the AP, whether performs the first listening operation in a case where a groupcast frame needs to be received. The first listening operation is used for the first station, corresponding to the AP, on the non-AP MLD to have the first receiving capability, so that the first station listens to the link where the AP is located. That is, the EMLSR operation for all indicator is used to uniformly indicate the non-AP MLD operating in the EMLSR mode corresponding to the AP whether to perform, in a case where a groupcast frame needs to be received, the first listening operation with a receiving capability (i.e., the first receiving capability) of a relatively high rate/relatively high MCS/more SS/relatively high BW on the link (e.g., the first link) where the AP is located.

The AP is at least one of: an AP affiliated with the AP MLD, or an AP indicated by a BSSID in a multiple BSSID set where the AP affiliated with the AP MLD is located. The non-AP MLD is associated with the AP MLD.

It may be understood that the non-AP MLD operating in the EMLSR mode corresponding to the AP may exemplarily be the non-AP MLD operating in the EMLSR mode corresponding to the station (e.g., the first station) that corresponds to the AP.

Furthermore, in a case where a value of the EMLSR operation for all indicator is 1, which means that the non-AP MLD operating in the EMLSR mode corresponding to the AP performs the first listening operation with the receiving capability (i.e., the first receiving capability) of the relatively high rate/relatively high MCS/more spatial streams (SS)/ relatively high BW on the link (e.g., the first link) where the AP is located, in a case where a groupcast frame needs to be received.

In a case where the value of the EMLSR operation for all indicator is 0, which means that the non-AP MLD operating in the EMLSR mode corresponding to the AP does need to perform the first listening operation with the receiving capability (i.e., the first receiving capability) of the relatively high rate/relatively high MCS/more spatial streams (SS)/ relatively high BW on the link (e.g., the first link) where the AP is located, in a case where a groupcast frame needs to be received.

In an implementation, the EMLSR operation indicator element is carried by a management frame. In this case, the first information may exemplarily be the management frame. Furthermore, the first MLD receives the management frame. Exemplarily, before S310, the first MLD receives the management frame. For example, the first MLD receives the management frame transmitted by the second MLD, so that the first listening operation is performed based on the management frame. Here, in an example, the management frame includes a traffic indication map (TIM) beacon frame.

Second Method

A position of each bit in the first indication is used to indicate an access point (AP).

A value of each bit in the first indication is used to indicate whether the first MLD corresponding to the access point (AP) performs the first listening operation in a case where a groupcast frame needs to be received.

Here, the access point (AP) is an AP corresponding to the second MLD associated with the first MLD; and the AP corresponding to the second MLD includes at least one of: an AP affiliated with the second MLD, or an AP indicated by a BSSID in a multiple BSSID set where the AP affiliated with the second MLD is located.

For example, the first MLD corresponding to the access point (AP) may exemplarily be the first MLD corresponding to the first station that corresponds to the access point (AP). It may be understood that, two ends of the link (e.g., the link in the EMLSR link) respectively correspond to the first station on the first MLD and the access point (AP) corresponding to the second MLD, and the station, link and AP may correspond one by one. Based on this, the access point (AP) corresponds to the station, and the station corresponds to the first MLD.

It should be noted that, the first indication does not carry the target time, for example, does not carry the first time point, and the purpose of the first indication is to indicate whether the first listening operation needs to be performed in a case where a groupcast needs to be received. Based on this, the first time point may be obtained in advance by the first MLD through other methods, which are not limited in the present disclosure. Alternatively, in another case, the first indication not only indicates whether the first listening operation needs to be performed in a case where a groupcast needs to be received, but also may carry the target time, e.g., the first time point. In this case, the first MLD does not need to obtain the first time point in advance. In practical applications, any one of the above two methods may be executed, which is not limited in the present disclosure.

In an implementation, in a case where the value of each bit in the first indication is a fourth value (e.g., 1), it is used to indicate the first MLD corresponding to the access point (AP) to perform the first listening operation in a case where a groupcast frame needs to be received.

Alternatively, in a case where the value of each bit in the first indication is a fifth value (e.g., 0), it is used to indicate the first MLD corresponding to the access point (AP) does not need to perform the first listening operation in a case where a groupcast frame needs to be received.

In an implementation, the first indication is carried by an EMLSR operation indicator element. Further, the first indication is carried by a second field in the EMLSR operation indicator element.

In an implementation, the second field is a partial EMLSR operation indicator bitmap, and the partial EMLSR operation indicator bitmap is formed by intercepting part of continuous bits in the EMLSR operation indicator bitmap.

In an implementation, the EMLSR operation indicator element includes a first field. In a case where a value of the second indication in the first field is a sixth value (for example, 0), the first field includes a third indication, and the third indication is used to indicate the position of the part of continuous bits intercepted from the EMLSR operation indicator bitmap. In an implementation, the third indication is a bitmap offset. In this way, the partial EMLSR operation indicator bitmap may be intercepted from the EMLSR operation indicator bitmap based on the bitmap offset.

In an implementation, the first field is an EMLSR operation indicator bitmap control. The first indication is an EMLSR operation for all indicator. Further, the second indication is an EMLSR operation for all indicator present. The EMLSR operation for all indicator present is used to indicate whether the first field (i.e., the EMLSR operation indicator bitmap control) includes the EMLSR operation for all indicator. For example, in a case where the value of the EMLSR operation for all indicator present is a third value (e.g., 1), the EMLSR operation indicator bitmap control includes the EMLSR operation for all indicator, and in this case, the EMLSR operation indicator bitmap control may further include reserved. In this case, the EMLSR operation for all indicator is used to uniformly indicate whether the corresponding first MLD needs to perform the first listening operation. Furthermore, in a case where the value of the EMLSR operation for all indicator present is a sixth value (e.g., 0), the EMLSR operation indicator bitmap control includes the bitmap offset. In this case, the EMLSR operation indicator element further needs to include the partial EMLSR operation indicator bitmap, and then the partial EMLSR operation indicator bitmap is used to indicate whether the corresponding first MLD needs to perform the first listening operation.

It may be understood that, in actual applications, the EMLSR operation indicator element may further include other fields, and the solutions of the present disclosure do not limit the fields included.

It may be understood that the above-mentioned first value and second value to sixth value are only a specific example. In actual applications, the first value and second value to sixth value may also take other values, such as 2, 3 or 10, and the solutions of the present disclosure do not limit this.

For example, Table 3 is an example of fields (also referred to as domains) included in the EMLSR operation indicator element in the second case; and Table 4 is an example of indications included in the EMLSR operation indicator bitmap control in the second case.

TABLE 3

| | Element ID | Length | Element ID Extension | EMLSR Operation Indicator Bitmap Control | Partial EMLSR Operation Indicator Bitmap |
|---|---|---|---|---|---|
| Octet: | 1 | 1 | 1 | 1 | 1-251 |

28

TABLE 4

| | EMLSR Operation for ALL Indicator Present (Value: 0) | Bitmap Offset |
|---|---|---|
| Bit: | 1 | 7 |

As shown in Table 3, the EMLSR operation indicator element includes element ID element ID, length, and element ID extension all occupy 1 octet, and the specific definition may be similar to that in the relevant standards.

Furthermore, the EMLSR operation indicator element further includes an EMLSR operation indicator bitmap control (EMLSR Operation Indicator Bitmap Control) and a partial EMLSR operation indicator bitmap (Partial EMLSR Operation Indicator Bitmap). The EMLSR operation indicator bitmap control occupies 1 octet, and the partial EMLSR operation indicator bitmap occupies any number of octets between 1 and 251. Here, it may be understood that, for the first method described above, the number of octets occupied by the partial EMLSR operation indicator bitmap is 0.

As shown in Table 4, the EMLSR operation indicator bitmap control includes EMLSR operation for all indicator present (EMLSR Operation for ALL Indicator Present). In a case where the value of the EMLSR operation for all indicator present is 0, the EMLSR operation indicator bitmap control further includes bitmap offset (Bitmap Offset). Here, the EMLSR operation for all indicator present and bitmap offset occupy 1 bit and 7 bits, respectively. Based on this, the EMLSR operation for all indicator present and the bitmap offset that are included in the EMLSR operation indicator bitmap control occupy one octet in total.

Here, the bitmap offset may be similar to the definition of the bitmap offset field of the TIM element in the relevant standards, and the difference is that the bitmap offset field of the TIM element in the relevant standards corresponds to the traffic indication virtual bitmap, while the bitmap offset in the solutions of the present disclosure corresponds to the EMLSR operation indicator bitmap.

Furthermore, the partial EMLSR operation indicator bitmap (also referred to as a partial EMLSR operation indicator bitmap domain, or field) is formed by intercepting the meaningful part of continuous bits in the EMLSR operation indicator bitmap, and the interception method is consistent with the method of forming a partial traffic indication virtual bitmap of the TIM element in the relevant standards. The partial traffic indication virtual bitmap is formed by intercepting bits at part of continuous positions of the traffic indication virtual bitmap. The difference between the partial EMLSR operation indicator bitmap and the partial traffic indication virtual bitmap lies in the different definitions of the bit values of the two.

Exemplarily, in the solutions of the present disclosure, the position of each bit in the EMLSR operation indicator bitmap corresponds to an AP. Here, the AP is at least one of: an AP affiliated with the AP MLD, or an AP indicated by a BSSID in a multiple BSSID set where the AP affiliated with the AP MLD is located. In the solutions of the present disclosure, the definition of the bit positions of the EMLSR operation indicator bitmap is consistent with the definition of the correspondence between the AP with a cached groupcast frame and the bit positions in the traffic indication virtual bitmap of the TIM element in the relevant standard.

Furthermore, the value of each bit in the EMLSR operation indicator bitmap indicates, when an AP corresponding to the bit has a cached groupcast frame, whether the non-AP MLD operating in the EMLSR mode corresponding to the AP performs the first listening operation. The first listening operation is used for the first station, corresponding to the AP, on the non-AP MLD to have the first receiving capability, so that the first station listens to the link where the AP is located. Alternatively, the value of each bit in the EMLSR operation indicator bitmap indicates whether the non-AP MLD operating in the EMLSR mode corresponding to the AP that corresponds to the bit performs the first listening operation in a case where a groupcast frame needs to be received. The first listening operation is used for the first station, corresponding to the AP, on the non-AP MLD to have the first receiving capability, so that the first station listens to the link where the AP is located.

That is to say, the value of each bit in the EMLSR operation indicator bitmap indicates, when an AP corresponding to the bit has a cached groupcast frame, whether the non-AP MLD operating in the EMLSR mode corresponding to the AP needs to perform the first listening operation with a receiving capability (i.e., the first receiving capability) of a relatively high rate/relatively high MCS/more SS/relatively high BW on the link (e.g., the first link) where the AP is located. In other words, the value of each bit in the EMLSR operation indicator bitmap indicates whether the non-AP MLD operating in the EMLSR mode corresponding to the AP that corresponds to the bit needs to perform, in a case where a groupcast frame needs to be received, the first listening operation with the receiving capability (i.e., the first receiving capability) of the relatively high rate/relatively high MCS/more SS/relatively high BW on the link (e.g., the first link) where the AP is located.

It may be understood that the non-AP MLD operating in the EMLSR mode corresponding to the AP may exemplarily be the non-AP MLD operating in the EMLSR mode corresponding to the station (e.g., the first station) that corresponds to the AP. The non-AP MLD is associated with the AP MLD.

Furthermore, in a case where the value of a certain bit in the EMLSR operation indicator bitmap is 1, which means that, when an AP corresponding to the bit has a cached groupcast frame, the non-AP MLD operating in the EMLSR mode corresponding to the AP needs to perform the first listening operation with the receiving capability of the relatively high rate/relatively high MCS/more SS/relatively high BW on the link where the AP is located.

In a case where the value of a certain bit in the EMLSR operation indicator bitmap is 0, which means that, when an AP corresponding to the bit has a cached groupcast frame, the non-AP MLD operating in the EMLSR mode corresponding to the AP does not need to perform the first listening operation with the receiving capability of the relatively high rate/relatively high MCS/more SS/relatively high BW on the link where the AP is located.

In an implementation, the EMLSR operation indicator element is carried by a management frame. In this case, the first information may exemplarily be the management frame. Furthermore, the first MLD receives the management frame. Exemplarily, before S310, the first MLD receives the management frame. For example, the first MLD receives the management frame transmitted by the second MLD, so that the first listening operation is performed based on the management frame. Here, in an example, the management frame includes a traffic indication map (TIM) beacon frame.

In Method 4, the first information is a target initial control frame, which is used for informing that the groupcast frame is transmitted after the target initial control frame. In a specific example, the target initial control frame does not need to reply.

In an implementation, before step S310, the first MLD receives the target initial control frame. It may be understood that the target initial control frame is transmitted by the second MLD in a case where the first MLD needs to perform the first listening operation. Here, the second MLD is an MLD associated with the first MLD. For example, in a case where the second MLD expects to transmit a groupcast frame using a relatively high rate/relatively high MCS/more SS/relatively high BW, the second MLD may transmit the target initial control frame to the first MLD in advance to inform the first MLD that the groupcast frame is transmitted after the target initial control frame, so that the first MLD performs the first listening operation. Thus, the first MLD normally receives the groupcast frame that is transmitted by using the relatively high rate/relatively high MCS/more SS/relatively high BW.

In a case, the first multi-link device (MLD) performs the first listening operation, which is exemplarily that the first MLD switches from the second listening operation to the first listening operation, and more specifically that, the first MLD switches from the second listening operation to the first listening operation after receiving the target initial control frame. Alternatively, in another case, the first MLD is in the first listening operation in current time (i.e., at or before time of receiving the target initial control frame), and there is no need to switch at this time; and the first MLD only needs to continue to maintain the first listening operation, i.e., continue to perform the first listening operation. In this way, the groupcast frame that is transmitted by using the relatively high rate/relatively high MCS/more SS/relatively high BW may be received normally.

In an implementation, the target initial control frame includes an indication duration, and the indication duration is a maximum available duration for the first MLD to switch to the first listening operation. That is, in a case where switching is required, the first MLD needs to switch to the first listening operation within the maximum available duration, so as to normally receive the groupcast frame. Furthermore, the first multi-link device (MLD) performs the first listening operation, which is exemplarily that the first MLD switches from the second listening operation to the first listening operation, and more specifically that, the first MLD switches from the second listening operation to the first listening operation within the indication duration. Alternatively, in another case, the first MLD is currently in the first listening operation, and there is no need to switch at this time; and the first MLD only needs to continue to maintain the first listening operation, i.e., continue to perform the first listening operation.

In an implementation, the target initial control frame is a variant multi-user request to transmit (MU-RTS) trigger frame. Furthermore, a value of a trigger type subfield of the variant MU-RTS trigger frame is different from a value of a trigger type subfield of the MU-RTS trigger frame.

In an implementation, the target initial control frame (e.g., the variant MU-RTS trigger frame) is used to inform that a groupcast frame is transmitted after the MU-RTS trigger frame. It may be understood that the purpose of the variant MU-RTS trigger frame is to inform the first MLD that the groupcast frame is transmitted after the MU-RTS trigger frame, and the groupcast frame is transmitted using the relatively high rate/relatively high MCS/more SS/relatively high BW. Therefore, after receiving the variant MU-RTS trigger frame, the first MLD does not need to reply, and only needs to switch to the first listening operation within the indication duration carried by the variant MU-RTS trigger frame. Alternatively, when the first MLD receives the variant MU-RTS trigger frame, the first MLD is in the first listening operation; and in this case, there is also no need to reply, and the first MLD only needs to continue to perform the first listening operation.

For example, in a case where an AP MLD operating in the EMLSR mode is expected to transmit a groupcast frame using a relatively high rate/relatively high MCS/more SS/relatively high BW, before transmitting the groupcast frame, the AP MLD operating in the EMLSR mode may transmit a target initial control frame (e.g., a variant MU-RTS trigger frame) in advance, which does not need to reply, so as to inform (e.g., inform a non-AP MLD associated with the AP MLD operating in the EMLSR mode, the non-AP MLD also operates in the EMLSR mode) that the groupcast frame is transmitted after the target initial control frame, and the groupcast frame is transmitted by using the relatively high rate/relatively high MCS/more SS/relatively high BW. At the same time, the target initial control frame may carry a specified padding duration (i.e., an indication duration) to ensure that the non-AP MLD operating in the EMLSR mode has enough time to switch to the first listening operation in advance on a specific link (i.e., a link for transmitting the groupcast frame, for example, the first link) in the EMLSR link, so that the groupcast frame is received normally.

FIG. 4 is a schematic flowchart of a communication method 400, in accordance with an embodiment of the present disclosure. The method may optionally be applied to the system shown in FIG. 1, but is not limited thereto. The method includes at least part of the following.

In S410, a second multi-link device (MLD) transmits first information. The first information is used for a first multi-link device (MLD) to perform a first listening operation, and the first listening operation is used for a first station on the first MLD to receive a groupcast frame using a first receiving capability.

In an implementation, both the first MLD and the second MLD are MLDs operating in the EMLSR mode.

In an implementation, the second MLD is an access point (AP) MLD, and the first MLD is a non-access point (non-AP) MLD corresponding to the AP MLD. Further, the second MLD is an MLD operating in the EMLSR mode, and the first MLD is a non-AP MLD operating in the EMLSR mode and associated with the AP MLD (i.e., the second MLD).

In an implementation, the first station is an affiliated station of the first MLD. Exemplarily, the first station is a station on the first MLD corresponding to a first link, and the first station is used to listen to the first link. That is, the first listening operation is used for the first station to be in a listening state to listen to the channel state of the first link. Here, the first station may also be referred to as a listening station. The first link is a link for transmitting the groupcast frame.

In an implementation, the first link is a link in an EMLSR link.

That is to say, S410 is exemplarily that the access point (AP) MLD operating in the EMLSR mode transmits first information, and the first information is used for the non-access point (non-AP) MLD to perform the first listening operation. The first listening operation is used for a first station (i.e., a listening station) on the non-AP MLD to listen to the first link in the EMLSR link, so that the first station may receive a groupcast frame through the first link and using the first receiving capability. Here, the first link may be a link for transmitting a groupcast frame by the AP MLD associated with the non-AP MLD. For example, the access point (AP) (i.e., affiliated AP) on the AP MLD may transmit a groupcast frame through the first link. The non-AP MLD also operates in the EMLSR mode.

For example, two ends of a link in the EMLSR link correspond to a station on the non-AP MLD and an affiliated AP on the AP MLD, respectively; the affiliated AP transmits a groupcast frame through this link, and accordingly, the station receives the groupcast frame through this link. That is to say, for an AP, a single AP corresponds to one link, and also corresponds to one station. The AP transmits the groupcast frame through its corresponding link, and accordingly, the station receives the groupcast frame through its corresponding link. That is, the station, link and AP can correspond one by one.

In an implementation, the first receiving capability is greater than or equal to a second receiving capability, and the second receiving capability is a receiving capability adopted by the first station when the first MLD performs a second listening operation. For example, the first receiving capability may greater than the second receiving capability.

In a specific example, the first receiving capability is a receiving capability in the EMLSR mode. That is, the first receiving capability is a receiving capability of the first station affiliated with the first MLD in the EMLSR mode. Accordingly, the second receiving capability is also a receiving capability in the EMLSR mode. That is, the second receiving capability is a receiving capability of the first station affiliated with the first MLD in the EMLSR mode.

In an implementation, the first receiving capability includes at least one of: a first rate, a first modulation and coding strategy (MCS), a first spatial stream (SS), or a first bandwidth (BW).

In another implementation, the second receiving capability includes at least one of: a second rate, a second modulation and coding strategy (MCS), a second spatial stream (SS), or a second bandwidth (BW); and the second receiving capability is a receiving capability of the first station under the second listening operation.

Here, the first rate is greater than or equal to the second rate; the first MCS is better than or equal to the second MCS; the first SS is greater than or equal to the second SS; and the first BW is greater than or equal to the second BW.

It should be noted that the solutions of the present disclosure do not limit the number of parameters included in the first receiving capability (or the second receiving capability). For example, the parameters may be one, two, or more of the above parameters. Accordingly, the parameters included in the first receiving capability may be the same as or different from the parameters included in the second receiving capability, the number of parameters included in the first receiving capability may be the same as or different from the number of parameters included in the second receiving capability, and the solutions of the present disclosure do not limit these.

It may be understood that, if at least one parameter (at least one of the above parameters) in the first receiving capability is greater than respective parameter(s) of the second receiving capability, it may be considered that the first receiving capability is greater than the second receiving capability. For example, the first rate included in the first receiving capability is greater than the second rate included in the second receiving capability; and in a case where the first receiving capability further includes other parameters, even if the other parameters included in the first receiving capability are equal to respective parameters included in the second receiving capability, it may be considered that the first receiving capability is greater than or superior to the second receiving capability. For example, the first SS included in the first receiving capability is equal to the second SS included in the second receiving capability; and in this case, since the first rate included in the first receiving capability is greater than the second rate included in the second receiving capability, it may still be considered that the first receiving capability is greater than the second receiving capability.

In an implementation, all parameters included in the first receiving capability are greater than (or superior to) respective parameters of the second receiving capability. Thus, it ensures that a groupcast frame may be received in more scenarios. Exemplarily, since the first station on the first MLD has the first receiving capability (or has a better first receiving capability), even without receiving the initial control frame (e.g., the MU-RTS trigger frame) in advance, it is still possible to receive a groupcast frame that is transmitted by using a relatively high capability. For example, it is still possible to receive a groupcast frame transmitted by the second MLD using a relatively high rate, or a relatively high MCS, or a relatively high BW, or more SS.

In an implementation, under the first listening operation, only the first station on the first MLD is in the listening state, and other stations on the first MLD cannot enter the listening state, i.e., do not have the ability to receive or transmit frames.

Alternatively, in another implementation, the first MLD further includes a second station; the first listening operation is further used for the second station to listen to a second link in the EMLSR link (that is, the second station is in the listening state), and the second link is a link in the EMLSR link other than the first link; and furthermore, the second station also has the first receiving capability. That is, in a case where the first station has the first receiving capability under the first listening operation, the second station on the first MLD may also be in the listening state to listen to another link except the first link. In this case, the second station may also have the first receiving capability.

Exemplarily, in a case where performing the first listening operation by the first multi-link device (MLD) is maintaining the first listening operation by the first multi-link device (MLD), the first listening operation is further used for the second station to listen to the second link in the EMLSR link. The second station is a station on the first MLD, and the second link is a link in the EMLSR link other than the first link. Alternatively, in a case where performing the first listening operation by the first multi-link device (MLD) is switching from a second listening operation to the first listening operation by the first multi-link device, the first listening operation enables the second station not to perform listening.

It may be understood that, in this implementation, in a case where the first station has the first receiving capability under the first listening operation, there may be one or more second stations in the awake state on the first MLD, which are not limited in the present disclosure. For example, in the case where the first station has the first receiving capability under the first listening operation, all second stations in the awake state on the first MLD may be in the listening state, and all the second stations have the first receiving capability.

For example, the first listening operation (i.e., the first listening operation in the EMLSR mode) may exemplarily mean that, an affiliated station (abbreviated as a listening station, e.g., the first station), on the non-AP MLD operating in the EMLSR mode, corresponding to a specific link (e.g., the first link) in the EMLSR link is able to receive a groupcast frame that is transmitted by using a relatively high rate/relatively high MCS/more SS/relatively high BW. Furthermore, there are two situations for the first listening operation of the non-AP MLD entering the EMLSR mode.

In Case 1, under the first listening operation, the affiliated station (e.g., the first station) is able to enter the listening state corresponding to the frame exchange processing of the specific link (e.g., the first link) in the EMLSR link; that is, under the first listening operation, the frame receiving capability (also referred to as the frame processing capability) of the affiliated station (e.g., the first station) corresponding to the specific link (e.g., the first link) is consistent with the frame exchange processing capability of the specific link, which means that the groupcast frame that is transmitted by using the relatively high rate/relatively high MCS/more SS/relatively high BW can be received. Moreover, in this state, other than the specific link (e.g., the first link), other links in the EMLSR link cannot perform listening. That is, no frames can be transmitted or received by links other than the specific link. For example, in this case, transceiver capabilities of the EMLSR link (e.g., the transceiver capabilities of other stations in the EMLSR link) may be merged into the first station by switching and merging the links, so that the first station has a relatively strong first receiving capability.

In Case 2, under the first listening operation, the affiliated station (e.g., the first station) corresponding to the specific link (e.g., the first link) in the EMLSR mode has the ability to receive a groupcast frame that is transmitted by using a relatively high rate/relatively high MCS/relatively high BW/more SS. Therefore, all affiliated stations (e.g., second stations) in the EMLSR link that are in the awake state may be kept in the listening state. In this case, the affiliated station (e.g., the second station) in the awake state may have the same or different receiving capability as the first station. The solutions of the present disclosure do not limit this, and as long as the first station has the ability to receive the groupcast frame that is transmitted by using the relatively high rate/relatively high MCS/relatively high BW/more SS, they are all within the protection scope of the present disclosure. It may be understood that, since the link switching and merging is not performed in this case, the receiving capability of the first station of this case may be weaker than the receiving capability after the link switching and merging.

In an implementation, the second listening operation is used for a target station on the first MLD (i.e., an affiliated station of the first MLD) to listen to a link corresponding to the target station. The target station is a station in an awake state on the first MLD, and the target station has the second receiving capability. For example, the second receiving capability includes at least one of: performing a clear channel assessment (CCA), or receiving an initial control frame for initiating a frame exchange. For another example, in a case where there are two or more target stations in the awake state on the first MLD, the second listening operation enables the two or more target stations on the first MLD to have the second receiving capability. That is to say, under the second listening operation, the affiliated station(s) in the awake state on the first MLD, such as one affiliated station, multiple affiliated stations, or all affiliated stations in the awake state, can all be in the listening state, and the affiliated station(s) in the listening state all have the second receiving capability, e.g., have a lower second receiving capability relative to the first receiving capability.

For example, the second listening operation (i.e., the first listening operation in the EMLSR mode) may exemplarily mean that, all the affiliated stations (i.e., the target stations) in the awake state, corresponding to the EMLSR link, on the non-AP MLD operating in the EMLSR mode are in the listening state; the receiving capability (i.e., the second receiving capability) of each station corresponding to the EMLSR link is limited, and except for being able to receive the initial control frame such as CCA or MU-RTS trigger frame, other types of frames cannot be correctly received due to limitations on capabilities such as rate/MCS/SS/BW.

In one implementation, the second MLD transmits the groupcast frame. Exemplarily, the second MLD transmits the groupcast frame on the first link on which the first MLD performs a first listening operation; more specifically, the affiliated AP of the second MLD transmits the groupcast frame on the first link on which the first MLD performs a first listening operation; Accordingly, the first MLD receives the groupcast frame by using the first station that listen to the first link and has a first receiving capability.

In an implementation, the groupcast frame transmitted by the second MLD is carried by a physical layer protocol data unit (PPDU), and the PPDU includes at least one of:

an orthogonal frequency division multiplexing (OFDM) physical layer protocol data unit (PPDU);
a non-high throughput (non-HT) duplicate (DUP) PPDU;
a very high throughput (VHT) PPDU;
a high throughput (HT) PPDU;
a high efficiency (HE) single user (SU) PPDU; or
a PPDU, including an extremely high throughput (EHT) multi-user (MU) PPDU, supported by an extremely high throughput (EHT) station (STA).

Accordingly, the first MLD receives the groupcast frame through the first station by using the first receiving capability. For example, an affiliated AP of the AP MLD operating in the EMLSR mode, on a specific link (i.e., the first link) in the EMLSR link, uses at least one of the following parameters to transmit a PPDU carrying a groupcast frame; and accordingly, the non-AP MLD operating in the EMLSR mode, at the affiliated station (e.g., the first station with the first receiving capability) corresponding to the specific link (i.e., the first link) in the EMLSR link, may normally receive the PPDU transmitted by the affiliated AP of the AP MLD. Here, the parameters include: a relatively high rate, relatively high MCS, more SS, and relatively high BW.

In an implementation, the second MLD transmits the groupcast frame at the following time point. That is, the second MLD transmits the groupcast frame through the affiliated AP at the following time point, the specific time point includes the following.

(1) An expected groupcast frame transmission time point. Here, the expected groupcast frame transmission time point may be any time point agreed in advance, and the solutions of the present disclosure do not limit this. For example, the AP affiliated with the AP MLD schedules and transmits a cached groupcast frame at the expected groupcast frame transmission time point.

(2) A time point after a delivery traffic indication map (DTIM) beacon frame is transmitted. That is, the expected groupcast frame transmission time point is later than the TBTT of transmitting the DTIM beacon frame. For example, the AP affiliated with the AP MLD schedules and transmits the cached groupcast frame after transmitting the DTIM beacon frame (beacon), for example, schedules and transmits a cached groupcast frame after each DTIM beacon frame (beacon).

(3) A time point within the broadcast target wake time (TWT) service period (SP). That is, the expected groupcast frame transmission time point is within the broadcast TWT service period (SP). For example, the AP affiliated with the AP MLD schedules and transmits the groupcast frame within the broadcast TWT service period (SP). For example, one of APs affiliated with the AP MLD is a TWT scheduling AP, and the TWT scheduling AP schedules and transmits the cached groupcast frame within the broadcast TWT service period (SP) during the beacon interval where the DTIM beacon frame is transmitted.

(4) A time point after a TBTT of a non-space-time block coding (non-STBC) DTIM beacon frame with a current count value of a flexible multicast service (FMS) counter field of a specific FMS stream being zero. That is, the expected groupcast frame transmission time point is later than the TBTT of the non-STBC DTIM beacon frame with the current count value of the FMS counter field of the FMS stream being zero. For example, at the time point after the TBTT of the non-space-time block coding (non-STBC) DTIM beacon frame with the current count value of the FMS counter field of the specific FMS stream being zero, the cached groupcast frame is scheduled and transmitted.

(5) Within a groupcast with retries (GCR) service period. That is to say, the expected groupcast frame transmission time point is within the GCR service period. For example, the cached groupcast frame is scheduled and transmitted within the GCR service period.

In an implementation, the first information that is transmitted by the second MLD and used to enable the first multi-link device (MLD) to perform the first listening operation may be obtained in the following methods.

In Method 1, the first information is used for the first MLD to perform the first listening operation at a target time or before the target time. That is, the first MLD is able to perform the first listening operation at or before the target time based on the first information.

It may be understood that, in an example, the first information includes the target time. In this case, the first information is used for the first MLD to perform the first listening operation at the target time included in the first information or before the target time. Alternatively, in another example, the first information does not include the target time. In this case, the target time is transmitted in advance by the second MLD to the first MLD, i.e., is received by the first MLD in advance. In this case, the first information is used for the first MLD to perform the first listening operation at the target time obtained in advance or before the target time. The solutions of the present disclosure do not limit whether the target time is carried in the first information, and as long as the first information enables the first MLD to perform the first listening operation at the target time or before the target time, they are all within the protection scope of the present disclosure.

In an implementation, the first information is used for the first MLD to perform the first listening operation at the target time or before the target time, which may exemplarily include that: the first information is used for the first MLD to switch from a second listening operation to the first listening operation at the target time or before the target time; or when receiving the first information, the first MLD is under the first listening operation, and the first MLD continues to perform the first listening operation.

In an implementation, the target time in the Method 1 includes a first time point, and the first time point may exemplarily include at least one of the followings:

(1) an expected groupcast frame transmission time point. In this case, the first MLD performs the first listening operation at the expected groupcast frame transmission time point or at a time point before the expected groupcast frame transmission time point; here, the expected groupcast frame transmission time point may be any time point agreed in advance, and the solutions of the present disclosure do not limit this;

(2) a target beacon transmission time (TBTT) of an expected delivery traffic indication map (DTIM) beacon frame. Here, the expected groupcast frame transmission time point is later than the TBTT of the DTIM beacon frame. In this case, the first MLD performs the first listening operation at the TBTT of the expected DTIM beacon frame or at a time point before the TBTT of the expected DTIM beacon frame;

(3) a start time of a broadcast target wake time (TWT) service period (SP) for expected transmission of the groupcast frame. Here, the expected groupcast frame transmission time point is within the groupcast TWT service period (SP). In this case, the first MLD performs the first listening operation at the start time of the broadcast target wake time (TWT) service period (SP) for the expected transmission of the groupcast frame or at a time point before the start time;

(4) a TBTT of a non-space-time block coding (non-STBC) DTIM beacon frame with a current count value of a flexible multicast service (FMS) counter field of a specific FMS stream being zero. Here, the expected groupcast frame transmission time point is later than the TBTT of the non-STBC DTIM beacon frame with the current count value of the FMS counter field of the FMS stream being zero. In this case, the first MLD performs the first listening operation at the TBTT of the non-STBC DTIM beacon frame with the current count value of the FMS counter field of the specific FMS stream being zero, or at a time point before the TBTT of the non-STBC DTIM beacon frame with the current count value of the FMS counter field of the specific FMS stream being zero; or (5) a start time of a groupcast with retries (GCR) service period for expected transmission of the groupcast frame. Here, the expected groupcast frame transmission time point is within the GCR service period. In this case, the first MLD performs the first listening operation at the start time of the groupcast with retries (GCR) service period for the expected transmission of the groupcast frame or at a time point before the start time.

It may be understood that, for a specific example of a receiving terminal, i.e., the first MLD terminal, reference may be made to the above description, which will not be repeated here.

In an implementation, the first time point is determined by the second MLD; and further, the first time point is transmitted in advance by the second MLD to the first MLD. For example, before step S410, the second MLD transmits the first time point to the first MLD to ensure that the first MLD performs the first listening operation before the expected groupcast frame is transmitted, so that the first station listens to the link where the groupcast frame is scheduled and transmitted in the EMLSR link.

In Method 2, the first information is a DTIM beacon frame. That is, step S410 is exemplarily that: the second MLD transmits a DTIM beacon frame, and the DTIM beacon frame is used for the first MLD to perform the first listening operation at a target time or before the target time.

It may be understood that, in an example, the DTIM beacon frame may include a target time (e.g., a second time point), i.e., carry the target time. In this case, the DTIM beacon frame is used for the first MLD to perform the first listening operation at the target time carried by the DTIM beacon frame or before the target time. Alternatively, in another example, the DTIM beacon frame does not include the target time, i.e., does not carry the target time. In this case, the target time is transmitted in advance by the second MLD to the first MLD, i.e., is received by the first MLD in advance, and furthermore, the DTIM beacon frame is used for the first MLD to perform the first listening operation at the target time obtained in advance or before the target time. The solutions of the present disclosure do not limit whether the target time is carried in the DTIM beacon frame, and as long as the DTIM beacon frame enables the first MLD to perform the first listening operation at the target time or before the target time, they are all within the protection scope of the present disclosure.

In an implementation, different from the Method 1, the target time in the Method 2 includes a second time point; and furthermore, the DTIM beacon frame is used for the first MLD to switch from the second listening operation to the first listening operation at the second time point or before the second time point.

Furthermore, the second time point includes an expected groupcast frame transmission time point after the first MLD receives the DTIM beacon frame. Here, the DTIM beacon frame is received by the first MLD under the second listening operation. That is to say, the expected groupcast frame transmission time point is after the time point of transmitting the DTIM beacon frame. In this case, the first MLD first receives the DTIM beacon frame, and then performs the first listening operation at the expected groupcast frame transmission time point after receiving the DTIM beacon frame, or before the expected groupcast frame transmission time point after receiving the DTIM beacon frame. It may be understood that the first listening operation may be performed by the first MLD at the time point at which the reception of the DTIM beacon frame is completed.

For example, an AP MLD operating in the EMLSR mode transmits a DTIM beacon frame on a specific link (e.g., a first link) in the EMLSR link; and in this case, when a non-AP MLD operating in EMLSR mode (associated with the AP MLD) is ready to receive a groupcast frame on the link (e.g., the first link) in the EMLSR link, the non-AP MLD operating in EMLSR mode may first enter the second listening operation before the TBTT of the DTIM beacon frame, and then switch from the second listening operation to the first listening operation after receiving the DTIM beacon frame and before the time point of scheduling and transmitting the expected groupcast frame, so that the first station of the first MLD listens to the link (e.g., the first link) where the groupcast frame is scheduled and transmitted in the EMLSR link. Here, under the first listening operation, the first station has the first receiving capability, thereby ensuring that the groupcast frame may be received normally.

It may be understood that, after the AP MLD transmits the DTIM beacon frame on the EMLSR link and before the start time point of scheduling and transmitting the groupcast frame, it is necessary to reserve sufficient time. In this way, it may be ensured that the non-AP MLD that is associated with the AP MLD and operates in the EMLSR mode switches to the first listening operation of the link (e.g., the first link) where the groupcast frame is scheduled and transmitted in the EMLSR link after receiving the DTIM beacon frame and before or at the time point of transmitting the groupcast frame.

In Method 3, the first information is determined based on a first indication, and the first indication is used to indicate whether to perform the first listening operation in a case where a groupcast frame needs to be received. For example, the first indication is exemplarily used to indicate that the first listening operation is performed in a case where a groupcast frame needs to be received, or to indicate that the first listening operation does not need to be performed in a case where a groupcast frame needs to be received. Further, in the Method 3, the first indication may be expressed in the following two methods, which includes the follows.

First Method

The first indication is used to uniformly indicate whether the first MLD corresponding to the access point (AP) performs the first listening operation in a case where a groupcast frame needs to be received. Here, the access point (AP) is an AP corresponding to a second MLD associated with the first MLD, and the AP corresponding to the second MLD includes at least one of: an AP affiliated with the second MLD, or an AP indicated by a BSSID in a multiple BSSID set where the AP affiliated with the second MLD is located.

For example, the first MLD corresponding to the access point (AP) may exemplarily be the first MLD corresponding to the first station that corresponds to the access point (AP). It may be understood that, two ends of the link (e.g., the link in the EMLSR link) respectively correspond to the first station on the first MLD and the access point (AP) corresponding to the second MLD, and the station, link and AP may correspond one by one. Based on this, the access point (AP) corresponds to the station, and the station corresponds to the first MLD.

It should be noted that, the first indication does not carry the target time, for example, does not carry the first time point, and the purpose of the first indication is to indicate whether the first listening operation needs to be performed in a case where a groupcast needs to be received. Based on this, the first time point may be obtained in advance by the first MLD through other methods, which are not limited in the present disclosure. Alternatively, in another case, the first indication not only indicates whether the first listening operation needs to be performed in a case where a groupcast needs to be received, but also may carry the target time, e.g., the first time point. In this case, the first MLD does not need to obtain the first time point in advance. In practical applications, any one of the above two methods may be executed, which is not limited in the present disclosure.

In an implementation, in a case where a value of the first indication is a first value (e.g., 1), the first MLD corresponding to the access point (AP) for all indicator performs the first listening operation in a case where a groupcast frame needs to be received.

Alternatively, in a case where the value of the first indication is a second value (e.g., 0), the first MLD corresponding to the access point (AP) for all indicator does not need to perform the first listening operation in a case where a groupcast frame needs to be received.

In an implementation, the first indication is carried by an EMLSR operation indicator element. Further, the first indication is carried by a first field in the EMLSR operation indicator element.

In an implementation, the first field includes a second indication; and in a case where a value of the second indication is a third value (e.g., 1), the first field includes the first indication.

In an implementation, the first field is an EMLSR operation indicator bitmap control. The first indication is an EMLSR operation for all indicator. Further, the second indication is an EMLSR operation for all indicator present. The EMLSR operation for all indicator present is used to indicate whether the first field (i.e., the EMLSR operation indicator bitmap control) includes the EMLSR operation for all indicator.

It may be understood that, in actual applications, the EMLSR operation indicator element may further include other fields, and the solutions of the present disclosure do not limit the fields included.

In an implementation, the EMLSR operation indicator element is carried by a management frame. In this case, the first information may exemplarily be the management frame. Furthermore, the first MLD receives the management frame. Exemplarily, before S310, the first MLD receives the management frame. For example, the first MLD receives the management frame transmitted by the second MLD, so that the first listening operation is performed based on the management frame. Here, in an example, the management frame includes a traffic indication map (TIM) beacon frame.

Second Method

A position of each bit in the first indication is used to indicate an access point (AP).

A value of each bit in the first indication is used to indicate whether the first MLD corresponding to the access point (AP) performs the first listening operation in a case where a groupcast frame needs to be received.

Here, the access point (AP) is an AP corresponding to the second MLD associated with the first MLD; and the AP corresponding to the second MLD includes at least one of: an AP affiliated with the second MLD, or an AP indicated by a BSSID in a multiple BSSID set where the AP affiliated with the second MLD is located.

For example, the first MLD corresponding to the access point (AP) may exemplarily be the first MLD corresponding to the first station that corresponds to the access point (AP). It may be understood that, two ends of the link (e.g., the link in the EMLSR link) respectively correspond to the first station on the first MLD and the access point (AP) corresponding to the second MLD, and the station, link and AP may correspond one by one. Based on this, the access point (AP) corresponds to the station, and the station corresponds to the first MLD.

It should be noted that, the first indication does not carry the target time, for example, does not carry the first time point, and the purpose of the first indication is to indicate whether the first listening operation needs to be performed in a case where a groupcast needs to be received. Based on this, the first time point may be obtained in advance by the first MLD through other methods, which are not limited in the present disclosure. Alternatively, in another case, the first indication not only indicates whether the first listening operation needs to be performed in a case where a groupcast needs to be received, but also may carry the target time, e.g., the first time point. In this case, the first MLD does not need to obtain the first time point in advance. In practical applications, any one of the above two methods may be executed, which is not limited in the present disclosure.

In an implementation, in a case where the value of each bit in the first indication is a fourth value (e.g., 1), it is used to indicate the first MLD corresponding to the access point (AP) to perform the first listening operation in a case where a groupcast frame needs to be received.

Alternatively, in a case where the value of each bit in the first indication is a fifth value (e.g., 0), it is used to indicate the first MLD corresponding to the access point (AP) does not need to perform the first listening operation in a case where a groupcast frame needs to be received.

In an implementation, the first indication is carried by an EMLSR operation indicator element. Further, the first indication is carried by a second field in the EMLSR operation indicator element.

In an implementation, the second field is a partial EMLSR operation indicator bitmap, and the partial EMLSR operation indicator bitmap is formed by intercepting part of continuous bits in the EMLSR operation indicator bitmap.

In an implementation, the EMLSR operation indicator element includes a first field. In a case where a value of the second indication in the first field is a sixth value (for example, 0), the first field includes a third indication, and the third indication is used to indicate the position of the part of continuous bits intercepted from the EMLSR operation indicator bitmap. In an implementation, the third indication is a bitmap offset. In this way, the partial EMLSR operation indicator bitmap may be intercepted from the EMLSR operation indicator bitmap based on the bitmap offset.

In an implementation, the first field is an EMLSR operation indicator bitmap control. The first indication is an EMLSR operation for all indicator. Further, the second indication is an EMLSR operation for all indicator present. The EMLSR operation for all indicator present is used to indicate whether the first field (i.e., the EMLSR operation indicator bitmap control) includes the EMLSR operation for all indicator. For example, in a case where the value of the EMLSR operation for all indicator present is a third value (e.g., 1), the EMLSR operation indicator bitmap control includes the EMLSR operation for all indicator, and in this case, the EMLSR operation indicator bitmap control may further include reserved. In this case, the EMLSR operation for all indicator is used to uniformly indicate whether the corresponding first MLD needs to perform the first listening operation. Furthermore, in a case where the value of the EMLSR operation for all indicator present is a sixth value (e.g., 0), the EMLSR operation indicator bitmap control includes the bitmap offset. In this case, the EMLSR operation indicator element further needs to include the partial EMLSR operation indicator bitmap, and then the partial EMLSR operation indicator bitmap is used to indicate whether the corresponding first MLD needs to perform the first listening operation.

It may be understood that, in actual applications, the EMLSR operation indicator element may further include other fields, and the solutions of the present disclosure do not limit the fields included.

In an implementation, the EMLSR operation indicator element is carried by a management frame. In this case, the first information may exemplarily be the management frame. Furthermore, the first MLD receives the management frame. Exemplarily, before S310, the first MLD receives the management frame. For example, the first MLD receives the management frame transmitted by the second MLD, so that the first listening operation is performed based on the management frame. Here, in an example, the management frame includes a traffic indication map (TIM) beacon frame.

It may be understood that, for specific examples of the first method and the second method, reference may be made to the examples related to the first MLD, which will not be described in detail here.

In Method 4, the first information is a target initial control frame, which is used for informing that a groupcast frame is transmitted after the target initial control frame. In a specific example, the target initial control frame does not need to reply.

In an implementation, the target initial control frame is transmitted by the second MLD in a case where the first MLD is required to perform the first listening operation. Here, the second MLD is an MLD associated with the first MLD. For example, in a case where the second MLD expects to transmit a groupcast frame using a relatively high rate/relatively high MCS/more SS/relatively high BW, the second MLD may transmit the target initial control frame to the first MLD in advance to inform the first MLD that the groupcast frame is transmitted after the target initial control frame, so that the first MLD performs the first listening operation. Thus, the first MLD normally receives the groupcast frame that is transmitted by using the relatively high rate/relatively high MCS/more SS/relatively high BW.

In a case, the first multi-link device (MLD) performs the first listening operation, which is exemplarily that the first MLD switches from the second listening operation to the first listening operation, and more specifically that, the first MLD switches from the second listening operation to the first listening operation after receiving the target initial control frame. Alternatively, in another case, the first MLD is in the first listening operation in current time (i.e., at or before time of receiving the target initial control frame), and there is no need to switch at this time; and the first MLD only needs to continue to maintain the first listening operation, i.e., continue to perform the first listening operation. In this way, the groupcast frame that is transmitted by using the relatively high rate/relatively high MCS/more SS/relatively high BW may be received normally.

In an implementation, the target initial control frame includes an indication duration, and the indication duration is a maximum available duration for the first MLD to switch to the first listening operation. For example, in a case where the first MLD is required to perform the first listening operation, the second MLD transmits the target initial control frame, so that the first MLD switches to the first listening operation within the maximum available duration when switching is required. Thus, the first MLD may normally receive the groupcast frame.

In an implementation, the target initial control frame is a variant multi-user request to transmit (MU-RTS) trigger frame. Furthermore, a value of a trigger type subfield of the variant MU-RTS trigger frame is different from a value of a trigger type subfield of the MU-RTS trigger frame.

In an implementation, the target initial control frame (e.g., the variant MU-RTS trigger frame) is used to inform that a groupcast frame is transmitted after the MU-RTS trigger frame. It may be understood that the purpose of the variant MU-RTS trigger frame is to inform the first MLD that the groupcast frame is transmitted after the MU-RTS trigger frame, and the groupcast frame is transmitted by using the relatively high rate/relatively high MCS/more SS/relatively high BW. Therefore, after receiving the variant MU-RTS trigger frame, the first MLD does not need to reply, and only needs to switch to the first listening operation within the indication duration carried by the variant MU-RTS trigger frame. Alternatively, when the first MLD receives the variant MU-RTS trigger frame, the first MLD is in the first listening operation; and in this case, there is also no need to reply, and the first MLD only needs to continue to perform the first listening operation.

For example, in a case where an AP MLD operating in the EMLSR mode is expected to transmit a groupcast frame using a relatively high rate/relatively high MCS/more SS/relatively high BW, before transmitting the groupcast frame, the AP MLD operating in the EMLSR mode may transmit a target initial control frame (e.g., a variant MU-RTS trigger frame) in advance, which does not need to reply, so as to inform (e.g., inform a non-AP MLD associated with the AP MLD operating in the EMLSR mode, the non-AP MLD also operates in the EMLSR mode) that the groupcast frame is transmitted after the target initial control frame, and the groupcast frame is transmitted by using the relatively high rate/relatively high MCS/more SS/relatively high BW. At the same time, the target initial control frame may carry a specified padding duration (i.e., an indication duration) to ensure that the non-AP MLD operating in the EMLSR mode has enough time to switch to the first listening operation in advance on a specific link (i.e., a link for transmitting the groupcast frame, for example, the first link) in the EMLSR link, so that the groupcast frame is received normally.

The solutions of the present disclosure further provide a first multi-link device, and as shown in FIG. 5, the first multi-link device 500 includes:

a processing unit 510, configured to perform a first listening operation, where the first listening operation is used for the first station on the first MLD to receive a groupcast frame using a first receiving capability.

In an implementation, the first receiving capability is greater than or equal to a second receiving capability, and the second receiving capability is a receiving capability adopted by the first station in a case where the first MLD performs a second listening operation.

In an implementation, the processing unit is exemplarily configured to perform the first listening operation based on the first information.

In an implementation, the first information is used for the first MLD to perform the first listening operation at a target time or before the target time.

In an implementation, the target time includes a first time point, and the first time point includes at least one of:

an expected groupcast frame transmission time point;

a target beacon transmission time (TBTT) of an expected delivery traffic indication map (DTIM) beacon frame;

a start time of a broadcast target wake time (TWT) service period (SP) for expected transmission of the groupcast frame;

a TBTT of a non-space-time block coding (non-STBC) DTIM beacon frame with a current count value of a flexible multicast service (FMS) counter field of a specific FMS stream being zero; or a start time of a groupcast with retries (GCR) service period for expected transmission of the groupcast frame.

In an implementation, the first time point is received in advance by the first MLD.

In an implementation, the first information is a delivery traffic indication map (DTIM) beacon frame, and the DTIM beacon frame is used for the first MLD to perform the first listening operation at a target time or before the target time.

In an implementation, the target time includes a second time point, and the second time point includes an expected groupcast frame transmission time point after receiving the delivery traffic indication map (DTIM) beacon frame; and the DTIM beacon frame is received by the first MLD under a second listening operation.

In an implementation, the processing unit 510 is exemplarily configured to switch from the second listening operation to the first listening operation at the second time point or before the second time point; and the second listening operation is performed by the first MLD before a target beacon transmission time (TBTT) of the DTIM beacon frame expected to be transmitted.

In an implementation, the first information is determined based on a first indication, and the first indication is used to indicate whether to perform the first listening operation in a case where the groupcast frame needs to be received.

In an implementation, the first indication is used to uniformly indicate whether the first MLD corresponding to an access point (AP) performs the first listening operation in a case where the groupcast frame needs to be received.

The access point (AP) is an AP corresponding to a second MLD associated with the first MLD, and the AP corresponding to the second MLD includes at least one of:

an AP affiliated with the second MLD; or an AP indicated by a BSSID in a multiple BSSID set where the affiliated AP of the second MLD is located.

In an implementation, a value of the first indication is a first value, for uniformly indicating the first MLD corresponding to the access point (AP) to perform the first listening operation in a case where the groupcast frame needs to be received.

Alternatively, the value of the first indication is a second value, for uniformly indicating that the first MLD corresponding to the access point (AP) does not need to perform the first listening operation in a case where the groupcast frame needs to be received.

In an implementation, the first indication is carried by an EMLSR operation indicator element.

In an implementation, the first indication is carried by a first field in the EMLSR operation indicator element.

In an implementation, the first field includes a second indication.

In a case where a value of the second indication is a third value, the first field includes the first indication.

In an implementation, the first indication is an EMLSR operation for all indicator.

In an implementation, a position of each bit in the first indication is used to indicate an access point (AP); the access point (AP) is an AP corresponding to a second MLD associated with the first MLD; and the AP corresponding to the second MLD includes at least one of: an AP affiliated with the second MLD; or an AP indicated by a BSSID in a multiple BSSID set where the AP affiliated with the second MLD is located.

A value of each bit in the first indication is used to indicate whether the first MLD corresponding to the access point (AP) performs the first listening operation in a case where the groupcast frame needs to be received.

In an implementation, the value of each bit in the first indication is a fourth value, for indicating the first MLD corresponding to the access point (AP) to perform the first listening operation in a case where the groupcast frame needs to be received.

Alternatively, the value of each bit in the first indication is a fifth value, for indicating that the first MLD corresponding to the access point (AP) does not need to perform the first listening operation in a case where the groupcast frame needs to be received.

In an implementation, the first indication is carried by an EMLSR operation indicator element.

In an implementation, the first indication is carried by a second field in the EMLSR operation indicator element.

In an implementation, the second field is a partial EMLSR operation indicator bitmap, and the partial EMLSR operation indicator bitmap is formed by intercepting part of continuous bits in the EMLSR operation indicator bitmap.

In an implementation, the EMLSR operation indicator element includes a first field.

In a case where a value of a second indication in the first field is a sixth value, the first field includes a third indication, and the third indication is used to indicate a position of the part of continuous bits intercepted from the EMLSR operation indicator bitmap.

In an implementation, the third indication is a bitmap offset.

In an implementation, the second indication is an EMLSR operation for all indicator present, and the EMLSR operation for all indicator present is used to indicate whether the first field includes the EMLSR operation for all indicator.

In an implementation, the first field is an EMLSR operation indicator bitmap control.

In an implementation, the EMLSR operation indicator element is carried by a management frame.

In an implementation, the management frame includes a traffic indication map (TIM) beacon frame.

In an implementation, the device further includes:
a first receiving unit, configured to receive the management frame.

In an implementation, the first information is a target initial control frame, configured to inform that the groupcast frame is transmitted after the target initial control frame.

In an implementation, the target initial control frame includes an indication duration, and the indication duration is a maximum available duration for the first MLD to switch to the first listening operation.

In an implementation, the target initial control frame is a variant multi-user request to transmit (MU-RTS) trigger frame.

In an implementation, a value of a trigger type subfield of the variant MU-RTS trigger frame is different from a value of a trigger type subfield of the MU-RTS trigger frame.

In an implementation, the device further includes:
a second receiving unit, configured to receive the target initial control frame, where the target initial control frame is transmitted by a second MLD in a case where the first MLD is required to perform the first listening operation, and the second MLD is an MLD associated with the first MLD.

In an implementation, the processing unit is exemplarily configured to: switch from a second listening operation to the first listening operation; or maintain the first listening operation.

In an implementation, the first receiving capability includes at least one of: a first rate, a first modulation and coding strategy (MCS), a first spatial stream (SS), or a first bandwidth (BW).

And/or, the second receiving capability includes at least one of: a second rate, a second modulation and coding strategy (MCS), a second spatial stream (SS), or a second bandwidth (BW); and the second receiving capability is a receiving capability of the first station under a second listening operation.

The first rate is greater than or equal to the second rate; the first MCS is better than or equal to the second MCS; the first SS is greater than or equal to the second SS; and the first BW is greater than or equal to the second BW.

In an implementation, the second listening operation is used for a target station on the first MLD to listen to a link corresponding to the target station; the target station is a station in an awake state on the first MLD, and the target station has the second receiving capability; and the second receiving capability includes at least one of: performing a clear channel assessment (CCA), or receiving an initial control frame for initiating a frame exchange.

In an implementation, the device further includes:
a third receiving unit, configured to receive the groupcast frame through the first station using the first receiving capability.

In an implementation, the groupcast frame received by using the first receiving capability is carried by a physical layer protocol data unit (PPDU), and the PPDU includes at least one of:
an orthogonal frequency division multiplexing (OFDM) physical layer protocol data unit (PPDU);
a non-high throughput (non-HT) duplicate (DUP) PPDU;
a very high throughput (VHT) PPDU;
a high throughput (HT) PPDU;
a high efficiency (HE) single user (SU) PPDU; or
a PPDU, including an extremely high throughput (EHT) multi-user (MU) PPDU, supported by an extremely high throughput (EHT) station (STA).

In an implementation, the device further includes:
the processing unit, further configured to switch from the first listening operation to the second listening operation in a case where the groupcast frame is received completely.

In an implementation, the first station is a station corresponding to a first link on the first MLD, and the first station is used to listen to the first link; and the first link is a link for transmitting the groupcast frame.

In an implementation, the first MLD is an MLD operating in an enhanced multi-link single radio (EMLSR) mode, and the first link is a link in the EMLSR link.

In an implementation, the first MLD is a non-access point (non-AP) MLD.

In an implementation, in a case where performing the first listening operation by the first multi-link device (MLD) is maintaining the first listening operation by the first multi-link device (MLD), the first listening operation is further used for a second station to listen to a second link in the EMLSR link, the second station is a station on the first MLD, and the second link is a link in the EMLSR link other than the first link; or
in a case where performing the first listening operation by the first multi-link device (MLD) is switching from a second listening operation to the first listening operation by the first multi-link device, the first listening operation enables the second station not to perform listening.

The first multi-link device 500 in the embodiments of the present disclosure may achieve the corresponding functions of the first multi-link device in the above method embodiments. For processes, functions, implementations and beneficial effects corresponding to modules (sub-modules, units or components) in the first multi-link device 500, reference may be made to the corresponding description in the above method embodiments, which will not be repeated here. It should be noted that the functions described in the modules (sub-modules, units or components) in the first multi-link device 500 in the embodiments of the disclosure may be implemented by different modules (sub-modules, units or components) or by the same module (sub-module, unit or component).

The solutions of the present disclosure further provide a second multi-link device, and as shown in FIG. 6, the second multi-link device 600 includes:

a transmitting unit 610, configured to transmit first information, where the first information is used for a first multi-link device (MLD) to perform a first listening operation, and the first listening operation is used for a first station on the first MLD to receive a groupcast frame using a first receiving capability.

In an implementation, the first receiving capability is greater than or equal to a second receiving capability, the second receiving capability is a receiving capability adopted by the first station on the first MLD indicated by a second listening operation, and the second listening operation is a listening operation that the first MLD is capable of performing.

In an implementation, the first information is used for the first MLD to perform the first listening operation at a target time or before the target time.

In an implementation, the target time includes a first time point, and the first time point includes at least one of:

an expected groupcast frame transmission time point;

a target beacon transmission time (TBTT) of an expected delivery traffic indication map (DTIM) beacon frame;

a start time of a broadcast target wake time (TWT) service period (SP) for expected transmission of the groupcast frame;

a TBTT of a non-space-time block coding (non-STBC) DTIM beacon frame with a current count value of a flexible multicast service (FMS) counter field of a specific FMS stream being zero; or a start time of a groupcast with retries (GCR) service period for expected transmission of the groupcast frame.

In an implementation, the first time point is determined by the second MLD.

In an implementation, the first information is a delivery traffic indication map (DTIM) beacon frame, and the DTIM beacon frame is used for the first MLD to perform the first listening operation at a target time or before the target time.

In an implementation, the target time includes a second time point, and the second time point includes an expected groupcast frame transmission time point after the first MLD receives the DTIM beacon frame; and the DTIM beacon frame is received by the first MLD under a second listening operation.

In an implementation, the DTIM beacon frame is used for the first MLD to switch from the second listening operation to the first listening operation at the second time point or before the second time point.

In an implementation, the first information is determined based on a first indication, and the first indication is used to indicate whether to perform the first listening operation in a case where the groupcast frame needs to be received.

In an implementation, the first indication is used to uniformly indicate whether the first MLD corresponding to an access point (AP) performs the first listening operation in a case where the groupcast frame needs to be received.

The access point (AP) is an AP corresponding to a second MLD associated with the first MLD, and the AP corresponding to the second MLD includes at least one of:

an AP affiliated with the second MLD; or an AP indicated by a BSSID in a multiple BSSID set where the AP affiliated with the second MLD is located.

In an implementation, a value of the first indication is a first value, for uniformly indicating the first MLD corresponding to the access point (AP) to perform the first listening operation in a case where the groupcast frame needs to be received.

Alternatively, the value of the first indication is a second value, for uniformly indicating that the first MLD corresponding to the access point (AP) does not need to perform the first listening operation in a case where the groupcast frame needs to be received.

In an implementation, the first indication is carried by an EMLSR operation indicator element.

In an implementation, the first indication is carried by a first field in the EMLSR operation indicator element.

In an implementation, the first field includes a second indication.

In a case where a value of the second indication is a third value, the first field includes the first indication.

In an implementation, the first indication is an EMLSR operation for all indicator.

In an implementation, a position of each bit in the first indication is used to indicate an access point (AP); the access point (AP) is an AP corresponding to a second MLD associated with the first MLD; and the AP corresponding to the second MLD includes at least one of: an AP affiliated with the second MLD; or an AP indicated by a BSSID in a multiple BSSID set where the AP affiliated with the second MLD is located.

The value of each bit in the first indication is used to indicate whether the first MLD corresponding to the access point (AP) performs the first listening operation in a case where the groupcast frame needs to be received.

In an implementation, the value of each bit in the first indication is a fourth value, for indicating the first MLD corresponding to the access point (AP) to perform the first listening operation in a case where the groupcast frame needs to be received.

Alternatively, the value of each bit in the first indication is a fifth value, for indicating that the first MLD corresponding to the access point (AP) does not need to perform the first listening operation in a case where the groupcast frame needs to be received.

In an implementation, the first indication is carried by an EMLSR operation indicator element.

In an implementation, the first indication is carried by a second field in the MLSR operation indication element.

In an implementation, the second field is a partial EMLSR operation indicator bitmap, and the partial EMLSR operation indicator bitmap is formed by intercepting part of continuous bits in the EMLSR operation indicator bitmap.

In an implementation, the EMLSR operation indicator element includes a first field.

In a case where a value of a second indication in the first field is a sixth value, the first field includes a third indication, and the third indication is used to indicate a position of the part of continuous bits intercepted from the EMLSR operation indicator bitmap.

In an implementation, the third indication is a bitmap offset.

In an implementation, the second indication is an EMLSR operation for all indicator present, and the EMLSR operation for all indicator present is used to indicate whether the first field includes the EMLSR operation for all indicator.

In an implementation, the first field is an EMLSR operation indicator bitmap control.

In an implementation, the EMLSR operation indicator element is carried by a management frame.

In an implementation, the management frame includes a traffic indication map (TIM) beacon frame.

In an implementation, the first information is a target initial control frame, used for informing that the groupcast frame is transmitted after the target initial control frame.

In an implementation, the target initial control frame includes an indication duration, and the indication duration is a maximum available duration for the first MLD to switch to the first listening operation.

In an implementation, the target initial control frame is a variant multi-user request to transmit (MU-RTS) trigger frame.

In an implementation, a value of a trigger type subfield of the variant MU-RTS trigger frame is different from a value of a trigger type subfield of the MU-RTS trigger frame.

In an implementation, the first receiving capability includes at least one of: a first rate, a first modulation and coding strategy (MCS), a first spatial stream (SS), or a first bandwidth (BW).

And/or, the second receiving capability includes at least one of: a second rate, a second modulation and coding strategy (MCS), a second spatial stream (SS), or a second bandwidth (BW); and the second receiving capability is a receiving capability of the first station under a second listening operation.

The first rate is greater than or equal to the second rate; the first MCS is better than or equal to the second MCS; the first SS is greater than or equal to the second SS; and the first BW is greater than or equal to the second BW.

In an implementation, the second listening operation is used for a target station on the first MLD to listen to a link corresponding to the target station; the target station is a station in an awake state on the first MLD, and the target station has the second receiving capability; and the second receiving capability includes at least one of: performing a clear channel assessment (CCA), or receiving an initial control frame for initiating a frame exchange.

In an implementation, the transmitting unit is further configured to transmit the groupcast frame at a time point of:
an expected groupcast frame transmission time point;
a time point after a delivery traffic indication map (DTIM) beacon frame is transmitted;
a time point within a broadcast target wake time (TWT) service period (SP);
a time point after a TBTT of a non-space-time block coding (non-STBC) DTIM beacon frame with a current count value of a flexible multicast service (FMS) counter field of a specific FMS stream being zero; or
within a groupcast with retries (GCR) service period.

In an implementation, the groupcast frame is carried by a physical layer protocol data unit (PPDU), and the PPDU includes at least one of:
an orthogonal frequency division multiplexing (OFDM) physical layer protocol data unit (PPDU);
a non-high throughput (non-HT) duplicate (DUP) PPDU;
a very high throughput (VHT) PPDU;
a high throughput (HT) PPDU;
a high efficiency (HE) single user (SU) PPDU; or
a PPDU, including an extremely high throughput (EHT) multi-user (MU) PPDU, supported by an extremely high throughput (EHT) station (STA).

In an implementation, the first station is a station corresponding to a first link on the first MLD, and the first station is used to listen to the first link; and the first link is a link for transmitting the groupcast frame.

In an implementation, the first MLD and the second MLD are MLDs operating in an enhanced multi-link single radio (EMLSR) mode, and the first link is a link in the EMLSR link.

In an implementation, the second MLD is an access point (AP) MLD, and the first MLD is a non-access point (non-AP) MLD corresponding to the AP MLD.

In an implementation, in a case where performing the first listening operation by the first multi-link device (MLD) is maintaining the first listening operation by the first multi-link device (MLD), the first listening operation is further used for a second station to listen to a second link in the EMLSR link, the second station is a station on the first MLD, and the second link is a link in the EMLSR link other than the first link; or
in a case where performing the first listening operation by the first multi-link device (MLD) is switching from a second listening operation to the first listening operation by the first multi-link device, the first listening operation enables the second station not to perform listening.

The second multi-link device 600 in the embodiments of the present disclosure may achieve the corresponding functions of the second multi-link device in the above method embodiments. For processes, functions, implementations and beneficial effects corresponding to modules (sub-modules, units or components) in the second multi-link device 600, reference may be made to the corresponding description in the above method embodiments, which will not be repeated here. It should be noted that the functions described in the modules (sub-modules, units or components) in the second multi-link device 600 in the embodiments of the present disclosure may be implemented by different modules (sub-modules, units or components) or by the same module (sub-module, unit or component).

The solution of the present disclosure will be further described in detail below with reference to specific examples.

The solution of present disclosure mainly addresses the frame processing problem that may exist when a station on a non-AP MLD operating in the EMLSR mode on the EMLSR link (also referred to as a station corresponding to the EMLSR link) directly receives a groupcast frame of a relatively high order or more SS, without receiving an MU-RTS trigger frame in advance. A mechanism for an AP MLD supporting the EMLSR mode (i.e., an AP MLD operating in the EMLSR mode) to transmit a groupcast frame is defined, and a mechanism for the non-AP MLD to receive the groupcast frame in the EMLSR mode is defined. In addition, a listening operation of the non-AP MLD on the EMLSR link is extended and defined to meet the reception of groupcast frames in special scenarios.

Here, before the solution of the present disclosure is exemplarily introduced, the specific definitions of a first listening operation in the EMLSR mode and a second listening operation in the EMLSR mode are first clarified, which exemplarily include the following.

For the first listening operation, i.e., the first listening operation in the EMLSR mode, it exemplarily means that an affiliated station (abbreviated as a listening station, e.g., the first station), corresponding to a specific link (e.g., the first link) in the EMLSR link, on the non-AP MLD operating in the EMLSR mode is able to receive a PPDU that is transmitted by using a relatively high rate/relatively high MCS/more SS/relatively high BW.

Here, the PPDU may be at least one of: OFDM PPDU, non-HT DUP PPDU, VHT PPDU, HT PPDU, HE SU PPDU, or a PPDU including EHT MU PPDU supported by an EHT STA. In this way, it is ensured that the non-AP MLD may correctly receive the PPDU with at least one of the following parameters and carrying a groupcast frame. The parameters include: the relatively high rate, relatively high MCS, more SS, and relatively high BW.

There are two methods for the non-AP MLD to enter the first listening operation in the EMLSR mode.

(1) Under the first listening operation, the affiliated station (e.g., the first station) is able to enter the listening state corresponding to the frame exchange processing of the specific link (e.g., the first link) in the EMLSR link; that is, under the first listening operation, the frame receiving capability (also referred to as the frame processing capability) of the affiliated station (e.g., the first station) corresponding to the specific link (e.g., the first link) is consistent with the frame exchange processing capability of the specific link, which means that under the first listening operation, a groupcast frame that is transmitted by using the relatively high rate/relatively high MCS/more SS/relatively high BW can be received by the affiliated station corresponding to the specific link (e.g., the first link). Moreover, in this state, other than the specific link (e.g., the first link), other links in the EMLSR link cannot perform listening. That is, no frames can be transmitted or received by links other than the specific link.

(2) Under the first listening operation, the affiliated station (e.g., the first station) corresponding to the specific link (e.g., the first link) in the EMLSR mode has the ability to receive a PPDU (carrying a groupcast frame) that is transmitted by using a relatively high rate/relatively high MCS/relatively high BW/more SS. Therefore, all affiliated stations (e.g., second stations) in the EMLSR link that are in the awake state may be kept in the listening state.

Correspondingly, for the second listening operation in the EMLSR mode, i.e., the second listening operation of the non-AP MLD entering the EMLSR mode, it exemplarily means that all affiliated stations (abbreviated as listening stations, e.g., target stations) in the awake state, corresponding to the EMLSR link, on the non-AP MLD operating in the EMLSR mode are in the listening state; the receiving capability (i.e., the second receiving capability) of each station corresponding to the EMLSR link is limited, and except for being able to receive an initial control frame such as CCA or MU-RTS trigger frame, other types of frames cannot be correctly received due to limitations on capabilities such as rate/MCS/SS/BW.

On the basis of clarifying the first listening operation and the second listening operation, four specific methods for implementing the first listening operation are provided, which are as follows.

In Method 1, the non-AP MLD operating in the EMLSR mode performs the first listening operation at an expected groupcast frame transmission time point or before the expected groupcast frame transmission time point to listen to a link (i.e., the first link) where a groupcast frame is scheduled and transmitted in the EMLSR link. For example, the non-AP MLD operating in the EMLSR mode enters the link where the groupcast frame is scheduled and transmitted in the EMLSR link to perform the first listening operation before the expected groupcast frame transmission time point, i.e., performs the first listening operation in advance, to listen to the link (i.e., the first link) where the groupcast frame is scheduled and transmitted in the EMLSR link. Furthermore, in a case of performing the first listening operation, the non-AP MLD operating in the EMLSR mode may receive the groupcast frame through the first link, and switch to a second listening operation after confirming that the groupcast frame has been received. That is, in a case where the non-AP MLD is associated with an AP MLD that supports the EMLSR mode, and the non-AP MLD operates in the EMLSR mode on the EMLSR link, if the groupcast frame is scheduled and transmitted on a link (e.g., the first link) in the EMLSR link corresponding to the non-AP MLD, and a station (set as station A, i.e., the first station) on the non-AP MLD on the link (e.g., the first link) is ready to receive the groupcast frame, then the non-AP MLD needs to ensure entering the first listening operation at or before the expected groupcast frame transmission time point. Therefore, the station A listens to the link (i.e., the first link) that transmits the groupcast frame, so as to correctly receive the groupcast frame.

Here, for a transmitting terminal of a groupcast frame, a method for an AP affiliated with the AP MLD scheduling and transmitting a cached groupcast frame may adopt at least one of the following:

(1) the AP affiliated with the AP MLD schedules and transmits the cached groupcast frame at the expected groupcast frame transmission time point. Here, the expected groupcast frame transmission time point may be any time point agreed in advance, and the solutions of the present disclosure do not limit this;

(2) the AP affiliated with the AP MLD schedules and transmits the cached groupcast frame after transmitting the DTIM beacon frame. For example, the AP affiliated with the AP MLD schedules and transmits a cached groupcast frame after each DTIM beacon frame;

(3) the AP affiliated with the AP MLD schedules and transmits the cached groupcast frame within the broadcast TWT service period (SP). For example, one of APs affiliated with the AP MLD is a TWT scheduling AP, and the TWT scheduling AP schedules and transmits the cached groupcast frame within the broadcast TWT service period (SP) during the beacon interval where the DTIM beacon frame is transmitted;

(4) a specific flexible multicast service (FMS) is used to transmit the cached groupcast frame. For example, the cached groupcast frame is scheduled and transmitted at a time point after the TBTT of the non-space-time block coding (non-STBC) DTIM beacon frame with the current count value of the FMS counter field of the specific FMS stream being zero; or (5) GCR is used to transmit the cached groupcast frame. For example, the cached groupcast frame is scheduled and transmitted within the GCR service period.

Accordingly, based on the method for scheduling and transmitting of the cached groupcast frame by the AP affiliated with the AP MLD, the expected groupcast frame transmission time point may be any time point agreed in advance, which may also be obtained based on the following methods.

First, a target beacon transmission time (TBTT) of an expected delivery traffic indication map (DTIM) beacon frame. In this case, the expected groupcast frame transmission time point is later than the TBTT of the DTIM beacon frame. In this case, the non-AP MLD performs the first listening operation at the TBTT of the expected DTIM beacon frame or at a time point before the TBTT of the expected DTIM beacon frame.

Second, a start time of a broadcast target wake time (TWT) service period (SP) for expected transmission of the groupcast frame. In this case, the expected groupcast frame transmission time point is within the groupcast TWT service period (SP). In this case, the non-AP MLD performs the first listening operation at the start time of the broadcast target wake time (TWT) service period (SP) for the expected transmission of the groupcast frame or at a time point before the start time.

Third, a TBTT of a non-space-time block coding (non-STBC) DTIM beacon frame with a current count value of a flexible multicast service (FMS) counter field of a specific FMS stream being zero. In this case, the expected groupcast frame transmission time point is later than the TBTT of the non-STBC DTIM beacon frame with the current count value of the FMS counter field of the FMS stream being zero. In this case, the non-AP MLD performs the first listening operation at the TBTT of the non-STBC DTIM beacon frame with the current count value of the FMS counter field of the specific FMS stream being zero, or at a time point before the TBTT of the non-STBC DTIM beacon frame with the current count value of the FMS counter field of the specific FMS stream being zero.

Fourth, a start time of a groupcast with retries (GCR) service period for expected transmission of the groupcast frame. In this case, the expected groupcast frame transmission time point is within the GCR service period. In this case, the non-AP MLD performs the first listening operation at the start time of the groupcast with retries (GCR) service period for the expected transmission of the groupcast frame or at a time point before the start time.

For example, when the AP MLD schedules and transmits a cached groupcast frame after the DTIM beacon frame through a link (e.g., the first link) in the EMLSR link, the non-AP MLD operating in the EMLSR mode will first enter the first listening operation of the link (e.g., the first link) where the groupcast frame is scheduled and transmitted at or before the expected DTIM beacon frame TBTT, i.e., perform the first listening operation at or before the expected DTIM beacon frame TBTT to listen to the link (e.g., the first link) where the groupcast frame is scheduled and transmitted. Subsequently, after receiving the DTIM beacon frame, the non-AP MLD operating in the EMLSR mode maintains the first listening operation (i.e., maintains the frame exchange operation state) for the link (e.g., the first link) where the groupcast frame is scheduled and transmitted. That is, the non-AP MLD operating in the EMLSR mode maintains the first listening operation to maintain listening for the link (e.g., the first link) where the groupcast frame is scheduled and transmitted until the reception of the groupcast frame is completed. Furthermore, when the non-AP MLD receives an indication, for example, receives a groupcast frame with the more data subfield (More Data subfield) being 0 transmitted by the AP of the first link, the non-AP MLD confirms that there is no more groupcast frames. In this case, the non-AP MLD returns from the first listening operation (also referred to as the frame exchange operation) to the second listening operation in the EMLSR mode.

For another example, in a case where the AP MLD schedules and transmits a cached groupcast frame within the broadcast TWT service period or the GCR service period, the non-AP MLD operating in the EMLSR mode will first enter the first listening operation of the link (e.g., the first link) where the groupcast frame is scheduled and transmitted at or before the start time of the broadcast TWT service period or the GCR service period for the expected scheduling and transmitting of the groupcast frame, i.e., enter the first listening operation in advance to listen to the link (e.g., the first link) where the groupcast frame is scheduled and transmitted. Subsequently, after receiving the DTIM beacon frame, the non-AP MLD operating in the EMLSR mode maintains the first listening operation (i.e., maintains the frame exchange operation state) for the link (e.g., the first link) where the groupcast frame is scheduled and transmitted. That is, the non-AP MLD operating in the EMLSR mode maintains the first listening operation to maintain listening for the link (e.g., the first link) where the groupcast frame is scheduled and transmitted until the reception of the groupcast frame is completed. Further, when the non-AP MLD receives an indication for confirming that there is no groupcast frame (that is, the groupcast frame has been received), the non-AP MLD returns from the first listening operation (i.e., the frame exchange operation) to the second listening operation in the EMLSR mode; or when the end time point of the broadcast TWT service period or the GCR service period (SP) is reached and there is no groupcast frame being received, the non-AP MLD returns from the first listening operation to the second listening operation in the EMLSR mode.

In Method 2, in a case where a non-AP MLD operating in the EMLSR mode is ready to receive a groupcast frame on a link in the EMLSR link, the non-AP MLD operating in the EMLSR mode may first enter the second listening operation before the TBTT of the DTIM beacon frame. After receiving the DTIM beacon frame and before the time point of scheduling and transmitting the expected groupcast frame, the non-AP MLD operating in the EMLSR mode switches from the second listening operation to the first listening operation, so that the first station of the first MLD listens to the link (e.g., the first link) where the groupcast frame is scheduled and transmitted in the EMLSR link, and receives the groupcast frame through the link until the reception of the groupcast frame is completed. If the non-AP MLD receives an indication for confirming that there is no more groupcast frames, the reception is considered complete. Then, the non-AP MLD returns from the first listening operation (i.e., the frame exchange operation) to the second listening operation.

It may be understood that, after the AP MLD transmits the DTIM beacon frame on the EMLSR link and before the start time point of scheduling and transmitting the groupcast frame, it is necessary to reserve sufficient time. In this way, it may be ensured that the non-AP MLD that is associated with the AP MLD and operates in the EMLSR mode switches to the first listening operation of the link (e.g., the first link) where the groupcast frame is scheduled and transmitted in the EMLSR link after receiving the DTIM beacon frame and before or at the time point of transmitting the groupcast frame.

Furthermore, when the non-AP MLD receives an indication, for example, receives a groupcast frame with the more data subfield (More Data subfield) being 0 transmitted by the AP of the first link, the non-AP MLD confirms that there is no more groupcast frames. In this case, the non-AP MLD returns from the first listening operation (also referred to as the frame exchange operation) to the second listening operation in the EMLSR mode.

In Method 3, the AP MLD transmits a management frame (e.g. a TIM beacon frame) carrying an EMLSR operation indicator element, the EMLSR operation indicator element can indicate, in a case where the AP has a cached groupcast frame (that is, the station corresponding to the AP needs to receive the groupcast frame), whether the non-AP MLD corresponding to the AP (associated with the AP MLD corresponding to the AP) operating in the EMLSR mode needs to perform the first listening operation with a receiving capability (i.e., the first receiving capability) of a relatively high rate/relatively high MCS/more SS/relatively high BW on the link (e.g., the first link) where the AP is located. Furthermore, after obtaining the EMLSR operation indicator element, the non-AP MLD operating in the EMLSR mode determines whether to perform the first listening operation in advance according to the value meaning of the EMLSR operation indicator element when intending to receive the groupcast frame (i.e., needing to receive the groupcast frame), for example, determines whether to perform the first listening operation at or before the expected groupcast frame transmission time point.

Furthermore, when the non-AP MLD receives an indication, for example, receives a groupcast frame with the more data subfield (More Data subfield) being 0 transmitted by the AP of the first link, the non-AP MLD confirms that there is no more groupcast frames. In this case, the non-AP MLD returns from the first listening operation (also referred to as the frame exchange operation) to the second listening operation in the EMLSR mode.

In Method 4, in a case where an AP MLD operating in the EMLSR mode is expected to transmit a groupcast frame using a relatively high rate/relatively high MCS/more SS/relatively high BW, before transmitting the groupcast frame, the AP MLD operating in the EMLSR mode may transmit a target initial control frame (e.g., a variant MU-RTS trigger frame) in advance, which does not need to reply, so as to inform (e.g., inform a non-AP MLD associated with the AP MLD operating in the EMLSR mode, the non-AP MLD also operates in the EMLSR mode) that the groupcast frame is transmitted after the target initial control frame, and the groupcast frame is transmitted by using the relatively high rate/relatively high MCS/more SS/relatively high BW. At the same time, the target initial control frame may carry a specified padding duration (i.e., an indication duration) to ensure that the non-AP MLD operating in the EMLSR mode has enough time to switch to the first listening operation in advance on a specific link (i.e., a link for transmitting the groupcast frame, for example, the first link) in the EMLSR link, so that the groupcast frame is received normally.

Furthermore, when the non-AP MLD receives an indication, for example, receives a groupcast frame with the more data subfield (More Data subfield) being 0 transmitted by the AP of the first link, the non-AP MLD confirms that there is no more groupcast frames. In this case, the non-AP MLD returns from the first listening operation (also referred to as the frame exchange operation) to the second listening operation in the EMLSR mode.

The solution of the present disclosure will be further described in detail below with reference to specific examples.

Figure 7A:
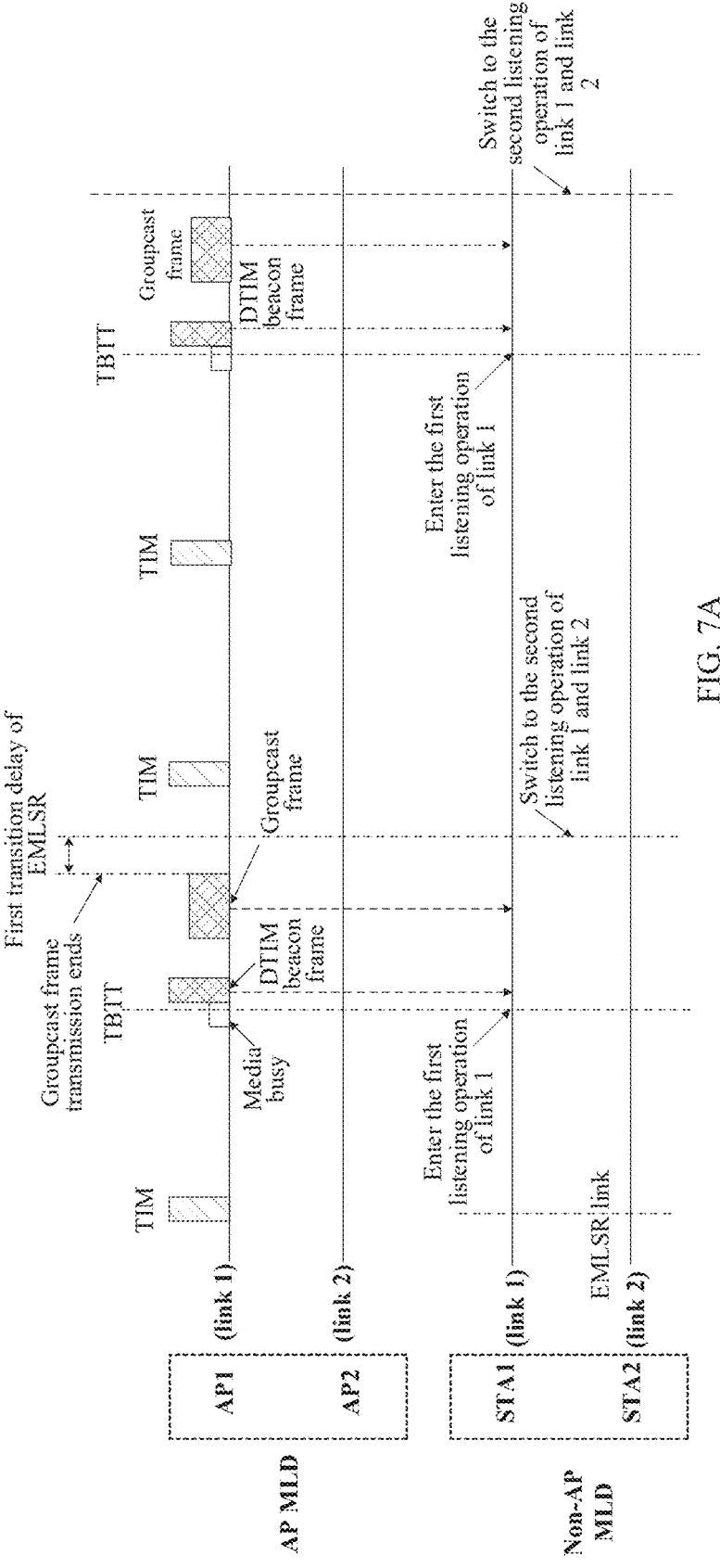
FIGS. 7A to 7F are schematic diagrams 1 to 6 of an implementation process of a communication method in a specific example, in accordance with embodiments of the present disclosure.

FIG. 7A is a schematic diagram of a first implementation process in a specific example, in accordance with a communication method in the embodiments of the present disclosure. As shown in FIG. 7A, the non-AP MLD enters the first listening operation before the TBTT of the DTIM beacon frame, which is exemplarily as follows.

The non-AP MLD is associated with an AP MLD after the multi-link establishment process. Two associated links are Link 1 and Link 2. The two ends of Link1 are AP1 affiliated with the AP MLD and STA1 of the non-AP MLD. That is, a link corresponding to AP1 and STA1 is Link1. The two ends of Link2 are AP2 affiliated with the AP MLD and STA2 of the non-AP MLD. That is, a link corresponding to AP2 and STA3 is Link2.

Here, the AP MLD supports the EMLSR mode, and the non-AP MLD operates in the EMLSR mode on the EMLSR links (e.g., Link1 and Link2).

In a case where the AP MLD is expected to schedule and transmit a cached groupcast frame (i.e., schedule and transmit a groupcast frame that has been cached) through Link1 in the EMLSR link after transmitting a DTIM beacon frame, the non-AP MLD operating in the EMLSR mode first enters the first listening operation of the link (i.e., Link1) where the groupcast frame is scheduled and transmitted before the TBTT of the expected DTIM beacon frame, so that STA1 has a stronger first receiving capability and enables STA1 to listen to Link1; and after receiving the DTIM beacon frame, the non-AP MLD operating in the EMLSR mode maintains the first listening operation (i.e., maintains the frame exchange operation) of the link (i.e., Link1) where the groupcast frame is scheduled and transmitted until the reception of the groupcast frame is completed. Here, the AP MLD transmits the groupcast frame on Link1 through AP1.

Furthermore, when the non-AP MLD receives an indication for confirming that there is no more groupcast frames, the non-AP MLD switches from the first listening operation to the second listening operation of Link 1 and Link 2 in the EMLSR mode after a transition delay of EMLSR.

Here, under the first listening operation, i.e., under the first listening operation in the EMLSR mode, STA1 corresponding to the non-AP MLD operating in the EMLSR mode on the specific link (i.e., Link1 in this example) in the EMLSR link is able to receive the PPDU carrying the groupcast frame that is transmitted by using the relatively high rate/relatively high MCS/more SS/relatively high BW.

Here, the non-AP MLD enters the first listening operation of the specific link (i.e., Link 1 in this example) in EMLSR mode in two methods.

(1) The non-AP MLD enters the listening operation state corresponding to the frame exchange processing of the specific link (i.e., Link1 in this example) in the EMLSR link. In this case, an affiliated station (i.e., STA1 in this example) corresponding to the specific link (i.e., Link1 in this example) is able to receive the PPDU that is transmitted by using the relatively high rate/relatively high MCS/more SS/relatively high BW. The receiving capability of this time (i.e., the first receiving capability) is consistent with the frame exchange processing capability of the specific link. In this state, except for the specific link, other links in the EMLSR link (for this example, Link 2) cannot perform a listening operation, i.e., cannot transmit or receive frames.

(2) The affiliated station (i.e., STA1 in this example) corresponds to the specific link (i.e., Link1 in this example) in the EMLSR link has the ability to receive the PPDU that is transmitted by using the relatively high rate/relatively high MCS/more SS/relatively high BW. Therefore, all affiliated stations (e.g., STA2) in the EMLSR link that are in the awake state may be kept in the listening state. At this time, the receiving capability of the affiliated station (e.g., STA2) in the awake state may be the same as or different from that of STA1. The solution of present disclosure does not limit this, and as long as STA1 has the ability to receive a groupcast frame that is transmitted by using the relatively high rate/relatively high MCS/relatively high BW/more SS, they are all within the protection scope of the present disclosure.

The second listening operation in EMLSR mode means that, for the non-AP MLD operating in the EMLSR mode, all the affiliated stations (referred to as listening stations, e.g., Link1 and Link2) in awake state in the EMLSR link are in the listening state. The listening operation capability of each station in the EMLSR link, such as Link1 and Link2, is limited. Except for the reception of initial control frames such as CCA and MU-RTS, other types of frames cannot be correctly received due to the limitation of rate/MCS/SS/BW capability.

Here, for the first listening operation and the second listening operation, reference may be made to the above description, which will not be repeated here.

The first transition delay of EMLSR refers to the switching duration for the non-AP MLD operating in the EMLSR mode to switch from the first listening operation on the EMLSR link to the second listening operation on the EMLSR link (including multiple links).

Figure 7B:
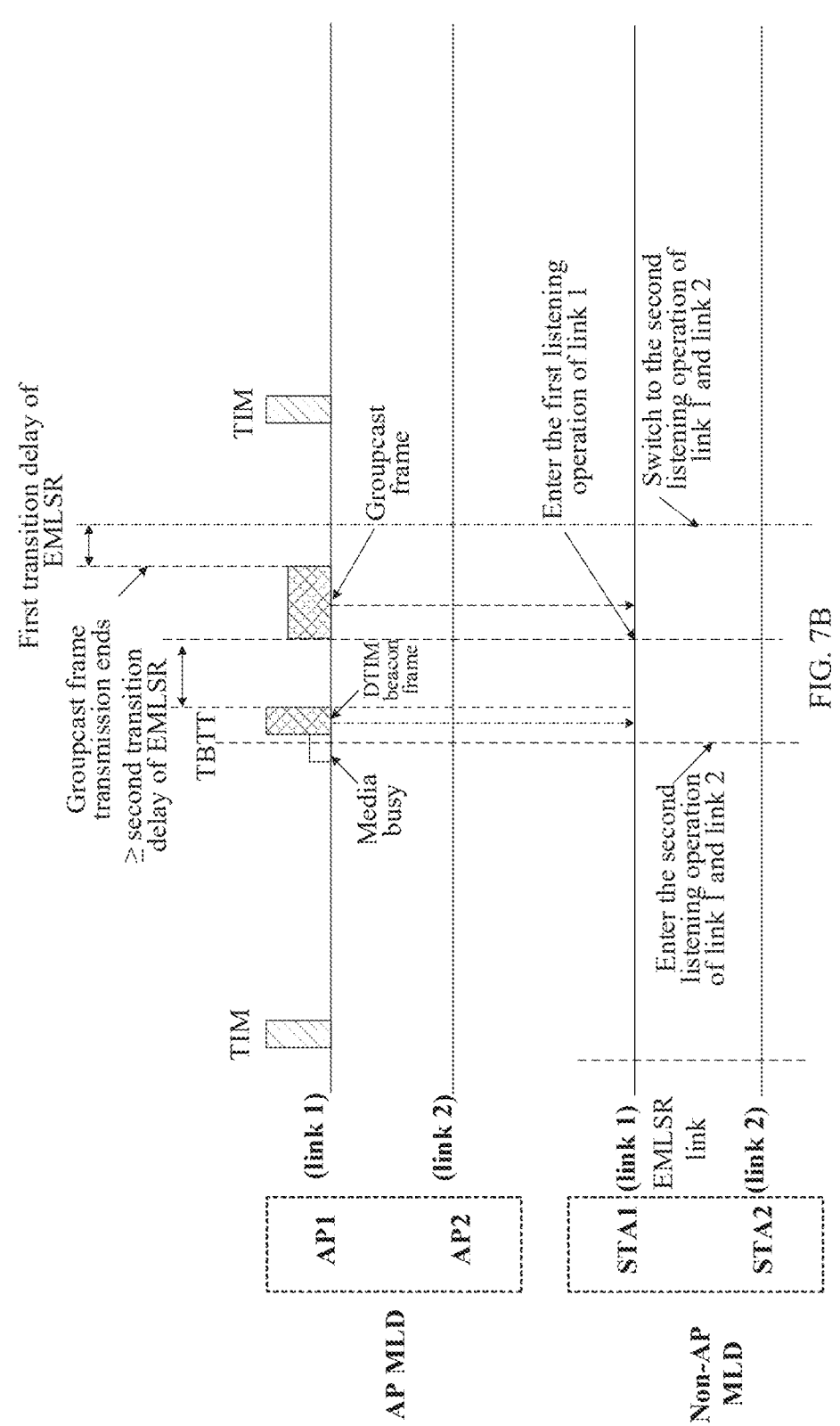

FIG. 7B is a schematic diagram of a second implementation process in a specific example, in accordance with a communication method in the embodiments of the present disclosure. As shown in FIG. 7B, the non-AP MLD performs the first listening operation after receiving the DTIM beacon frame and before scheduling and transmitting a groupcast frame, which is exemplarily as follows.

The non-AP MLD is associated with an AP MLD after the multi-link establishment process. Two associated links are Link 1 and Link 2. The two ends of Link1 are AP1 affiliated with the AP MLD and STA1 of the non-AP MLD. That is, a link corresponding to AP1 and STA1 is Link1. The two ends of Link2 are AP2 affiliated with the AP MLD and STA2 of the non-AP MLD. That is, a link corresponding to AP2 and STA3 is Link2.

Here, the AP MLD supports the EMLSR mode, and the non-AP MLD operates in the EMLSR mode on the EMLSR links (e.g., Link1 and Link2).

In a case where the AP MLD is expected to schedule and transmit a groupcast frame on Link1 after transmitting a DTIM beacon frame, a sufficient time is reserved between the end time point of transmitting the DTIM beacon frame and the start time point of transmitting the groupcast frame. That is, the duration between the end time point of transmitting the DTIM beacon frame and the start time point of transmitting the groupcast frame is greater than or equal to the second transition delay of EMLSR, so as to ensure that the non-AP MLD operating in the EMLSR mode switches to the first listening operation of the link (Link1 in this example) where the groupcast frame is scheduled and transmitted in the EMLSR link after receiving the DTIM beacon frame and before the start time point of transmitting the groupcast frame.

Here, the second transition delay refers to the switching duration for the non-AP MLD operating in the EMLSR mode to switch from the second listening operation on the EMLSR link to the first listening operation.

Exemplarily, in a case where the non-AP MLD operating in the EMLSR mode expects to receive a cached groupcast frame scheduled and transmitted after a DTIM beacon frame on Link1, the non-AP MLD operating in the EMLSR mode first enters the second listening operation of the multi-link (i.e., Link1 and Link2) in the EMLSR link at or before the TBTT of the expected DTIM beacon frame, then enters the first listening operation on Link1 after receiving the DTIM beacon frame and at or before the start time point of transmitting the groupcast frame, and maintains the first listening operation on Link1 to receive the groupcast frame on Link1 until the reception of the groupcast frame is completed. When the non-AP MLD receives an indication for confirming that there is no more groupcast frames, the non-AP MLD switches from the first listening operation to the second listening operation of the multi-link (Link1 and Link2) in the EMLSR mode after the first transition delay of EMLSR.

Here, for the first listening operation, the second listening operation, and the first transition delay of EMLSR, reference may be made to the above description, which will not be repeated here.

Figure 7C:
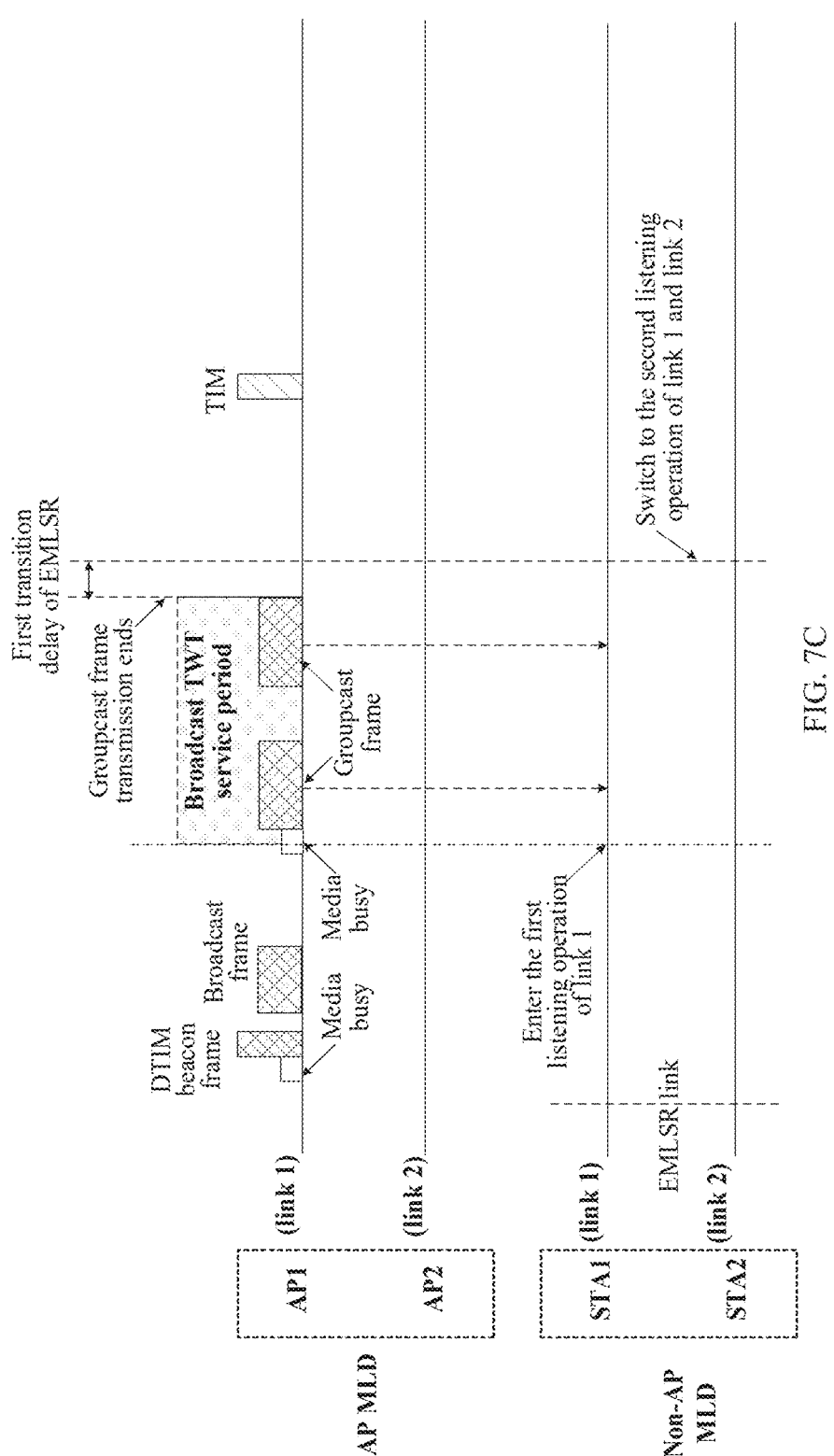

FIG. 7C is a schematic diagram of a third implementation process in a specific example, in accordance with a communication method in the embodiments of the present disclosure. As shown in FIG. 7C, the non-AP MLD enters the first listening operation before/at the start time point of the broadcast TWT service period, which is exemplarily as follows.

The non-AP MLD is associated with an AP MLD after the multi-link establishment process. Two associated links are Link 1 and Link 2. The two ends of Link1 are AP1 affiliated with the AP MLD and STA1 of the non-AP MLD. That is, a link corresponding to AP1 and STA1 is Link1. The two ends of Link2 are AP2 affiliated with the AP MLD and STA2 of the non-AP MLD. That is, a link corresponding to AP2 and STA3 is Link2.

Here, the AP MLD supports the EMLSR mode, and the non-AP MLD operates in the EMLSR mode on the EMLSR links (e.g., Link1 and Link2). A station (e.g., STA1) on the non-AP MLD on the EMLSR link establishes a broadcast TWT with an AP (e.g., AP1) associated with the AP MLD, STA1 is a scheduled station for the broadcast TWT service period, and AP1 schedules and transmits a cached groupcast frame during the broadcast TWT service period.

In a case where the AP MLD expects to schedule and transmit, through Link1 in the EMLSR link, a cached groupcast frame during the broadcast TWT service period within the beacon interval of transmitting the DTIM beacon frame, the non-AP MLD operating in the EMLSR mode first enters the first listening operation of the link (i.e., Link1) where the groupcast frame is scheduled and transmitted before/at the start time of the broadcast TWT service period; then, the non-AP MLD operating in the EMLSR mode maintains the first listening operation during the broadcast TWT service period and receives the groupcast frame until the reception of the groupcast frame is completed. Furthermore, when the non-AP MLD receives an indication for confirming that there is no more groupcast frames or the end time point of the broadcast TWT service period is reached, the non-AP MLD switches to the second listening operation of the multi-link (i.e., Link1 and Link2) in the EMLSR mode after the first transition delay of EMLSR.

Here, for the first listening operation, the second listening operation and the first transition delay of EMLSR, reference may be made to the above description, which will not be repeated here.

Figure 7D:
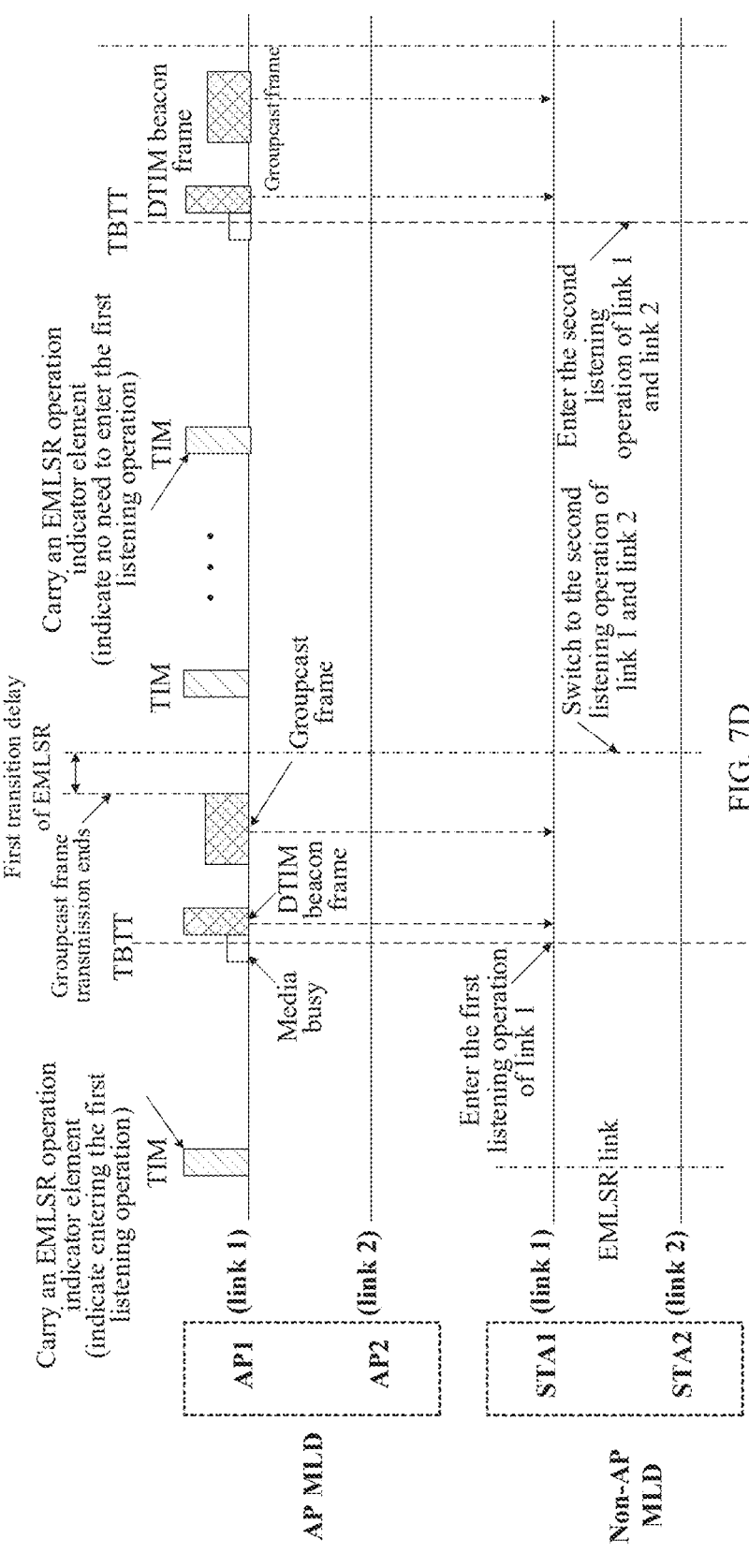

FIG. 7D is a schematic diagram of a fourth implementation process in a specific example, in accordance with a communication method in the embodiments of the present disclosure. As shown in FIG. 7D, the non-AP MLD is based on the EMLSR operation indicator element and enters the first listening operation after a DTIM beacon frame.

First, the EMLSR operation indicator element is described as follows.

TABLE 5

|  | Element ID | Length | Element ID Extension | EMLSR Operation Indicator Bitmap Control | Partial EMLSR Operation Indicator Bitmap |
|---|---|---|---|---|---|
| Octet: | 1 | 1 | 1 | 1 | 0-251 |

TABLE 6 (A)

| EMLSR Operation for ALL Indicator Present (Value: 0) | Bitmap Offset |
|---|---|
| Bit:         1 | 7 |

TABLE 6 (B)

| EMLSR Operation for ALL Indicator Present (Value: 1) | EMLSR Operation for ALL Indicator | Reserved |
|---|---|---|
| Bit:     1 | 1 | 6 |

As shown in Table 5, the EMLSR operation indicator element includes element ID element ID, length, and element ID extension all occupy 1 octet, and the specific definition may be similar to that in the relevant standards. Furthermore, the EMLSR operation indicator element further includes EMLSR operation indicator bitmap control (EMLSR Operation Indicator Bitmap Control), which also occupies 1 octet.

In this example, based on the structures shown in Table 5, Table 6(A) and Table 6(B), two methods may be used to indicate whether to perform the first listening operation in a case where a groupcast frame needs to be received, which are exemplarily as follows.

First Method

As shown in Table 6(B), the EMLSR operation indicator bitmap control includes EMLSR operation for all indicator present (EMLSR Operation for ALL Indicator Present). In a case where the value of the EMLSR operation for all indicator present is 1, the EMLSR operation indicator bitmap control further includes EMLSR operation for all indicator (EMLSR Operation for ALL Indicator) and reserved (Reserved). Here, the EMLSR operation for all indicator present, EMLSR operation for all indicator and reserved occupy 1 bit, 1 bit and 6 bits, respectively. Based on this, the EMLSR operation for all indicator present, the EMLSR operation for all indicator and the reserved that are included the EMLSR operation indicator bitmap control occupy one octet in total.

As shown in Table 6(A), in a case where the value of the EMLSR operation for all indicator present is 0, the EMLSR operation indicator bitmap control further includes bitmap offset (Bitmap Offset). Here, the EMLSR operation for all indicator present and bitmap offset occupy 1 bit and 7 bits, respectively. Based on this, the EMLSR operation for all indicator present and the bitmap offset that are included in the EMLSR operation indicator bitmap control occupy one octet in total.

Furthermore, the EMLSR operation for all indicator (referred to as EMLSR operation for all indicator domain) is used to uniformly indicate the non-AP MLD operating in the EMLSR mode corresponding to the AP, whether performs the first listening operation in a case where a groupcast frame needs to be received. The first listening operation is used for the first station, corresponding to the AP, on the non-AP MLD to have the first receiving capability, so that the first station listens to the link where the AP is located. That is, the EMLSR operation for all indicator is used to uniformly indicate the non-AP MLD operating in the EMLSR mode corresponding to the AP whether to perform, in a case where a groupcast frame needs to be received, the first listening operation with a receiving capability (i.e., the first receiving capability) of a relatively high rate/relatively high MCS/more SS/relatively high BW on the link (e.g., the first link) where the AP is located.

The AP is at least one of: an AP affiliated with the AP MLD, or an AP indicated by a BSSID in a multiple BSSID set where the AP affiliated with the AP MLD is located. The non-AP MLD is associated with the AP MLD.

It may be understood that the non-AP MLD operating in the EMLSR mode corresponding to the AP may exemplarily be the non-AP MLD operating in the EMLSR mode corresponding to the station (e.g., the first station) that corresponds to the AP. For example, the non-AP MLD operating in the EMLSR mode corresponding to AP1 may exemplarily be the non-AP MLD corresponding to SAT1 that corresponds to AP1.

Furthermore, in a case where the value of the EMLSR operation for all indicator is 1, which means that the non-AP MLD operating in the EMLSR mode corresponding to the AP performs, in a case where a groupcast frame needs to be received, the first listening operation with the receiving capability (i.e., the first receiving capability) of the relatively high rate/relatively high MCS/more spatial streams (SS)/relatively high BW on the link (e.g., the first link) where the AP is located.

In a case where the value of the EMLSR operation for all indicator is 0, which means that the non-AP MLD operating in the EMLSR mode corresponding to the AP does need to perform, in a case where a groupcast frame needs to be received, the first listening operation with the receiving capability (i.e., the first receiving capability) of the relatively high rate/relatively high MCS/more spatial streams (SS)/relatively high BW on the link (e.g., the first link) where the AP is located.

That is to say, in this method, the EMLSR operation for all indicator is used to indicate whether to perform the first listening operation in a case where a groupcast frame needs to be received. In this case, the number of octets of the partial EMLSR operation indicator bitmap contained in the EMLSR operation indicator element is 0. That is, in this method, the structure of the EMLSR operation indicator element is as shown in Table 5 and Table 6 (B), and the number of octets of the partial EMLSR operation indicator bitmap in Table 5 is 0.

Second Method

As shown in Table 5, the EMLSR operation indicator element further includes a partial EMLSR operation indicator bitmap (Partial EMLSR Operation Indicator Bitmap); and different from the first method, in this method, the partial EMLSR operation indicator bitmap is used to indicate whether to perform the first listening operation in a case where a groupcast frame needs to be received. That is, in this method, the structure of the EMLSR operation indicator element is as shown in Table 5 and Table 6 (A). In this case, the number of octets of the partial EMLSR operation indicator bitmap in Table 5 is any value in the range of 1 to 251.

Here, the bitmap offset may be similar to the definition of the bitmap offset field of the TIM element in the relevant standards, and the difference is that the bitmap offset field of the TIM element in the relevant standards corresponds to the traffic indication virtual bitmap, while the bitmap offset in the solution of the present disclosure corresponds to the EMLSR operation indicator bitmap.

Furthermore, the partial EMLSR operation indicator bitmap (also referred to as a partial EMLSR operation indicator bitmap domain, or field) is formed by intercepting the meaningful part of continuous bits in the EMLSR operation indicator bitmap, and the interception method is consistent with the method of forming a partial traffic indication virtual bitmap of the TIM element in the relevant standards. The partial traffic indication virtual bitmap is formed by intercepting bits at part of continuous positions of the traffic indication virtual bitmap. The difference between the partial EMLSR operation indicator bitmap and the partial traffic indication virtual bitmap lies in the different definitions of the bit values of the two.

Exemplarily, in the solution of the present disclosure, the position of each bit in the EMLSR operation indicator bitmap corresponds to an AP. Here, the AP is at least one of: an AP affiliated with the AP MLD, or an AP indicated by a BSSID in a multiple BSSID set where the AP affiliated with the AP MLD is located. In the solution of the present disclosure, the definition of the bit positions of the EMLSR operation indicator bitmap is consistent with the definition of the correspondence between the AP with a cached groupcast frame and the bit positions in the traffic indication virtual bitmap of the TIM element in the relevant standard.

Furthermore, the value of each bit in the EMLSR operation indicator bitmap indicates, when an AP corresponding to the bit has a cached groupcast frame, whether the non-AP MLD operating in the EMLSR mode corresponding to the AP needs to perform the first listening operation with the receiving capability (i.e., the first receiving capability) of the relatively high rate/relatively high MCS/more SS/relatively high BW on the link (e.g., the first link) where the AP is located. In other words, the value of each bit in the EMLSR operation indicator bitmap indicates whether the non-AP MLD operating in the EMLSR mode corresponding to the AP that corresponds to the bit needs to perform, in a case where a groupcast frame needs to be received, the first listening operation with the receiving capability (i.e., the first receiving capability) of the relatively high rate/relatively high MCS/more SS/relatively high BW on the link (e.g., the first link) where the AP is located.

It may be understood that the non-AP MLD operating in the EMLSR mode corresponding to the AP may exemplarily be the non-AP MLD operating in the EMLSR mode corresponding to the station (e.g., the first station) that corresponds to the AP. The non-AP MLD is associated with the AP MLD.

Furthermore, in a case where the value of a certain bit in the EMLSR operation indicator bitmap is 1, which means that, when an AP corresponding to the bit has a cached groupcast frame, the non-AP MLD operating in the EMLSR mode corresponding to the AP needs to perform the first listening operation with the receiving capability of the relatively high rate/relatively high MCS/more SS/relatively high BW on the link where the AP is located.

In a case where the value of a certain bit in the EMLSR operation indicator bitmap is 0, which means that, when an AP corresponding to the bit has a cached groupcast frame, the non-AP MLD operating in the EMLSR mode corresponding to the AP does not need to perform the first listening operation with the receiving capability of the relatively high rate/relatively high MCS/more SS/relatively high BW on the link where the AP is located.

Moreover, the EMLSR operation indicator element may be carried by a management frame, e.g., a TIM beacon frame. For example, the EMLSR operation indicator element may be added to the frame body of the TIM beacon frame. The TIM beacon frame carries the EMLSR operation indicator element, which means that a groupcast frame transmitted by the indicated AP needs to be performed according to the operation indicated in the EMLSR operation indicator element in a case where the non-AP MLD operating in EMLSR mode is ready to receive the groupcast frame. Thus, the groupcast frame may be received normally.

As shown in FIG. 7D, the non-AP MLD is based on the EMLSR operation indicator element and enters the first listening operation after the DTIM beacon frame, which exemplarily includes the following.

The non-AP MLD is associated with an AP MLD after the multi-link establishment process. Two associated links are Link 1 and Link 2. The two ends of Link1 are AP1 affiliated with the AP MLD and STA1 of the non-AP MLD. That is, a link corresponding to AP1 and STA1 is Link1. The two ends of Link2 are AP2 affiliated with the AP MLD and STA2 of the non-AP MLD. That is, a link corresponding to AP2 and STA3 is Link2.

Here, the AP MLD supports the EMLSR mode, and the non-AP MLD operates in the EMLSR mode on the EMLSR links (e.g., Link1 and Link2).

AP1 of AP MLD carries the EMLSR operation indicator element in the transmitted TIM beacon frame, and the EMLSR operation indicator element indicates that, when AP1 has a cached groupcast frame, the non-AP MLD operating in the EMLSR mode needs to enter the first listening operation with the receiving capability of the relatively high rate/relatively high MCS/more SS/relatively high BW on the link (i.e., Link1) where the AP is located.

Furthermore, in a case where the AP MLD schedules and transmits the cached groupcast frame after the DTIM beacon frame through Link1 in the EMLSR link, the non-AP MLD operating in the EMLSR mode first enters the first listening operation of the link (i.e., Link1) where the groupcast frame is scheduled and transmitted at or before TBTT of the expected DTIM beacon frame, and then maintains the first listening operation of the link (i.e., Link1) where the groupcast frame is scheduled and transmitted after receiving the DTIM beacon frame until the reception of the groupcast frame is completed. Furthermore, when the non-AP MLD receives an indication for confirming that there is no more groupcast frames, the non-AP MLD switches from the first listening operation to the second listening operation of the multi-link (Link1 and Link2) in the EMLSR mode after the first transition delay of EMLSR.

Furthermore, AP1 affiliated with the AP MLD carries the EMLSR operation indicator element in the transmitted TIM beacon frame, and indicates that, when AP1 has a cached groupcast frame, the non-AP MLD operating in the EMLSR mode does not need to enter the first listening operation on the link (Link1) where AP1 is located. Furthermore, in a case where the AP MLD schedules and transmits the cached groupcast frame after the subsequent DTIM beacon frame through Link1 in the EMLSR link, the non-AP MLD operating in the EMLSR mode first enters the second listening operation of the multi-link (Link1 and Link1) at or before the TBTT of the expected DTIM beacon frame, and then receives the DTIM beacon frame and the groupcast frame under the second listening operation until the reception of the groupcast frame is completed.

Here, for the first listening operation, the second listening operation and the first transition delay of EMLSR, reference may be made to the above description, which will not be repeated here.

Figure 7E:
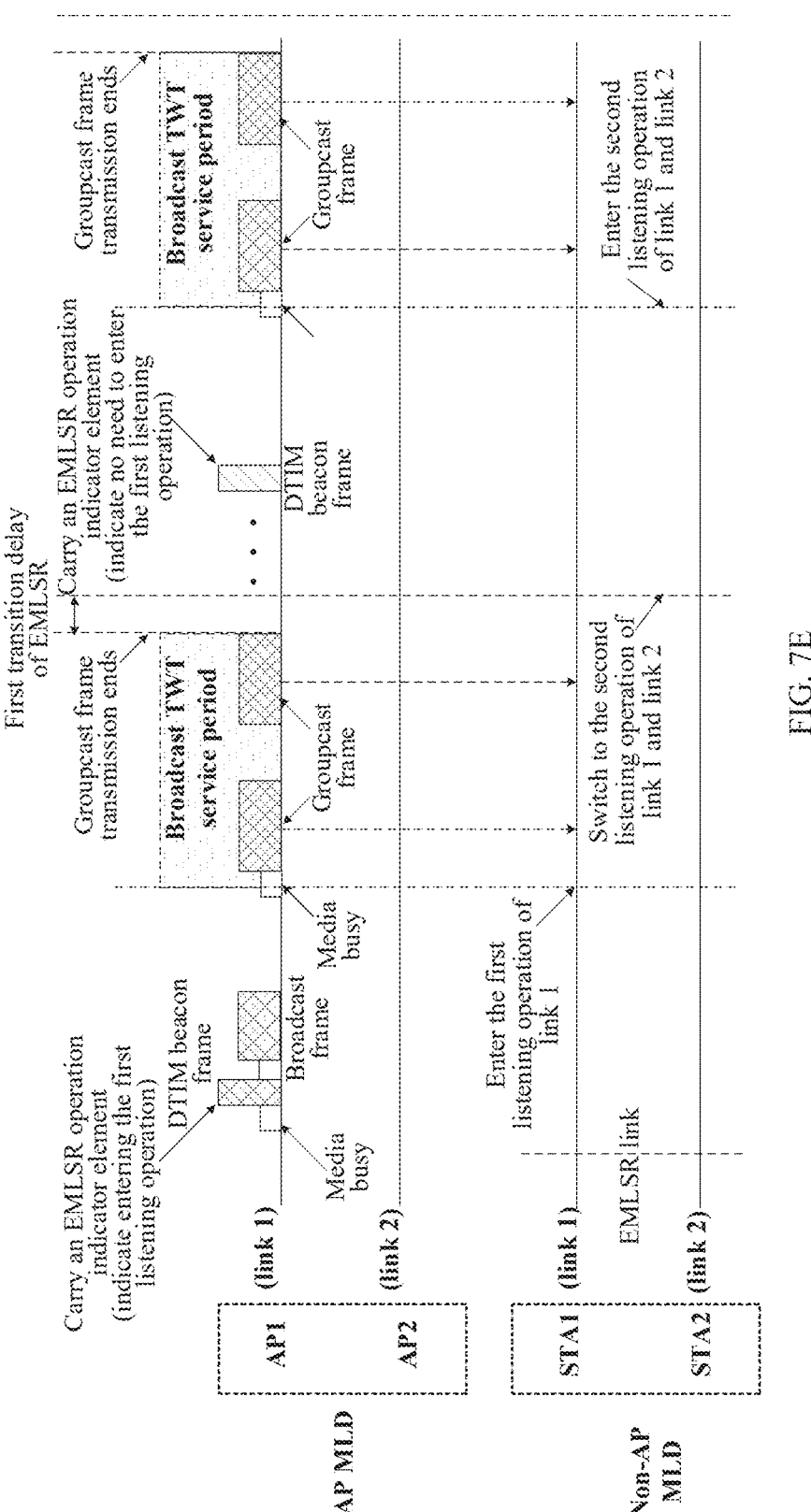

FIG. 7E is a schematic diagram of a fifth implementation process in a specific example, in accordance with a communication method in the embodiments of the present disclosure. As shown in FIG. 7E, the non-AP MLD enters the first listening operation before/at the start time point of the broadcast TWT service period, which is exemplarily as follows.

The non-AP MLD is associated with an AP MLD after the multi-link establishment process. Two associated links are Link 1 and Link 2. The two ends of Link1 are AP1 affiliated with the AP MLD and STA1 of the non-AP MLD. That is, a link corresponding to AP1 and STA1 is Link1.

The two ends of Link2 are AP2 affiliated with the AP MLD and STA2 of the non-AP MLD. That is, a link corresponding to AP2 and STA3 is Link2.

Here, the AP MLD supports the EMLSR mode, and the non-AP MLD operates in the EMLSR mode on the EMLSR links (e.g., Link1 and Link2). A station (e.g., STA1) on the non-AP MLD on the EMLSR link establishes a broadcast TWT with an AP (e.g., AP1) corresponding to (i.e., associated with) STA1 on the AP MLD, STA1 is a scheduled station for the broadcast TWT service period, and AP1 schedules and transmits a cached groupcast frame during the broadcast TWT service period.

AP1 affiliated with the AP MLD carries an EMLSR operation indicator element in the transmitted DTIM beacon frame. The EMLSR operation indicator element indicates that, when AP1 has a cached groupcast frame, the non-AP MLD operating in EMLSR mode needs to enter the first listening operation with the receiving capability of the relatively high rate/relatively high MCS/more spatial streams (SS)/relatively high BW on the link (i.e., Link1) where AP1 is located.

In a case where the AP MLD expects to schedule and transmit, through Link1 in the EMLSR link, a cached groupcast frame during the broadcast TWT service period (the first broadcast TWT service period as shown in FIG. 7E) within the beacon interval of transmitting the DTIM beacon frame, the non-AP MLD operating in the EMLSR mode first enters the first listening operation of the link (i.e., Link1) where the groupcast frame is scheduled and transmitted before/at the start time of the broadcast TWT service period, and then the non-AP MLD operating in the EMLSR mode maintains the first listening operation during the broadcast TWT service period and receives the groupcast frame until the reception of the groupcast frame is completed. Furthermore, when the non-AP MLD receives an indication for confirming that there is no more groupcast frames or the end time point of the broadcast TWT service period is reached, the non-AP MLD switches to the second listening operation of the multi-link (i.e., Link1 and Link2) in the EMLSR mode after the first transition delay of EMLSR.

Furthermore, AP1 affiliated with the AP MLD carries the EMLSR operation indicator element in the transmitted DTIM beacon frame, and the EMLSR operation indicator element indicates that, when AP1 has a cached groupcast frame, the non-AP MLD operating in the EMLSR mode does not need to enter the first listening operation on the link (Link1) where AP1 is located. Furthermore, in a case where the AP MLD is expected to schedule and transmit the cached groupcast frame through Link1 in the EMLSR link during the broadcast TWT service period (the second broadcast TWT service period shown in FIG. 7E), the non-AP MLD operating in the EMLSR mode enters the second listening operation of the multi-link (Link1 and Link1) before/at the start time of the broadcast TWT service period, and receives the groupcast frame during the broadcast TWT service period under the second listening operation until the reception of the groupcast frame is completed.

Here, for the first listening operation, the second listening operation and the first transition delay of EMLSR, reference may be made to the above description, which will not be repeated here.

Figure 7F:
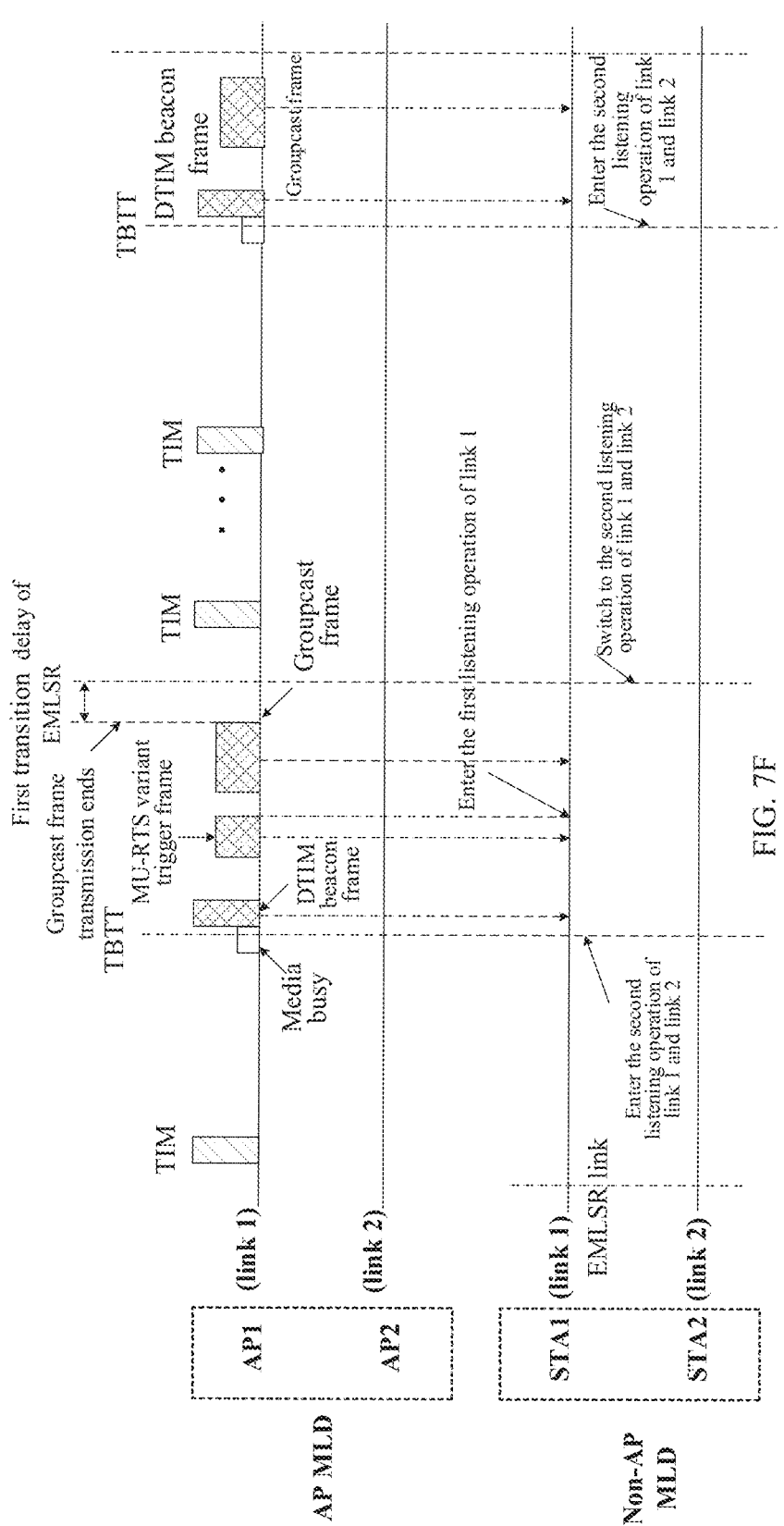

FIG. 7F is a schematic diagram of a sixth implementation process in a specific example, in accordance with a communication method in the embodiments of the present disclosure. As shown in FIG. 7F, the non-AP MLD performs the first listening operation based on a variant MU-RTS trigger frame, which is exemplarily as follows.

On the basis of the format definition of the 802.11be trigger frame, a new variant type of the MU-RTS Variant trigger frame is added, namely, "MU-RTS without clear to send (Clear To Send, CTS) reply", which is as shown in Table 7. The MU-RTS Variant trigger frame (i.e., the variant MU-RTS trigger frame) has the same definition as MU-RTS, except that the trigger type subfield value of the trigger frame variant is different from that of MU-RTS.

TABLE 7

| Trigger Type subfield value | Trigger frame variant |
|---|---|
| . . . | . . . |
| 9 | MU-RTS without CTS reply |
| 10-15 | Reserved |

The MU-RTS Variant trigger frame is used to be transmitted before a specific groupcast frame (e.g., a groupcast frame transmitted with the relatively high rate/relatively high MCS/more SS/relatively high BW) is transmitted, and is used to inform that the groupcast frame will be transmitted after the MU-RTS Variant trigger frame. In addition, according to the requirement of the transition delay of EMLSR (e.g., the second transition delay of EMLSR from the second listening operation to the first listening operation), an appropriate padding duration may be added to ensure that the non-AP MLD operating in the EMLSR mode has enough time to switch to the first listening operation in advance on the corresponding link in the EMLSR link, so as to receive the specific groupcast frame transmitted after the MU-RTS Variant trigger frame.

Exemplarily, the non-AP MLD is associated with an AP MLD after the multi-link establishment process. Two associated links are Link 1 and Link 2. The two ends of Link1 are AP1 affiliated with the AP MLD and STA1 of the non-AP MLD. That is, a link corresponding to AP1 and STA1 is Link1. The two ends of Link2 are AP2 affiliated with the AP MLD and STA2 of the non-AP MLD. That is, a link corresponding to AP2 and STA3 is Link2.

Here, the AP MLD supports the EMLSR mode, and the non-AP MLD operates in the EMLSR mode on the EMLSR links (e.g., Link1 and Link2).

In a case where AP1 affiliated with AP MLD transmits a groupcast frame using the relatively high rate/relatively high MCS/more SS/relatively high BW, AP1 first transmits a target initial control frame that does not need to reply (e.g., the MU-RTS Variant trigger frame) before transmitting the groupcast frame, to inform that the groupcast frame transmitted after the target initial control frame uses the relatively high rate/relatively high MCS/more SS/relatively high BW. In addition, the target initial control frame uses a specified padding (bit padding) duration to ensure that the non-AP MLD operating in the EMLSR mode has enough time to switch to the first listening operation in advance on a specific link in the EMLSR link, so that the groupcast frame is normally received.

As shown in FIG. 7F, after the first DTIM beacon frame, the MU-RTS variant trigger frame is transmitted first, and then the groupcast frame is transmitted using the relatively high rate/relatively high MCS/more SS/relatively high BW.

For the reception of the groupcast frame after the first DTIM beacon frame in FIG. 7F, when the non-AP MLD is ready to receive a cached groupcast frame on Link1 that is scheduled and transmitted after the DTIM beacon frame, the non-AP MLD first enters the second listening operation of the multi-link (Link1 and Link2) in the EMLSR link before TBTT of the expected DTIM beacon frame; and then, after receiving the DTIM beacon frame, the non-AP MLD receives the MU-RTS variant trigger frame, then switches from the second listening operation to the first listening operation of Link1 within the indication duration of the MU-RTS variant trigger frame, and maintains the first listening operation of Link1 to receive the groupcast frame until the reception of the groupcast frame is completed. Furthermore, when the non-AP MLD receives an indication for confirming that there is no more groupcast frames, the non-AP MLD switches to the second listening operation of the multi-link (Link1 and Link2) in the EMLSR mode after the first transition delay of EMLSR.

For the reception of the groupcast frame after the second DTIM beacon frame in 7F, when the non-AP MLD is ready to receive a cached groupcast frame on Link1 that is scheduled and transmitted after the DTIM beacon frame, the non-AP MLD enters the second listening operation of the multi-link (Link1 and Link2) in the EMLSR link before TBTT of the expected DTIM beacon frame, and then receives the DTIM beacon frame and the groupcast frame until the reception of the groupcast frame is completed.

Here, for the first listening operation, the second listening operation and the first transition delay of EMLSR, reference may be made to the above description, which will not be repeated here.

Based on this, in the solutions of the present disclosure, a mechanism for the AP MLD supporting the EMLSR mode to transmit a groupcast frame is defined, and a mechanism for the non-AP MLD to receive the groupcast frame in the EMLSR mode is defined. In addition, a listening operation of the non-AP MLD on the EMLSR link is extended and defined to meet the reception of groupcast frames in special scenarios.

It may be understood that the solutions of the present disclosure are also applicable to the operation method of the enhanced multi-link multi-radio mode.

Figure 8:
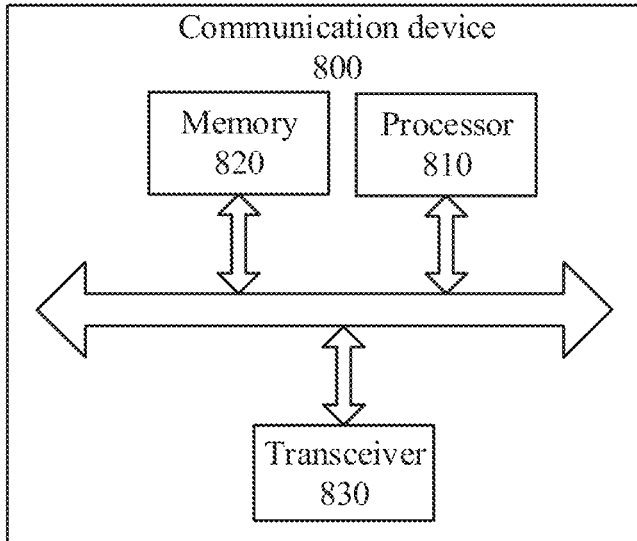
FIG. 8 is a schematic block diagram of a communication device, in accordance with embodiments of the present disclosure.

FIG. 8 is a schematic structural diagram of a communication device 800, in accordance with embodiments of the present disclosure. The communication device 800 includes a processor 810, and the processor 810 may invoke and run a computer program from a memory to enable the communication device 800 to implement the method in the embodiments of the present disclosure.

In a possible implementation, the communication device 800 may further includes a memory 820. The processor 810 may invoke and run the computer program from the memory 820, so that the communication device 800 implements the method in the embodiments of the present disclosure.

The memory 820 may be a separate device independent from the processor 810, or may also be integrated into processor 810.

In a possible implementation, the communication device 800 may further include a transceiver 830, and the processor 810 may control the transceiver 830 to communicate with other devices. Exemplarily, the processor 810 may control the transceiver 830 to transmit information or data to other devices, or receive information or data transmitted by other devices.

The transceiver 830 may include a transmitter and a receiver. The transceiver 830 may further include antennas, and the number of antennas may be one or more.

In a possible implementation, the communication device 800 may be the second multi-link device in the embodiments of the present disclosure, and the communication device 800 may implement the corresponding processes implemented by the second multi-link device in the methods in the embodiments of the present disclosure, which will not be repeated here for conciseness.

In a possible implementation, the communication device 800 may be the first multi-link device in the embodiments of the present disclosure, and the communication device 800 may implement the corresponding processes implemented by the first multi-link device in the methods in the embodiments of the present disclosure, which will not be repeated here for conciseness.

Figure 9:
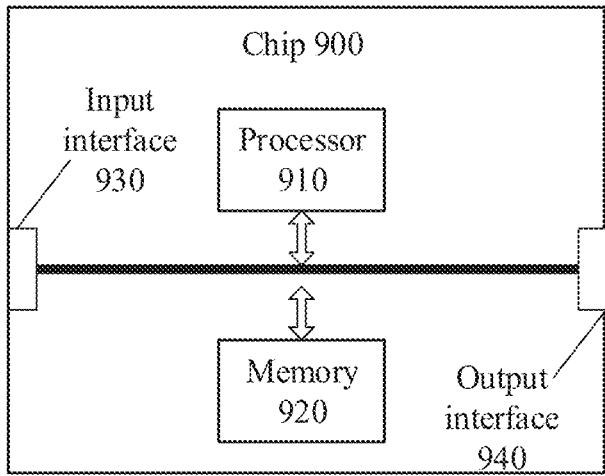
FIG. 9 is a schematic block diagram of a chip, in accordance with embodiments of the present disclosure.

FIG. 9 is a schematic structural diagram of a chip 900, in accordance with embodiments of the present disclosure. The chip 900 includes a processor 910, and the processor 910 may invoke and run a computer program from a memory to implement the method in the embodiments of the present disclosure.

In a possible implementation, the chip 900 may further include a memory 920. The processor 910 may invoke and run the computer program from the memory 920 to implement the method performed by the first multi-link device or the second multi-link device in the embodiments of the present disclosure.

The memory 920 may be a separate device independent from the processor 910, or may also be integrated into the processor 910.

In a possible implementation, the chip 900 may further include an input interface 930. The processor 910 may control the input interface 930 to communicate with other devices or chips. Exemplarily, the processor 910 may control the input interface 930 to obtain information or data transmitted by other devices or chips.

In a possible implementation, the chip 900 may further include an output interface 940. The processor 910 may control the output interface 940 to communicate with other devices or chips. Exemplarily, the processor 910 may control the output interface 940 to output information or data to other devices or chips.

In a possible implementation, the chip may be applied to the second multi-link device in the embodiments of the present disclosure, and the chip may implement the corresponding processes implemented by the second multi-link device in the methods in the embodiments of the present disclosure, which will not be repeated here for conciseness.

In a possible implementation, the chip may be applied to the first multi-link device in the embodiments of the present disclosure, and the chip may implement the corresponding processes implemented by the first multi-link device in the methods in the embodiments of the present disclosure, which will not be repeated here for conciseness.

The chips applied to the second multi-link device and the first multi-link device may be the same chip or different chips.

It should be understood that the chip mentioned in the embodiments of the present disclosure may also be referred to as a system on chip, a system chip, a chip system or a system-on-chip chip.

The processor mentioned above may be a general-purpose processor, a digital signal processor (DSP), a field programmable gate array (FPGA), an application specific integrated circuit (ASIC) or any other programmable logic device, a transistor logic device, a discrete hardware component, etc. The general-purpose processor mentioned above may be a microprocessor or any conventional processor.

The memory mentioned above may be a volatile memory or a non-volatile memory, or may include both volatile and non-volatile memories. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be random access memory (RAM).

It should be understood that the above memories are exemplary but not limitations. For example, the memory in embodiments of the present disclosure may also be a static random access memory (static RAM, SRAM), a dynamic random access memory (dynamic RAM, DRAM), a synchronous DRAM (SDRAM), a double data rate SDRAM (DDR SDRAM), an enhanced SDRAM (ESDRAM), a synch link DRAM (SLDRAM), and a direct rambus RAM (Direct Rambus RAM, DR RAM), etc. That is, the memories in the embodiments of the present disclosure are intended to include, but not limited to, these and any other suitable types of memories.

Figure 10:
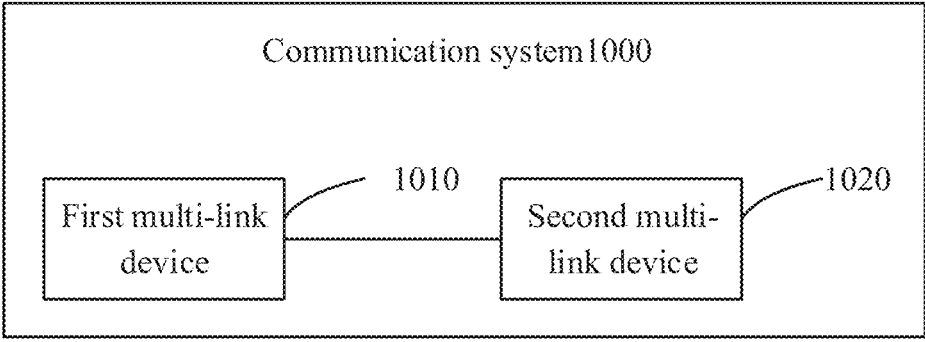
FIG. 10 is a schematic block diagram of a communication system, in accordance with embodiments of the present disclosure.

FIG. 10 is a schematic block diagram of a communication system 1000, in accordance with embodiments of the present disclosure. The communication system 1000 includes a first multi-link device 1010 and a second multi-link device 1020. Exemplarily, the communication system 1000 include:

a first multi-link device 1010, configured to perform a first listening operation, where the first listening operation is used for a first station on the first multi-link device to receive a groupcast frame using a first receiving capability; and a first multi-link device 1020, configured to transmit first information, where the first information is used for the first multi-link device to perform the first listening operation, and the first listening operation is used for the first station on the first multi-link device to receive the groupcast frame using the first receiving capability.

The first multi-link device 1010 may be configured to implement the corresponding functions implemented by the first multi-link device in the above methods, and the second multi-link device 1020 may be configured to implement the corresponding functions implemented by the second multi-link device in the above methods, which will not be repeated here for conciseness.

The above embodiments may be implemented in whole or in part through software, hardware, firmware, or any combination thereof. When implemented using software, all or part of the above embodiments may be implemented in the form of a computer program product. The computer program product includes one or more computer instructions. When the computer program instruction(s) are loaded and executed on a computer, the processes or functions described in the embodiments of the present disclosure are generated in whole or in part. The computer may be a general-purpose computer, a special purpose computer, a computer network, or any other programmable device. The computer instruction(s) may be stored in a computer-readable storage medium, or transmitted from a computer-readable storage medium to another computer-readable storage medium. For example, the computer instruction(s) may be transmitted from a website, computer, server, or data center to another website, computer, server, or data center via a wired manner (e.g., coaxial cable, optical fiber, or digital subscriber line (Digital Subscriber Line, DSL)) or a wireless manner (e.g., infrared, wireless, or microwave). The computer-readable storage medium may be any available medium that can be read by a computer or a data storage device such as a server or a data center that includes one or more available medium. The available medium may be a magnetic medium (e.g., a floppy disk, a hard disk, or a magnetic tape), an optical medium (e.g., a digital video disc (DVD)), or a semiconductor medium (e.g., a solid state disk (Solid State Disk, SSD)).

It should be understood that, in the various embodiments of the present disclosure, the size of the serial numbers of the above processes does not mean the execution order. The execution order of the processes should be determined by their functions and internal logic, and should not constitute any limitation on the implementation process of the embodiments of the present disclosure.

Those skilled in the art may clearly understand that, for convenience and conciseness of description, the specific working processes of the systems, devices and modules described above may refer to the corresponding processes in the above method embodiments, which will not be repeated here.

The above description is only specific implementation of the present disclosure, but the protection scope of the present disclosure is not limited thereto. Any person skilled in the art may readily conceive of variations or substitutions within the technical scope disclosed in the present disclosure, which should be included within the protection scope of the present disclosure. Therefore, the protection scope of the present disclosure shall be subject to the protection scope of the claims.

What is claimed is:

1. A communication method, applied to a first multi-link device (MLD) operating in an enhanced multi-link single radio (EMLSR) mode, comprising:

performing, by the first MLD, a second listening operation, wherein the second listening operation comprises: the first MLD performing a clear channel assessment (CCA) and receiving an initial control frame of a frame exchange sequence transmitted by an access point (AP) MLD through an affiliated station that operates on an EMLSR link in an awake state; and performing, by the first MLD, a first listening operation, wherein the first listening operation is used for a first station on the first MLD to receive a groupcast frame using a first receiving capability;

wherein the first MLD switches from the second listening operation to the first listening operation at a target time or before the target time;

wherein the number of spatial streams of the first listening operation is greater than or equal to the number of spatial streams of the second listening operation;

wherein the first station is a station corresponding to a first link on the first MLD, and the first station is used to listen to the first link; and the first link is a link for transmitting the groupcast frame; wherein the first link is a link in the EMLSR link; and the first MLD is a non-access point (non-AP) MLD;

wherein the first listening operation is performed after the first MLD is switched from the second listening operation to the first listening operation, and the first listening operation enables a second station not to perform listening;

wherein the second station is a station on the first MLD, and the second link is a link in the EMLSR link other than the first link.

2. The method according to claim 1, wherein the first MLD switches from the first listening operation to the second listening operation after the groupcast frame is received completely.

3. The method according to claim 1, wherein after performing the second listening operation, affiliated stations, corresponding to all links in the EMLSR link that are in the awake state, of the first MLD are in a listening state, wherein a capability of each station in the EMLSR link to perform a listening operation is limited.

4. The method according to claim 1, wherein a target initial control frame carries a specified padding duration.

5. The method according to claim 1, wherein performing, by the first MLD, the first listening operation, comprises: performing, by the first MLD, the first listening operation based on first information.

6. The method according to claim 5, wherein the first information is used for the first MLD to perform the first listening operation at the target time or before the target time.

7. The method according to claim 1, wherein the target time comprises a first time point, and the first time point comprises at least one of:
an expected groupcast frame transmission time point; or
a target beacon transmission time (TBTT) of an expected delivery traffic indication map (DTIM) beacon frame.

8. The method according to claim 5, wherein the first information is determined based on a first indication, and the first indication is used to indicate whether to perform the first listening operation after determining that the groupcast frame needs to be received.

9. A first multi-link device (MLD), operating in an enhanced multi-link single radio (EMLSR) mode and comprising a processor and a memory, wherein the memory is configured to store a computer program, and the processor is configured to invoke and run the computer program stored in the memory, to cause the first MLD to perform:
performing a second listening operation, wherein the second listening operation comprises: the first MLD performing a clear channel assessment (CCA) and receiving an initial control frame of a frame exchange sequence transmitted by an access point (AP) MLD through an affiliated station that operates on an EMLSR link in an awake state; and performing a first listening operation, wherein the first listening operation is used for a first station on the first MLD to receive a groupcast frame using a first receiving capability;
wherein the first MLD switches from the second listening operation to the first listening operation at a target time or before the target time;
wherein the number of spatial streams of the first listening operation is greater than or equal to the number of spatial streams of the second listening operation;
wherein the first station is a station corresponding to a first link on the first MLD, and the first station is used to listen to the first link; and the first link is a link for transmitting the groupcast frame; wherein the first link is a link in the EMLSR link; and the first MLD is a non-access point (non-AP) MLD;
wherein the first listening operation is performed after the first MLD is switched from the second listening operation to the first listening operation, and the first listening operation enables a second station not to perform listening;
wherein the second station is a station on the first MLD, and the second link is a link in the EMLSR link other than the first link.

10. The first MLD according to claim 9, wherein the first MLD switches from the first listening operation to the second listening operation after the groupcast frame is received completely.

11. The first MLD according to claim 9, wherein after performing the second listening operation, affiliated stations, corresponding to all links in the EMLSR link that are in the awake state, of the first MLD are in a listening state, wherein a capability of each station in the EMLSR link to perform a listening operation is limited.

12. The first MLD according to claim 9, wherein a target initial control frame carries a specified padding duration.

13. The first MLD according to claim 9, wherein the first MLD is configured to perform the first listening operation based on first information.

14. The first MLD according to claim 13, wherein the first information is used for the first MLD to perform the first listening operation at the target time or before the target time.

15. The first MLD according to claim 9, wherein the target time comprises a first time point, and the first time point comprises at least one of:
an expected groupcast frame transmission time point; or
a target beacon transmission time (TBTT) of an expected delivery traffic indication map (DTIM) beacon frame.

* * * * *